US011440373B2

(12) United States Patent
Wu et al.

(10) Patent No.: US 11,440,373 B2
(45) Date of Patent: Sep. 13, 2022

(54) TEMPERATURE REGULATING SYSTEM OF IN-VEHICLE BATTERY

(71) Applicant: BYD COMPANY LIMITED, Shenzhen (CN)

(72) Inventors: Xingchi Wu, Shenzhen (CN); Jigang Tan, Shenzhen (CN); Hongjun Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 252 days.

(21) Appl. No.: 16/651,265

(22) PCT Filed: Sep. 29, 2018

(86) PCT No.: PCT/CN2018/108790
§ 371 (c)(1),
(2) Date: Mar. 26, 2020

(87) PCT Pub. No.: WO2019/062956
PCT Pub. Date: Apr. 4, 2019

(65) Prior Publication Data
US 2020/0238788 A1 Jul. 30, 2020

(30) Foreign Application Priority Data
Sep. 30, 2017 (CN) .......................... 201710944063.6

(51) Int. Cl.
*B60H 1/00* (2006.01)
*H01M 10/613* (2014.01)
(Continued)

(52) U.S. Cl.
CPC ..... *B60H 1/00278* (2013.01); *B60H 1/00385* (2013.01); *B60H 1/00478* (2013.01);
(Continued)

(58) Field of Classification Search
None
See application file for complete search history.

(56) References Cited

U.S. PATENT DOCUMENTS 9,016,071 B2   4/2015  Kim et al.
9,719,702 B2   8/2017  Kuwahara et al.
(Continued)

FOREIGN PATENT DOCUMENTS

CN   101652896 A   2/2010
CN   202076386 U   12/2011
(Continued)

OTHER PUBLICATIONS

The World Intellectual Property Organization (WIPO) International Search Report for PCT/CN2018/108790 dated Dec. 28, 2018 6 Pages.

*Primary Examiner* — Jonathan Crepeau
(74) *Attorney, Agent, or Firm* — Anova Law Group, PLLC

(57) ABSTRACT

A temperature regulating system of an in-vehicle battery is disclosed in the present disclosure. The system includes: a heat exchanger; an in-vehicle air conditioner, where the in-vehicle air conditioner is provided with an air conditioner vent, a first air duct is formed between the air conditioner vent and the heat exchanger, a semiconductor heat exchange module, where a second air duct is formed between a cooling end of the semiconductor heat exchange module and the first fan, and a third air duct is formed between the cooling end of the semiconductor heat exchange module and a compartment; a battery thermal management module, where the battery thermal management module is connected to the heat exchanger to form a heat exchange flow path; and a controller, connected to the semiconductor heat exchange module, the battery thermal management module, and the in-vehicle air conditioner.

16 Claims, 19 Drawing Sheets

(51) Int. Cl.
*H01M 10/615* (2014.01)
*H01M 10/617* (2014.01)
*H01M 10/625* (2014.01)
*H01M 10/637* (2014.01)
*H01M 10/6556* (2014.01)
*H01M 10/663* (2014.01)
*H01M 10/63* (2014.01)
*H01M 10/6572* (2014.01)

(52) U.S. Cl.
CPC ....... *H01M 10/613* (2015.04); *H01M 10/615* (2015.04); *H01M 10/617* (2015.04); *H01M 10/625* (2015.04); *H01M 10/63* (2015.04); *H01M 10/637* (2015.04); *H01M 10/6556* (2015.04); *H01M 10/663* (2015.04); *B60H 2001/003* (2013.01); *B60H 2001/00307* (2013.01); *H01M 10/6572* (2015.04); *H01M 2220/20* (2013.01)

(56) References Cited

U.S. PATENT DOCUMENTS

| | | | |
|---|---|---|---|
| 9,770,961 | B2 | 9/2017 | Murata et al. |
| 2005/0247446 | A1* | 11/2005 | Gawthrop ........... B60H 1/00007 165/202 |
| 2010/0025006 | A1 | 2/2010 | Zhou |
| 2012/0102973 | A1* | 5/2012 | Oh .................... B60H 1/00028 62/3.61 |
| 2012/0270077 | A1* | 10/2012 | Koetting ............. H01M 10/647 429/61 |
| 2015/0280294 | A1* | 10/2015 | Shin ........................ B60L 50/51 429/50 |
| 2015/0333379 | A1* | 11/2015 | Janarthanam .......... B60L 58/26 429/61 |
| 2016/0082861 | A1 | 3/2016 | Gauthier |
| 2018/0141406 | A1 | 5/2018 | Neumeister et al. |

FOREIGN PATENT DOCUMENTS

| | | |
|---|---|---|
| CN | 102803006 A | 11/2012 |
| CN | 105270132 A | 1/2016 |
| CN | 105522932 A | 4/2016 |
| CN | 205194807 U | 4/2016 |
| CN | 106099221 A | 11/2016 |
| CN | 206180041 U | 5/2017 |
| CN | 206264747 U | 6/2017 |
| CN | 206364154 U | 7/2017 |
| EP | 2366568 A1 | 9/2011 |
| JP | 08148190 A | 6/1996 |
| JP | 2006103365 A | 4/2006 |
| JP | 2013025926 A | 2/2013 |
| JP | 2013048063 A | 3/2013 |
| JP | 2013149524 A | 8/2013 |
| JP | 2013184528 A | 9/2013 |
| JP | 2014160594 A | 9/2014 |
| JP | 2015072819 A | 4/2015 |
| JP | 6028756 B2 | 11/2016 |
| JP | 6151760 B2 | 6/2017 |
| KR | 20080008875 A | 1/2008 |
| WO | 2012105047 A1 | 8/2012 |
| WO | 2016180712 A1 | 11/2016 |
| WO | 2017151788 A1 | 9/2017 |

* cited by examiner

TEMPERATURE REGULATING SYSTEM OF IN-VEHICLE BATTERY

CROSS-REFERENCE TO RELATED APPLICATIONS

This application is a national phase entry under 35 U.S.C. § 371 of International Application No. PCT/CN2018/108790, filed on Sep. 29, 2018, which claims priority to and benefits of Chinese Patent Application Serial No. 201710944063.6, filed with the State Intellectual Property Office of P. R. China on Sep. 30, 2017, content of all of which is incorporated herein by reference.

FIELD

This application relates to the field of automobile technologies, and in particular, to a temperature regulating system of an in-vehicle battery.

BACKGROUND

Currently, the performance of an in-vehicle battery of an electric vehicle is greatly affected by the climatic environment. An excessively high or low ambient temperature affects the performance of the in-vehicle battery. Therefore, the temperature of the in-vehicle battery needs to be regulated, so that the temperature thereof is maintained in a preset range.

However, in the related art, a method for regulating the temperature of the in-vehicle battery is crude, and a cooling power of the in-vehicle battery cannot be controlled precisely according to its actual condition. Consequently, it cannot be ensured that the temperature of the in-vehicle battery is maintained in the preset range.

SUMMARY

The present disclosure is aimed at resolving one of the technical problems in the related art at least in some degree.

Therefore, a first objective of the present disclosure is to provide a temperature regulating system of an in-vehicle battery. This system can regulate the temperature when the temperature of the in-vehicle battery is excessively high, so that the temperature of the in-vehicle battery is maintained in a preset range, thereby avoiding the situation that the performance of the in-vehicle battery is affected by the excessively high temperature.

To achieve the foregoing objective, according to a first aspect of embodiments of the present disclosure, a temperature regulating system of an in-vehicle battery is provided, including: a heat exchanger; an in-vehicle air conditioner, where the in-vehicle air conditioner is provided with an air conditioner vent, a first air duct is formed between the air conditioner vent and the heat exchanger, a first fan is disposed in the first air duct, and the first fan is disposed corresponding to the heat exchanger; a semiconductor heat exchange module, where a second air duct is formed between a cooling end of the semiconductor heat exchange module and the first fan, and a third air duct is formed between the cooling end of the semiconductor heat exchange module and a compartment; a battery thermal management module, where the battery thermal management module is connected to the heat exchanger to form a heat exchange flow path; and a controller, connected to the semiconductor heat exchange module, the battery thermal management module, and the in-vehicle air conditioner.

The temperature regulating system of an in-vehicle battery according to the embodiments of the present disclosure can regulate the temperature when the temperature of the in-vehicle battery is excessively high, so that the temperature of the in-vehicle battery is maintained in a preset range, thereby avoiding the situation that the performance of the in-vehicle battery is affected by the excessively high temperature.

BRIEF DESCRIPTION OF THE DRAWINGS

The foregoing and/or additional aspects and advantages of the present disclosure will become obvious and easy to understand from the following description of the embodiments with reference to the accompanying drawings, where.

DETAILED DESCRIPTION

A temperature regulating method of an in-vehicle battery and a non-temporary readable storage medium of the temperature regulating system provided in the embodiments of the present disclosure are described below with reference to the accompanying drawings.

Figure 1:
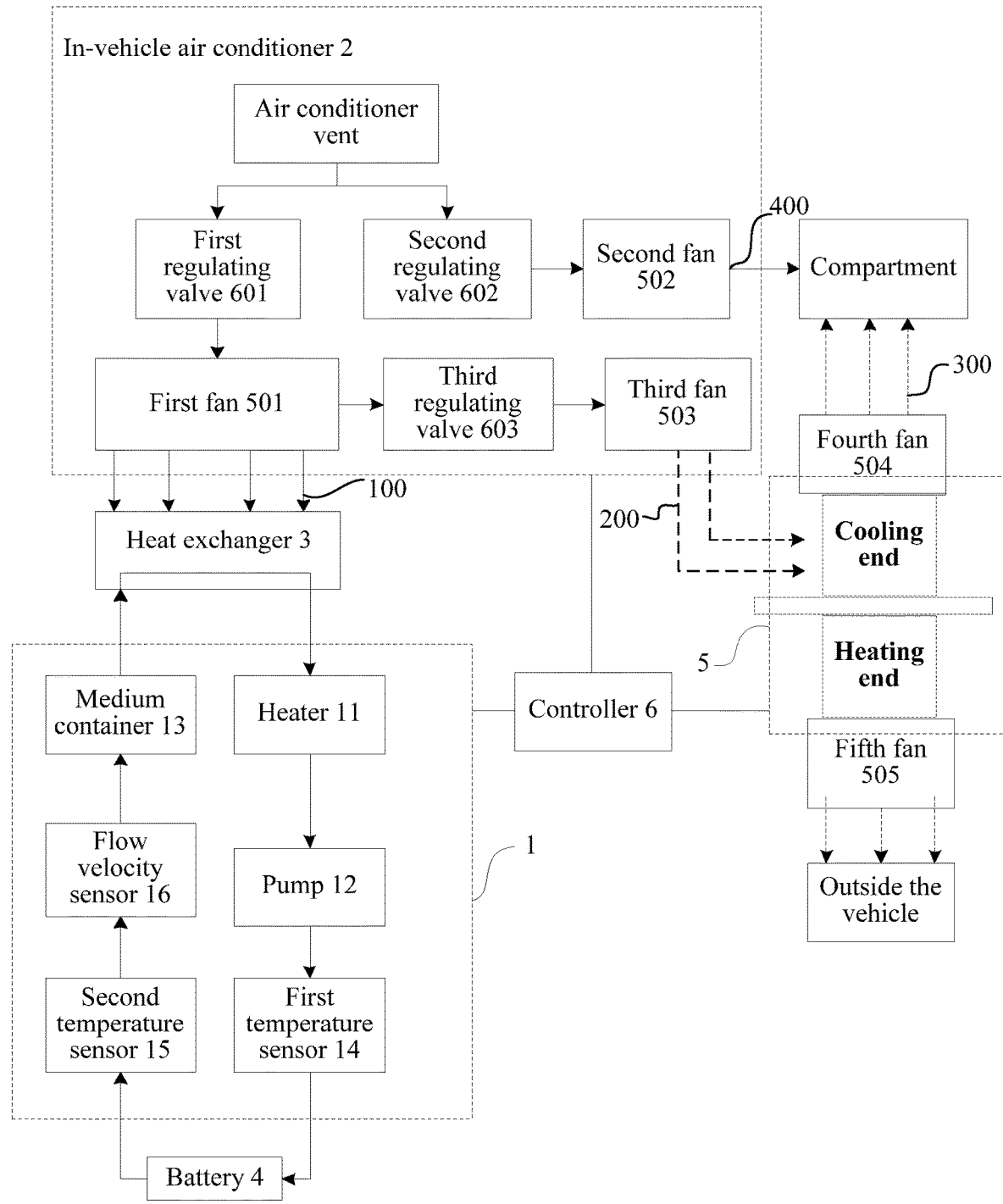
FIG. 1 is a first schematic structural diagram of a temperature regulating system of an in-vehicle battery according to a first embodiment of the present disclosure.
Figure 2:
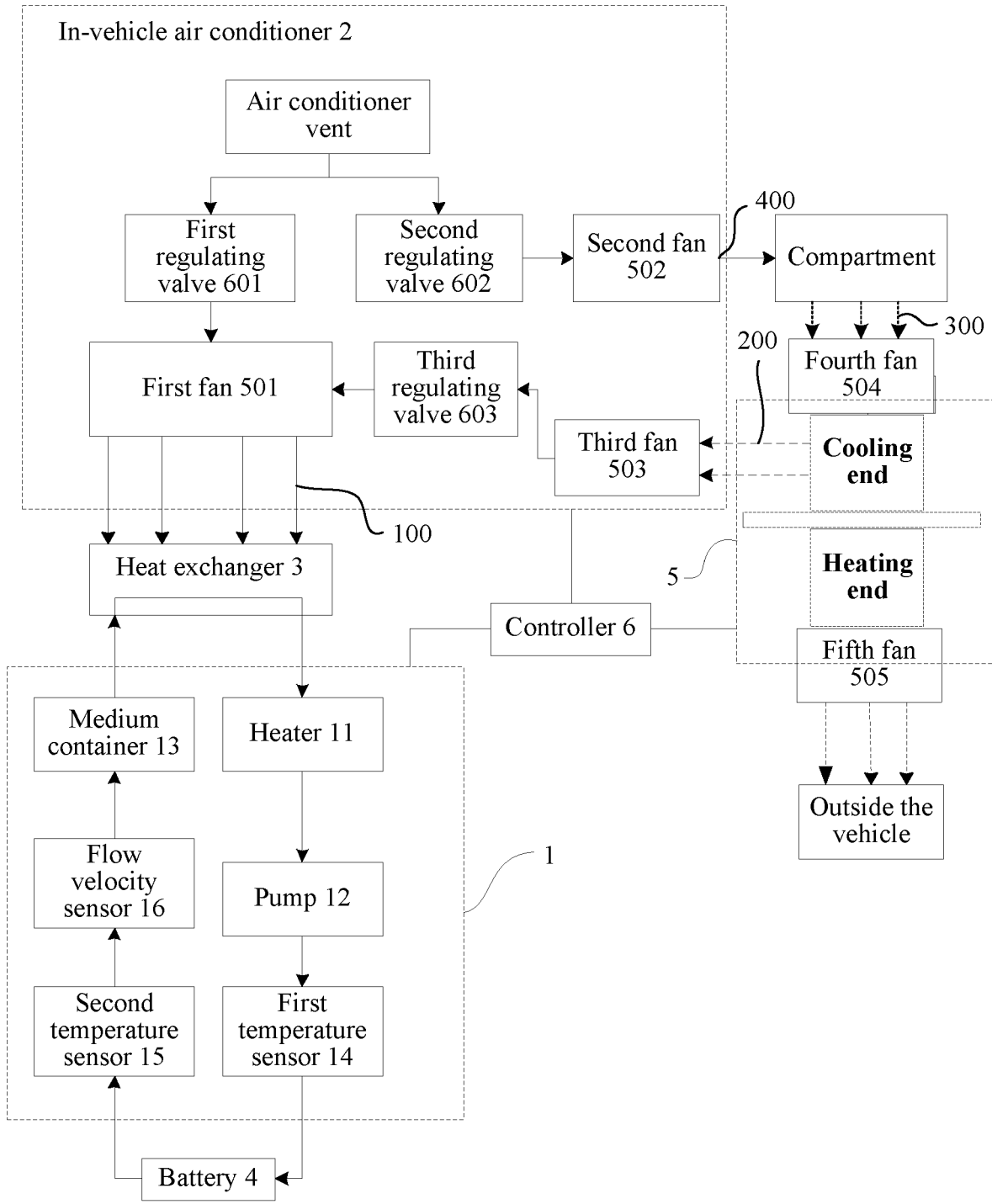
FIG. 2 is a second schematic structural diagram of a temperature regulating system of an in-vehicle battery according to a first embodiment of the present disclosure.

FIG. 1 to FIG. 2 are schematic structural diagrams of a temperature regulating system of an in-vehicle battery according to a first embodiment of the present disclosure. As shown in FIG. 1 and FIG. 2, the system includes: a battery thermal management module 1, an in-vehicle air conditioner 2, a heat exchanger 3, a semiconductor heat exchange module 5 and a controller 6.

The in-vehicle air conditioner 2 is provided with an air conditioner vent, a first air duct 100 is formed between the air conditioner vent and the heat exchanger 3, a first fan is disposed in the first air duct 100, and the first fan is disposed corresponding to the heat exchanger. A second air duct 200 is formed between a cooling end of the semiconductor heat exchange module 5 and the first fan 501, and a third air duct 300 is formed between the cooling end of the semiconductor heat exchange module 5 and a compartment. The battery thermal management module 1 is connected to the heat exchanger 3 to form a heat exchange flow path. The controller 6 is connected to the semiconductor heat exchange module 5, the battery thermal management module 1, and the in-vehicle air conditioner 2. The controller 6 is configured to obtain a required power P1 and an actual power P2 for temperature regulation of the battery, and control, according to the required power P1 and the actual power P2, at least one of the in-vehicle air conditioner 2 and the semiconductor heat exchange module 5 to work, to regulate the temperature of the battery.

Optionally, as shown in FIG. 1 and FIG. 2, the in-vehicle air conditioner 2 includes a first regulating valve 601 disposed in the first air duct 100 and a first fan 501 corresponding to the heat exchanger 3. The first regulating valve 601 and the first fan 501 are both disposed in the first air duct 100 and the first regulating valve 601 is connected to the first fan 501. The semiconductor heat exchange module 5 further includes a third fan 503 and a third regulating valve 603 that are disposed in the second air duct 200 and that are disposed corresponding to the cooling end of the semiconductor heat exchange module 5. That is, the third fan 503 and the third regulating valve 603 are both disposed in the second air duct 200 and the third fan 503 is connected to the third regulating valve 603.

Moreover, the in-vehicle air conditioner 2 exchanges heat with the heat exchanger 3 through the first air duct 100. The semiconductor heat exchange module 5 exchanges heat with the heat exchanger through the second air duct 200. The semiconductor heat exchange module 5 exchanges heat with the compartment through the third air duct 300.

As shown in FIG. 1, after the in-vehicle air conditioner 2 exchanges heat with the semiconductor heat exchange module 5 through the second air duct 200, the semiconductor heat exchange module 5 exchanges heat with the compartment through a fourth fan 504 and the third air duct 300, and the fourth fan 504 is disposed in the third air duct 300.

As shown in FIG. 2, after the in-vehicle air conditioner 2 exchanges heat with the semiconductor heat exchange module 5 through a fourth air duct 400, the compartment, and the third air duct 300, the semiconductor heat exchange module 5 exchanges heat with the heat exchanger 3 through the second air duct 200.

As shown in FIG. 2, the in-vehicle air conditioner 2 exchanges heat with the heat exchanger through the first air duct 100, and the semiconductor heat exchange module exchanges heat with the heat exchanger 3 through the second air duct 200.

It can be understood that a battery 4 refers to an energy storage device that is installed on a vehicle, provides power output for the vehicle, provides electricity for other electric devices on the vehicle, and can be charged repeatedly. The battery 4 may be a battery module or a battery pack.

Specifically, the required power P1 is a temperature regulating power required by the battery when the temperature of the battery is regulated to a target temperature. The actual power P2 is a temperature regulating power actually obtained by the battery when temperature regulation is performed on the battery currently. The target temperature is a set value, and may be preset according to an actual condition of the in-vehicle battery. For example, in winter when the outdoor ambient temperature is low, the battery needs to be heated, and the target temperature may be set to about 10° C.; in summer, the battery needs to be cooled, and the target temperature may be set to about 35° C.

When the temperature of the battery 4 is relatively high, for example, higher than 40° C., the temperature regulating system of an in-vehicle battery enters a cooling mode. As shown in FIG. 1 and FIG. 2, the in-vehicle air conditioner 2 and the battery thermal management module 1 work; the controller 6 controls the first regulating valve 601 to open; the first fan 501 blows cooling air of the in-vehicle air conditioner 2 to the heat exchanger 3, to cool a medium in a cooling pipe of the heat exchanger 3, and the medium then cools the battery through the battery thermal management module 1. When the temperature regulating system of an in-vehicle battery works in the cooling mode, the flow direction of the cooling air is as follows: air conditioner vent—first regulating valve 601—first fan 501—heat exchanger 3; and the flow direction of the medium is as follows: heat exchanger 3—battery thermal management module 1—battery 4—battery thermal management module 1—heat exchanger 3. Moreover, when the battery 4 is cooled, as shown in FIG. 2, the controller 6 may also control the semiconductor heat exchange module 5 to work; the third fan 503 blows a cooling power of the cooling end of the semiconductor to the first fan 501; the first fan 501 blows air to the heat exchanger 3, to cool the medium in the cooling pipe of the heat exchanger 3, and then the medium cools the battery through the battery thermal management module 1.

When the battery 4 is cooled, the controller 6 further obtains the required power P1 and the actual power P2 of the battery in real time, where the required power P1 is a power that needs to be provided for the battery 4 when the temperature of the battery is regulated to the set target temperature, and the actual power P2 is an actual regulating power obtained by the battery 4 currently when temperature regulation is performed on the battery. The target temperature is a set value, and may be preset according to an actual condition of the in-vehicle battery. For example, when the battery is cooled, the target temperature may be set to about 35° C.

In addition, the controller 6 further regulates a cooling power of the in-vehicle air conditioner, a rotational speed of the first fan 501, and opening of the first regulating valve 601 according to the required power P1 and the actual power P2, and/or regulates a power of a semiconductor heat exchange module, a rotational speed of the third fan 503, and opening of the third regulating valve 603, so as to regulate the actual power P2. For example, if P1 is greater than P2, the cooling power of the in-vehicle air conditioner is increased, or the rotational speed of the first fan 501 is increased, or the opening of the first regulating valve 601 is increased; alternatively, the power of the semiconductor heat exchange module is increased, or the rotational speed of the third fan 503 is increased, or the opening of the third regulating valve 603 is increased, so as to increase the actual power P2 of the battery 4, so that the temperature of the battery 4 is decreased as quickly as possible.

Therefore, the temperature regulating system can regulate the temperature when the temperature of the in-vehicle battery is excessively high, so that the temperature of the in-vehicle battery is maintained in a preset range, thereby avoiding the situation that the performance of the in-vehicle battery is affected by the temperature.

According to an embodiment of the present disclosure, as shown in FIG. 1 and FIG. 2, the battery thermal management module 1 includes a pump 12, a first temperature sensor 14, a second temperature sensor 15, and a flow velocity sensor 16 that are disposed on the heat exchange flow path. The pump 12 is configured to cause a medium in the heat exchange flow path to flow. The first temperature sensor 14 is configured to detect an inlet temperature of a medium that flows into the in-vehicle battery. The second temperature sensor 15 is configured to detect an outlet temperature of the medium that flows out of the in-vehicle battery. The flow velocity sensor 16 is configured to detect a flow velocity of the medium that flows in the heat exchange flow path.

Optionally, as shown in FIG. 1 and FIG. 2, the battery thermal management module 1 may further include a medium container 13 disposed on the heat exchange flow path, and the medium container 13 is configured to store a medium and provide the medium for the heat exchange flow path.

Optionally, as shown in FIG. 1 and FIG. 2, the battery thermal management module 1 may further include a heater 11 disposed on the heat exchange flow path, and the heater 11 is configured to heat the medium in the heat exchange flow path.

Figure 3:
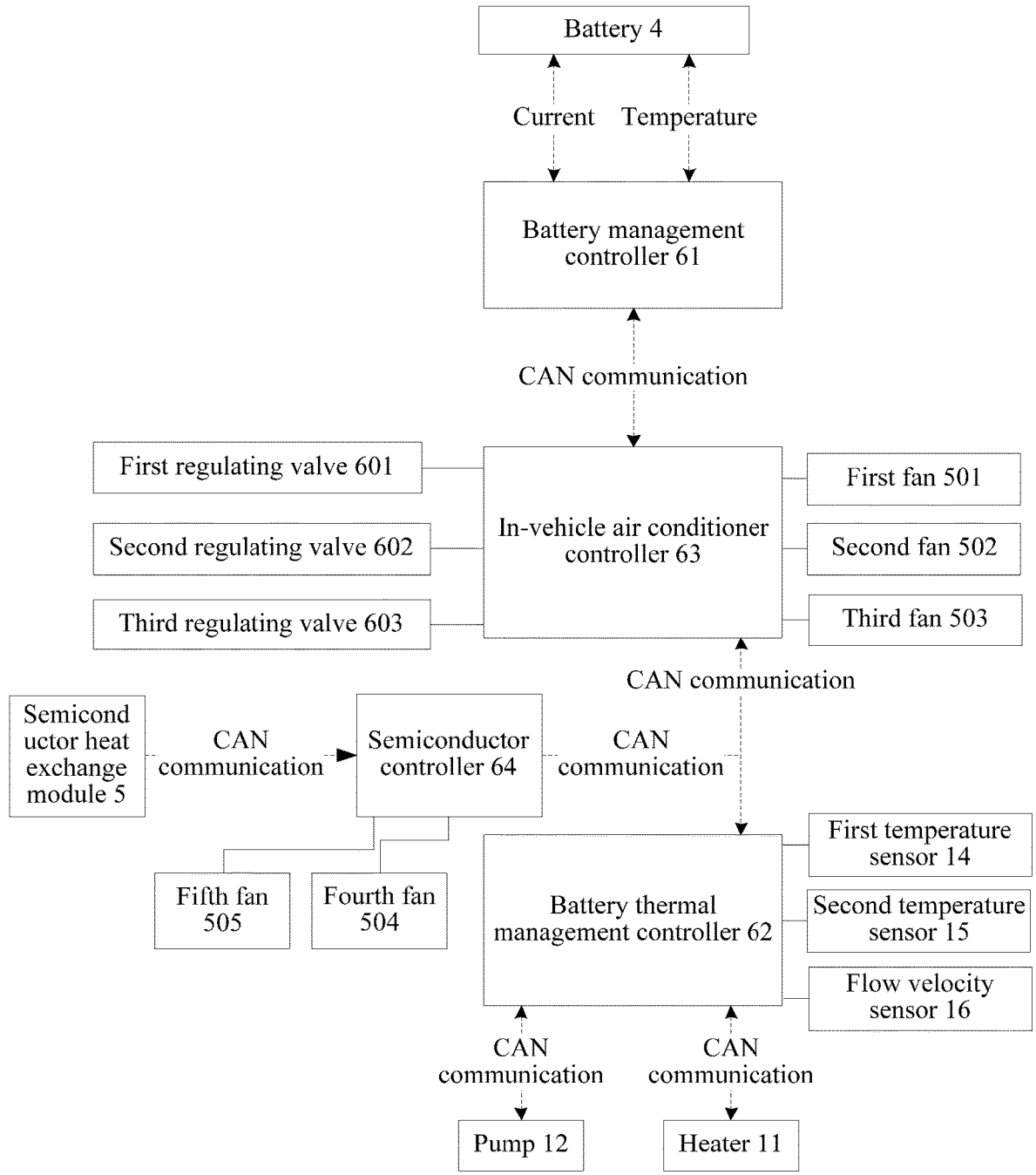
FIG. 3 is a control topological diagram of a temperature regulating system of an in-vehicle battery according to a first embodiment of the present disclosure.

Specifically, as shown in FIG. 3, the controller 6 may include a battery management controller 61, a battery thermal management controller 62, and an in-vehicle air conditioner controller 63. The battery management controller 61 acquires a current flowing through the battery and a temperature of the battery, and obtains the required power P1 according to a target temperature of the battery, a target time t, a specific heat capacity C of the battery, a mass M of the battery, and an internal resistance R of the battery, and controls the in-vehicle air conditioner controller 63 to start or stop working. The battery thermal management controller 62 may be electrically connected to the first temperature sensor 14, the second temperature sensor 15, and the flow velocity sensor 16, performs controller area network (CAN) communication with the pump 12 and the heater 1, obtains the actual power P2 according to a specific heat capacity of the medium, a density of the medium, and a cross-sectional area of the flow path, controls a rotational speed of the pump 12 and a power of the heater 11, and can perform CAN communication with the in-vehicle air conditioner 2. The in-vehicle air conditioner controller 63 may perform CAN communication with the battery management controller 61 and the battery thermal management controller 62. The in-vehicle air conditioner controller 63 may control turn-on or turn-off of the first regulating valve 601, and may regulate the opening of the first regulating valve 601. The first fan 501 is controlled by the in-vehicle air conditioner controller 63, and has an adjustable air speed. In addition, the in-vehicle air conditioner controller 63 may perform CAN communication with the battery management controller 61 and the battery thermal management controller 62, to control the cooling power, the regulating valve, and the fan of the in-vehicle air conditioner according to the required power P1 obtained by the battery management controller 61 and the actual power P2 obtained by the battery thermal management controller 62, thereby controlling the heat exchange amount.

It needs to be appreciated that, the battery management controller 61, for example, may include a DSP chip having a battery management function. The battery thermal management controller 62, for example, may include a DSP chip having a battery thermal management function. The in-vehicle air conditioner controller 63, for example, may include an in-vehicle air conditioner DSP chip.

It may be appreciated that, in addition to cooling the battery 4 through the in-vehicle air conditioner 2 and the heat exchanger 3, the temperature regulating system of an in-vehicle battery may further heat the medium through the heater 11, to perform temperature regulation on the battery 4 when the battery temperature is relatively low. The heater 11 may be a positive temperature coefficient (PTC, which generally refers to a semiconductor material or device with a large positive temperature coefficient) heater, which may perform CAN communication with the battery thermal management controller 62, provides a heating power for the temperature regulating system of an in-vehicle battery, and is controlled by the battery thermal management controller 62. The heater 11 is not in direct contact with the battery 4, and has relatively high security, reliability and practicability. The pump 12 is mainly configured to provide dynamic. The medium container 13 is mainly configured to store the medium and accept the medium added to the temperature regulating system. When the medium in the temperature regulating system reduces, the medium in the medium container 13 may provide a supplement automatically. The first temperature sensor 14 is configured to detect the temperature of the medium at the inlet of the battery flow path, and the second temperature sensor 15 is configured to detect the temperature of the medium at the outlet of the battery flow path. The flow velocity sensor 16 is configured to detect flow velocity information of the medium in the pipe of the temperature regulating system.

According to an embodiment of the present disclosure, the controller 6 is further configured to obtain the temperature of the battery, and determine whether the temperature of the battery 4 is greater than a first temperature threshold or less than a second temperature threshold. When the temperature of the battery 4 is greater than the first temperature threshold, the cooling mode begins; and when the temperature of the battery 4 is less than the second temperature threshold, the heating mode begins. The first temperature threshold is greater than the second temperature threshold. The first temperature threshold and the second temperature threshold may be preset according to an actual condition. For example, the first temperature threshold may be 40° C., and the second temperature threshold may be 0° C.

Specifically, after the vehicle is powered on, the controller 6 obtains the temperature of the battery 4 in real time, and makes a judgment on the temperature of the battery 4. If it is determined that the temperature of the battery 4 is higher than 40° C., it indicates that the temperature of the battery 4 is excessively high at this moment, and to prevent the high temperature from affecting the performance of the battery 4, the temperature of the battery 4 needs to be decreased. The temperature regulating system enters the cooling mode. The controller 6 controls the first regulating valve 601 to open; the first fan 501 blows the cooling air of the in-vehicle air conditioner 2 to the heat exchanger 3, to cool the medium in the cooling pipe of the heat exchanger 3; and then the medium cools the battery 4 through the battery thermal management module 1. When the battery 4 is cooled, the first regulating valve 601 is open, and the flow direction of the cooling air is as follows: air conditioner vent—first regulating valve 601—first fan 501—heat exchanger 3; and the flow direction of the medium is as follows: heat exchanger 3—heater 11 (turned off)—pump 12—first temperature sensor 14—battery 4—second temperature sensor 15—flow velocity sensor 16—medium container 13—heat exchanger 3.

If the temperature of the battery 4 is lower than 0° C., it indicates that the temperature of the battery 4 is excessively low at this moment, and to prevent the low temperature from affecting the performance of the battery 4, the temperature of the battery 4 needs to be increased. The temperature regulating system enters the heating mode. The battery thermal management controller 62 controls the heater 11 to turn on; at the same time, the in-vehicle air conditioner 2 keeps the first regulating valve 601 in a closed state; the flow direction of the medium is as follows: heat exchanger 3—heater 11 (turned on)—pump 12—first temperature sensor 14—battery 4—second temperature sensor 15—flow velocity sensor 16—medium container 13—heat exchanger 3. The heater 11 heats the medium in the cooling pipe, so that the medium exchanges heat with the battery 4, to complete temperature regulation of the battery.

How the controller obtains the required power P1 and the actual power P2 of the battery 4 is described in the following with a specific example.

According to an embodiment of the present disclosure, the controller 6 may be configured to obtain a first parameter when temperature regulation of the battery 4 is started, and generate a first required power for temperature regulation of the battery according to the first parameter; obtain a second parameter during temperature regulation of the battery 4, and a second required power for temperature regulation of the battery according to the second parameter; and generate the required power P1 of the battery according to the first required power of the battery and the second required power of the battery.

Optionally, according to an embodiment of the present disclosure, the first parameter is an initial temperature when temperature regulation of the battery 4 is started, a target temperature, and a target time t it takes to reach the target temperature from the initial temperature. A first temperature difference $\Delta T_1$ between the initial temperature and the target temperature is obtained, and the first required power is generated according to the first temperature difference $\Delta T_1$ and the target time t.

Optionally, the controller 6 generates the first required power through the following formula (1):

$$\Delta T_1 * C * M / t \quad (1),$$

where $\Delta T_1$ is the first temperature difference between the initial temperature and the target temperature, t is the target time, C is the specific heat capacity of the battery 4, and M is the mass of the battery 4.

The second parameter is an average current I of the battery 4 in a preset time, and the controller 6 generates the second required power through the following formula (2):

$$I^2 * R \quad (2),$$

where I is the average current, and R is the internal resistance of the battery 4.

Specifically, a charge-discharge current parameter of the battery 4 may be detected by using a current Hall sensor. The battery management controller 61 may estimate the average current battery 4 of the according to the current parameter of the battery 4 in a period of time.

When the battery 4 is cooled, $P1 = \Delta T_1 * C * M / t + I^2 * R$; and when the battery 4 is heated, $P1 = \Delta T_1 * C * M / t - I^2 * R$.

According to an embodiment of the present disclosure, the controller 6 further generates a second temperature difference $\Delta T_2$ according to the inlet temperature detected by the first temperature sensor 14 and the outlet temperature detected by the second temperature sensor 15, and generates the actual power P2 of the battery according to the second temperature difference $\Delta T_2$ of each battery and the flow velocity v detected by the flow velocity sensor 16.

Optionally, according to an embodiment of the present disclosure, the actual power P2 is generated through the following formula (3):

$$\Delta T_2 * c * m \quad (3)$$

where $\Delta T_2$ is the second temperature difference, c is the specific heat capacity of the medium in the flow path, and m is a mass of the medium flowing through a cross-sectional area of the flow path per unit time, where $m = v * \rho * s$, v is the flow velocity of the medium, $\rho$ is the density of the medium, and s is the cross-sectional area of the flow path.

Specifically, after the vehicle is powered on, the battery management controller 61 determines, according to the battery temperature, whether the battery 4 requires temperature regulation. If it is determined that the battery 4 requires temperature regulation, temperature regulating function enabling information is sent to the in-vehicle air conditioner controller 63 through CAN communication, the in-vehicle air conditioner controller 63 forwards the information to the battery thermal management controller 62, and the battery thermal management controller 62 controls the pump 12 to start working at a default rotational speed (for example, at a low rotational speed).

Then, the battery thermal management controller 62 obtains the initial temperature (that is, the current temperature) and the target temperature of the battery 4 and the target time t it takes to reach the target temperature from the initial temperature, where the target temperature and the target time t may be preset according to an actual condition, and the first required power of the battery 4 is calculated according to formula (1). At the same time, the battery thermal management controller 62 obtains the average current I of the battery 4 in the preset time, and calculates the second required power of the battery 4 according to formula (2). Then, the battery thermal management controller 62 calculates the required power P1 (that is, the required power for regulating the temperature of the battery 4 to the target temperature within the target time) according to the first required power and the second required power of the battery 4, where when the battery 4 is cooled, $P1=\Delta T_1*C*M/t+I^2*R$, and when the battery 4 is heated, $P1=\Delta T_1*C*M/t-I^2*R$. Moreover, the battery thermal management controller 62 respectively obtains temperature information detected by the first temperature sensor 14 and the second temperature sensor 15, obtains flow velocity information detected by the flow velocity sensor 16, and calculates the actual power P2 of the battery 4 according to the formula (3). Finally, the battery thermal management controller 62 precisely controls the heating power of the battery 4 by controlling the power of the heater 11 according to P1 and P2 of the battery 4. The in-vehicle air conditioner precisely controls the cooling power of the battery 4 by controlling the cooling power of the in-vehicle air conditioner, the rotational speed of the first fan 501, and the opening of the first regulating valve.

It may be appreciated that, the required power P1 and the actual power P2 of the battery 4 may be obtained through the foregoing method.

Specifically, it can be learned from the foregoing embodiment that, in different conditions, the required power P1 may be calculated in different manners. When the battery 4 needs to be cooled, if the initial temperature of the battery 4 is 45° C. and the target temperature is 35° C., the amount of heat that needs to be dissipated by the battery 4 when the temperature declines from 45° C. to 35° C. is fixed, and may be directly calculated through formula (1), that is, $\Delta T_1*C*M/t$. Moreover, in a cooling process of the battery 4, there is a charging and discharging process, which generates heat. This heat may also be directly obtained by detecting the average current I of the battery 4. The current heating power, namely, the second required power, of the battery 4 is directly calculated through formula (3), that is, $I^2*R$. A cooling completion time in the present disclosure is set based on the target time t (where t may be changed according to a user requirement or an actual design condition of the vehicle). After the target time t required for completing cooling is determined, the required power P1 for cooling the battery 4 currently may be estimated, where $P1=\Delta T_1*C*M/t+I^2*R$. If a heating function is enabled, the required power $P1=\Delta T_1*C*M/t-I^2*R$, that is, in a heating process of the battery 4, a larger discharging or charging current of the battery 4 indicates a smaller required heating power, that is, a smaller required power P1.

The cooling time of the battery 4 is affected by the cooling efficiency. Because the cooling efficiency is affected by an ambient temperature and the current temperature of the battery 4, in the cooling process of the battery 4, the efficiency of the temperature regulating system also changes constantly. Therefore, the cooling efficiency cannot be 100%. As a result, it is impossible to accurately regulate the cooling time of the battery 4 merely according to P1, and it is necessary to detect the actual power P2 of the battery 4. In the present disclosure, the actual power P2 of the battery 4 may be calculated through formula (3), that is, $\Delta T_2*c*m$. The actual cooling power P2 of the battery may also be calculated through formula (4), that is, $\Delta T_3*C*m1$, where $\Delta T_3$ is a temperature variation of the battery 4 within a period of time, C is the specific heat capacity of the battery 4, and m1 is the mass of the battery 4. However, because the mass of the battery is generally large, the temperature does not vary obviously in a unit time, and it takes a long time to detect a temperature difference, which does not meet the instantaneity requirement. Therefore, the power P2 is generally calculated according to formula (3).

Affected by the cooling efficiency, P2 can hardly be exactly equal to P1. To make the target time t for cooling the battery 4 more accurate, regulation needs to be performed in real time according to P1 and P2, to ensure that the required power P1 of the battery 4 is equal to the actual power P2 of the battery.

According to an embodiment of the present disclosure, as shown in FIG. 1, in the cooling mode, the controller 6 is further configured to obtain a power difference between the required power P1 and the actual power P2 when the required power P1 is greater than the actual power P2, and increase the cooling power, or increase the rotational speed of the first fan 501, or increase the opening of the first regulating valve 601 according to the power difference; and when the required power P1 is less than or equal to the actual power P2, reduce the cooling power, or reduce the opening of the first regulating valve 601, or reduce the rotational speed of the first fan 501, or keep the cooling power of the in-vehicle air conditioner, the opening of the first regulating valve 601 and the rotational speed of the first fan 501 unchanged.

Specifically, when working in the cooling mode, the controller 6 obtains the required power P1 and the actual power P2 of the battery 4 and makes a judgment. If P1 of the battery 4 is greater than P2, it indicates that cooling of the battery 4 cannot be completed in the target time based on the current cooling power. Therefore, the controller obtains a power difference between the required power P1 and the actual power P2 of the battery 4, and increases the cooling power of the compressor, or increases the rotational speed of the first fan 5, or increases the opening of the first regulating valve 601 according to the power difference, so as to reduce the temperature of the air conditioner vent, increase the amount of the cooling air blown to the heat exchanger 3, thus accelerating heat exchange of the heat exchanger 3. A larger power difference between P1 and P2 indicates a greater increase in the cooling power of the compressor, the rotational speed of the first fan 501, and the opening of the first regulating valve 601, so that the temperature of the battery 4 is decreased to the target temperature within the preset time t. If P1 is less than or equal to P2, the controller may reduce the cooling power of the compressor or reduce the rotational speed of the first fan 501 to save electrical energy, or keep the cooling power of the compressor and the rotational speed of the first fan 501 unchanged. If the temperature of the battery is lower than the first set temperature, for example, 35° C., cooling of the battery 4 is completed, and the controller controls the first regulating valve 601 and the first fan 501 to turn off. If the temperature of the battery 4 is still higher than 35° C. after the temperature regulating system stays in the cooling mode for a long time, for example, one hour, the controller further increases the cooling power of the compressor, increases the rotational speed of the first fan 501, or increases the opening of the first regulating valve appropriately, to complete cooling of the battery 4 as quickly as possible.

As shown in FIG. 1 and FIG. 2, according to an embodiment of the present disclosure, in the heating mode, when the required power P1 is greater than the actual power P2, the controller 6 obtains a temperature difference between the required power P1 and the actual power P2, and increases the heating power of the heater 11 according to the temperature difference, and when the required power P1 is less than or equal to the actual power P2, reduces the heating power of the heater or keeps the heating power of the heater 11 unchanged.

Specifically, when working in the heating mode, the controller obtains the required power P1 and the actual power P2 of the battery 4 and makes a judgment. If P1 of the battery 4 is greater than P2, it indicates that heating of the battery 4 cannot be completed in the target time based on the current heating power. The controller obtains the power difference between the required power P1 and the actual power P2 of the battery 4, and increases the power of the heater 11 according to the power difference, where a greater power difference between P1 and P2 indicates a greater increase in the power of the heater 11, so that the temperature of the battery 4 is increased to the target temperature within the preset time t. If P1 is less than or equal to P2, the heating power of the heater 11 may be reduced to save electrical energy, or the power of the heater 11 is kept unchanged. When the temperature of the battery reaches a second set temperature, for example, 10° C., heating of the battery 4 is completed; the battery management controller 61 sends information of turning off the temperature regulation function to the battery thermal management controller 62 through CAN communication, to control the heater 11 to stop heating. If the temperature of the battery 4 is still lower than 10° C. after the temperature regulating system stays in the heating mode for a long time, for example, two hours, the controller increases the power of the heater 11 appropriately, so that heating of the battery 4 is completed as quickly as possible.

Further, according to an embodiment of the present disclosure, as shown in FIG. 1 and FIG. 2, the controller 6 is further configured to reduce the rotational speed of the pump 12 or keep the rotational speed of the pump 12 unchanged when the required power P1 is less than or equal to the actual power P2, and increase the rotational speed of the pump 12 when the required power P1 is greater than the actual power P2.

Specifically, when the temperature regulating system enters the heating mode or the cooling mode, if P1 of the battery 4 is less than or equal to P2, the controller controls the rotational speed of the pump 12 to reduce, so as to save electrical energy, or keep the rotational speed of the pump 12 unchanged. If P1 of the battery 4 is greater than P2, in addition to controlling the cooling power of the compressor, the rotational speed of the first fan 501, the opening of the first regulating valve 601 or the power of the heater 11 to increase, the controller may further control the rotational speed of the pump 12 to increase, so as to increase the mass of the medium flowing through a cross-sectional area of a cooling flow path per unit time, thereby improving the actual power P2 of the battery 4, to implement temperature regulation within the target time t.

In addition to cooling the battery, the cooling air of the in-vehicle air conditioner 2 may further cool the interior of the compartment.

As shown in FIG. 1 and FIG. 2, a fourth air duct 400 is formed between the air conditioner vent and the compartment, and the in-vehicle air conditioner 2 may further include a second regulating valve 602 and a second fan 502 that are disposed in the fourth air duct 400. The in-vehicle air conditioner 2 exchanges heat with the compartment through the second air duct 200. Moreover, in FIG. 1, after the in-vehicle air conditioner 2 exchanges heat with the semiconductor heat exchange module 5 through the second air duct 200, the semiconductor heat exchange module 5 exchanges heat with the compartment through the third air duct 300; in FIG. 2, after the in-vehicle air conditioner 2 exchanges heat with the semiconductor heat exchange module 5 through the fourth air duct 400, the compartment, and the third air duct 300, the semiconductor heat exchange module 5 exchanges heat with the heat exchanger 3 through the second air duct 200.

Specifically, as shown in FIG. 1 and FIG. 2, the battery cooling branch provides a cooling power for the battery 4 through the heat exchanger 3, and the first regulating valve 601 is configured to control a cooling air inlet volume of the battery cooling branch. The second regulating valve 602 may be configured to control a cooling air inlet volume of an in-vehicle cooling loop. When the battery cooling function is enabled, the battery cooling branch is as follows: air conditioner vent—first regulating valve 601—first fan 401—heat exchanger 3. The in-vehicle cooling branch is as follows: air conditioner vent—second regulating valve 602—second fan 402—compartment.

Optionally, the controller is further configured to obtain a compartment temperature of the compartment, and regulate opening of the first regulating valve 601 and the second regulating valve 602 according to the compartment temperature, the required power P1, and the actual power P2.

In other words, the controller detects the temperature in the compartment, and may regulate power distribution of the cooling loops according to the compartment temperature as well as the required power P1 and the actual power P2 of the battery, thereby balancing cooling requirements of in-vehicle cooling and battery cooling.

Optionally, as shown in FIG. 1 and FIG. 2, the temperature regulating system of an in-vehicle battery further includes a fourth fan 504 connected to the cooling end of the semiconductor heat exchange module 5 and a fifth fan 505 connected to a heating end of the semiconductor heat exchange module 5.

Specifically, the semiconductor heat exchange module 5 is provided with the heating end and the cooling end, and after the power source is reversed, positions of the heating end and the cooling end are exchanged. The heating end and the cooling end of the semiconductor heat exchange module 5 are each installed with a heat exchange fan (the fourth fan 504 and the fifth fan 505), to accelerate heat exchange at the heating end and the cooling end.

As shown in FIG. 3, the controller may further include: a semiconductor controller 64. The semiconductor controller 64 may perform CAN communication with the semiconductor heat exchange module 5, may control the power of the semiconductor heat exchange module 5, and may control rotational speeds of the fourth fan 504 and the fifth fan 505.

After the in-vehicle air conditioner 2 is powered on, if the in-vehicle air conditioner controller 63 receives battery cooling function enabling information sent by the battery management controller 61, the battery cooling function is enabled, and the in-vehicle air conditioner controller 63 sends the battery cooling function enabling information to the battery thermal management controller 62 and the semiconductor controller. The in-vehicle air conditioner controller 63 receives the required power P1 of the battery sent by the battery management controller 61 and forwards the information to the battery thermal management controller 62 and the semiconductor controller 64. In the battery cooling process, the in-vehicle air conditioner controller 63 controls the first regulating valve 601 and the second regulating valve 602 to open, and also controls the first fan 501 and the second fan 502 to start working. The in-vehicle air conditioner controller 63 receives water temperature information and the actual power P2 of the battery that are sent by the battery thermal management controller 62, and forwards the information to the battery management controller 61 and the semiconductor controller 64. In the battery cooling process, the in-vehicle air conditioner controller 63 compares information about the required power P1 of the battery with information about the temperature actual power P2 of the battery. If the required power P1 is less than the temperature actual power P2, it is determined whether the temperature of the battery reaches 45° C. (a relatively high temperature). If the temperature of the battery reaches 45° C., the in-vehicle air conditioner controller 63 reduces the opening of the second regulating valve 602, increases the opening of the first regulating valve 601, reduces an in-vehicle cooling air flow rate, and increases a cooling air flow rate of the battery cooling branch, so as to adjust the distribution of refrigerating capacity between battery cooling and in-vehicle cooling. If the temperature of the battery is not higher than 45° C., it is determined whether the temperature in the compartment reaches a set temperature of the air conditioner. If the set temperature is reached, the in-vehicle air conditioner controller 63 reduces the opening of the second regulating valve 602, and increases the opening of the first regulating valve 601. If the temperature in the compartment does not reach the set temperature of the air conditioner, the refrigerating capacity in the vehicle is satisfied first. In this case, the differential cooling power between the required power for temperature regulation and the actual power for temperature regulation is provided by the semiconductor heat exchange module 5. In the battery cooling process, if the in-vehicle air conditioner controller 63 receives battery cooling completion information sent by the battery management controller 61, that is, if the temperature of the battery reaches 35° C., the in-vehicle air conditioner controller 63 forwards the battery cooling completion information to the battery thermal management controller 62, and battery cooling is completed.

Hierarchical processing is performed on the average temperature of the battery herein, and thresholds for temperature control are set to 40° C., 45° C. and 35° C. respectively. When the battery temperature is higher than 40° C., the battery cooling function is enabled; when the battery temperature reaches 35° C., battery cooling is completed; and when the battery temperature reaches 45° C. or higher, the in-vehicle air conditioner first satisfies the refrigerating capacity of the battery cooling. In addition, when P1 is less than P2, if the battery temperature does not exceed 45° C., the refrigerating capacity of the compartment is still prioritized. If the cooling power in the compartment is already sufficient and a balance is achieved, the in-vehicle air conditioner then increases the battery cooling power.

As shown in FIG. 1, the in-vehicle air conditioner may have 3 cooling branches, including one battery cooling branch and two in-vehicle cooling branches. The first regulating valve 601 may be configured to control a cooling air inlet volume of the battery cooling branch. The second regulating valve 602 may be configured to control a cooling air inlet volume of the in-vehicle cooling loop 1. The third regulating valve 603 may be configured to control a cooling air inlet volume of the in-vehicle cooling loop 2. When the battery cooling function is enabled, the battery cooling branch is as follows: air conditioner vent—first regulating valve 601—first fan 501—heat exchanger 3. The first in-vehicle cooling branch is as follows: air conditioner vent—second regulating valve 602—second fan 502—compartment. The second in-vehicle cooling branch mainly provides cooling air for space inside the compartment through the third fan 503, and the cooling air is first cooled by the semiconductor heat exchange module 5, and flows into the compartment. The second in-vehicle cooling branch is as follows: air conditioner vent—first regulating valve 601—first fan 501—third regulating valve 603—third fan 503—semiconductor heat exchange module 5—compartment. When the battery cooling function is not enabled, the first regulating valve 601 is closed. When the battery cooling function is enabled, the first regulating valve 601 is open. A medium circulation direction in the battery cooling pipe is as follows: heat exchanger 3—heater 11 (turned off)—pump 12—first temperature sensor 14—battery 4—second temperature sensor 15—flow velocity sensor 16—medium container 13—heat exchanger 3. When the battery heating function is enabled, the medium circulation direction in the battery cooling pipe is as follows: heat exchanger 3—heater 11 (turned on)—pump 12—first temperature sensor 14—battery 4—second temperature sensor 15—flow velocity sensor 16—medium container 13—heat exchanger 3. The fourth fan 504 may blow cooling air at the cooling end to the compartment, and the fifth fan may blow air at the heating end to the outside of the vehicle.

In the solution shown in FIG. 1, after the cooling air of the in-vehicle air conditioner 2 passes through the third regulating valve 603 and the third fan 503 and passes through the cooling end of the semiconductor heat exchange module 5 (positive power supply), the temperature is decreased, and then the cooling air is blown back to the compartment, thereby achieving effect of cooling the compartment, and alleviating impact of battery cooling on the in-vehicle cooling of the in-vehicle air conditioner.

In the cooling process, the semiconductor heat exchange module 5 compares the required power P1 and the actual power P2 of the battery. If P1 is less than P2, the cooling power of the semiconductor heat exchange module 5 is increased, and at the same time, the fourth fan 504 and the fifth fan 505 are controlled to work at high rotational speeds, to increase the cooling power of the semiconductor heat exchange module 5. In the battery cooling process, if the semiconductor heat exchange module 5 receives battery cooling completion information from the in-vehicle air conditioner, battery cooling is completed.

In conclusion, in the system shown in FIG. 1, when the temperature regulating system works in the cooling mode, initial power distribution between the battery cooling and the in-vehicle cooling is as follows:

It is assumed that the required power for temperature regulation of the battery is P1, the actual power for temperature regulation of the battery is P2, P3 is a maximum cooling power of the semiconductor heat exchange module, P6 is a required power for in-vehicle cooling, and P7 is a maximum cooling power of the compressor of the in-vehicle air conditioner.

When a sum of the required power P1 and the required power P6 for in-vehicle cooling is less than or equal to the total power P7 of the compressor, that is, $P1+P6 \leq P7$, the compressor runs based on a cooling power of P1+P6. Moreover, P1<P7, and P6<P7. In addition, the opening of the second regulating valve is controlled, so that the in-vehicle cooling power is P6. The opening of the first regulating valve and the opening of the third regulating valve are controlled, so that the battery cooling power is P1.

When $P7<P1+P6 \leq P7+P3$, $Pe=P1+P6-P7$, and $Pf=P1+P6-P3$, the compressor runs based on the maximum cooling power P7, and the semiconductor heat exchange module runs based on a cooling power of Pe. The cooling power of the battery cooling branch is P1, and the power of the in-vehicle cooling branch is equal to P6. Alternatively, the semiconductor ventilation module runs based on the maximum cooling power P3, and the compressor runs based on a cooling power of Pf. In addition, the opening of the first regulating valve is controlled, so that the in-vehicle cooling power is P6, and the opening of the first regulating valve is controlled, so that the battery cooling power is P1.

When P1+P6>P7+P3, it is determined whether the battery temperature is greater than 45° C. If the battery temperature is greater than 45° C., the cooling power is first provided for the battery cooling, the compressor runs based on the maximum cooling power P7, and the semiconductor heat exchange module runs based on the maximum cooling power P3. In addition, the rotational speed of the fan is increased. The opening of the first regulating valve is increased, so that the cooling power of the battery cooling branch is P1, and the opening of the second regulating valve is reduced, so that the power of the in-vehicle cooling branch is equal to P7+P3−P1. If it is determined that the battery temperature is not greater than 45° C., and the in-vehicle temperature has not reached the set temperature yet, the cooling power is first provided for the interior of the compartment, the compressor runs based on the maximum cooling power P7, and the semiconductor heat exchange module runs based on the maximum cooling power P3. In addition, the rotational speed of the fan is increased. The opening of the second regulating valve is increased, so that the cooling power of the in-vehicle cooling branch is P6, and the opening of the second regulating valve is reduced, so that the cooling power of the battery cooling branch is equal to P7+P3−P6. If the in-vehicle temperature has already reached the set temperature, the cooling power of the battery is satisfied first.

The power distribution in the battery cooling process is as follows:

If P1>P2, Pc=P1−P2, and P1+P6+Pc<P7, the cooling power of the compressor is increased by Pc accordingly, and the opening of the first regulating valve is increased, to improve a rotational speed of the pump, so as to improve the battery cooling power.

If P1>P2, Pc=P1−P2, P7<P1+P6+Pc≤P7+P3, Pg=P1+P6+Pc−P7, and Ph=P1+P6+Pc−P3, the compressor runs based on the maximum cooling power P7, and the semiconductor ventilation module runs based on a cooling power of Pg. Alternatively, the compressor runs based on a cooling power of Ph, and the semiconductor ventilation module runs based on the maximum cooling power P3. Alternatively, the compressor runs based on the maximum cooling power P7, and the cooling power of the semiconductor heat exchange module is increased by Pc. Alternatively, the cooling power of the compressor is increased by Pc, and the semiconductor heat exchange module runs based on the maximum cooling power P3. Alternatively, the cooling power of the compressor remains unchanged, and the cooling power of the semiconductor heat exchange module is increased by Pc. Alternatively, the cooling power of the compressor is increased by Pc, and the cooling power of the semiconductor heat exchange module remains unchanged. Alternatively, the cooling power of the compressor is increased by 0.5*Pc, and the cooling power of the semiconductor heat exchange module is increased by 0.5 Pc. Alternatively, the cooling powers of the compressor and the semiconductor heat exchange module are increased proportionally based on a ratio between respective maximum cooling powers. In addition, the opening of the first regulating valve is increased, the rotational speed of the pump is controlled to increase, and the rotational speed of the fan is increased, so that the cooling power of the battery cooling branch is increased by Pc.

If P1>P2, Pc=P1−P2, and P1+P6+Pc>P7+P3, the compressor runs based on the maximum cooling power P7, and the semiconductor heat exchange module runs based on the maximum cooling power P3. In addition, the rotational speed of the fan is increased, and the battery thermal management heat exchange module increases the rotational speed of the pump, so as to improve the heat exchange power. In this case, it is determined whether the battery temperature is greater than 45° C. If the battery temperature is greater than 45° C., the cooling power is first provided for the battery cooling, the compressor runs based on the maximum cooling power P7, and the semiconductor heat exchange module runs based on the maximum cooling power P3. In addition, the rotational speed of the fan is increased. The opening of the first regulating valve is increased, so that the cooling power of the battery cooling branch is P1+Pc, and the opening of the second regulating valve is reduced, so that the power of the in-vehicle cooling branch is equal to P7+P3−P1−Pc. In addition, the rotational speed of the pump is controlled to increase, and the rotational speed of the fan is increased, so that the cooling power of the battery cooling branch is increased by Pc. If it is determined that the battery temperature is not greater than 45° C., and the in-vehicle temperature has not reached the set temperature yet, the cooling power is first provided for the interior of the compartment, the compressor runs based on the maximum cooling power P7, and the semiconductor heat exchange module runs based on the maximum cooling power P3. In addition, the rotational speed of the fan is increased. The opening of the second regulating valve is increased, so that the cooling power of the in-vehicle cooling branch is P6, and the opening of the first regulating valve is reduced, so that the cooling power of the battery cooling branch is equal to P7+P3−P6. If the in-vehicle temperature has already reached the set temperature, the cooling power of the battery is satisfied first.

If P1≤P2 and Pc=P2−P1, the cooling power of the compressor remains unchanged, and the cooling power of the semiconductor remains unchanged; alternatively, the cooling power of the compressor is reduced, and the cooling power of the semiconductor heat exchange module is reduced; alternatively, the opening of the first regulating valve is reduced, or the rotational speed of the pump is reduced, so that the cooling power of the battery cooling branch is decreased by Pc.

When the temperature regulating system works in the heating mode, it is assumed that the required power for temperature regulation of the battery is P1, the actual power for temperature regulation of the battery is P2, P4 is a maximum heating power of the semiconductor heat exchange module, and P5 is a maximum heating power of the heater.

If P1≤P5, the PTC heater provides a heating power for the battery based on the heating power P1.

If P1>P5, P1≤P5+P4, and P1−P5=Pd, the heater provides the heating power for the battery based on the maximum heating power P5, and the semiconductor heat exchange module provides the heating power for the battery based on a heating power of Pd. In addition, the rotational speeds of the fourth fan and the fifth fan are increased, and the battery thermal management heat exchange module increases the rotational speed of the pump, to increase the heat exchange power. If P1>P5, and P1>P5+P4, the PTC heater provides the heating power for battery based on the maximum heating power P5, and the semiconductor heat exchange module provides the heating power for the battery based on the maximum heating power P3. In addition, the rotational speeds of the fourth fan and the fifth fan are increased, and the battery thermal management heat exchange module increases the rotational speed of the pump, to increase the heat exchange power.

In the heating process, if P1≤P2, and Pc=P2−P1, the semiconductor heat exchange module reduces the heating power Pc, and reduces the rotational speeds of the fourth fan and the fifth fan; alternatively, the heating power of the PTC heater is reduced by Pc, and the battery thermal management heat exchange module reduces the rotational speed of the pump, to save electrical energy. Alternatively, the current heating power is kept unchanged.

In the heating process, if P1>P2, Pc=P1−P2, and P1+Pc≤P5, the PTC heater increases the heating power by Pc, and the battery thermal management module controls the pump to increase the rotational speed, so as to increase the heating power of the battery.

If P1>P2, Pc=P1−P2, P5<P1+Pc<P5+P4, Pi=P1+Pc−P5, and Pj=P1+Pc−P4, the PTC heater runs based on the maximum heating power P5, and the semiconductor heat exchange module runs based on a heating power of Pi. Alternatively, the PTC heater runs based on a heating power of Pj, and the semiconductor heat exchange module runs based on the maximum heating power P4. Alternatively, the PTC heater provides the heating power for the battery based on the maximum heating power P5, and the heating power of the semiconductor heat exchange module is increased by Pc. Alternatively, the heating power of the heater remains unchanged, and the heating power of the semiconductor heat exchange module is increased by Pc. Alternatively, the heating power of the heater is increased by Pc, and the heating power of the semiconductor heat exchange module remains unchanged. Alternatively, the heating power of the PTC heater is increased by 0.5*Pc, and the heating power of the semiconductor heat exchange module is increased by 0.5 Pc. Alternatively, the heating powers of the PTC heater and the semiconductor heat exchange module are increased proportionally based on a ratio between respective maximum heating powers. In addition, the rotational speeds of the fourth fan and the fifth fan are increased, and the battery thermal management heat exchange module increases the rotational speed of the pump, so as to increase the heat exchange power, so that the heating power of the battery is increased by Pc.

If P1>P2, Pc=P1−P2, and P1+Pc>P5+P4, the PTC heater provides the heating power for the battery based on the maximum heating power P5, and the semiconductor heat exchange module provides the heating power for the battery based on the maximum heating power P4. In addition, the rotational speeds of the fourth fan and the fifth fan are increased, and the battery thermal management heat exchange module increases the rotational speed of the pump, to increase the heat exchange power.

The main difference between FIG. 2 and FIG. 1 is that, there are two battery cooling branches and one in-vehicle cooling branch in the solution shown in FIG. 2. The first battery cooling branch is as follows: air conditioner vent—first regulating valve 601—first fan 501—heat exchanger 3. The second battery cooling branch is as follows: compartment—semiconductor heat exchange module 5—third fan 503—third regulating valve 603—first fan 501—heat exchanger 3. The in-vehicle cooling branch is as follows: air conditioner vent—second regulating valve 602—second fan 502—compartment. The cooling air of the second battery cooling branch comes from the cooling air in the compartment. After being cooled by the cooling end of the semiconductor heat exchange module 5, the cooling air in the compartment is provided to the heat exchanger 3 after passing through the third fan 503, the third regulating valve 603, and the first fan 501.

Figure 4:
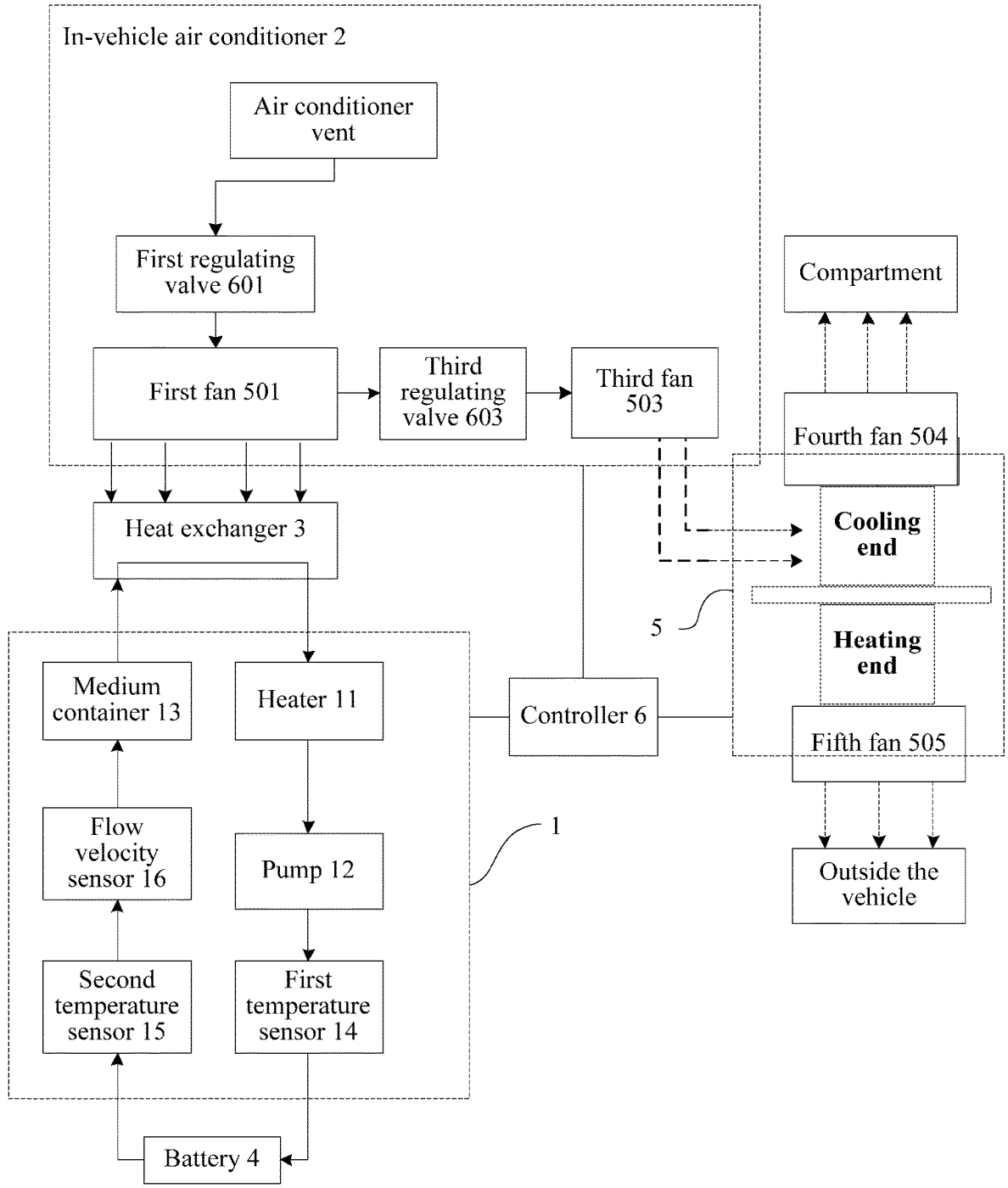
FIG. 4 is a first schematic structural diagram of a temperature regulating system of an in-vehicle battery according to a second embodiment of the present disclosure.
Figure 5:
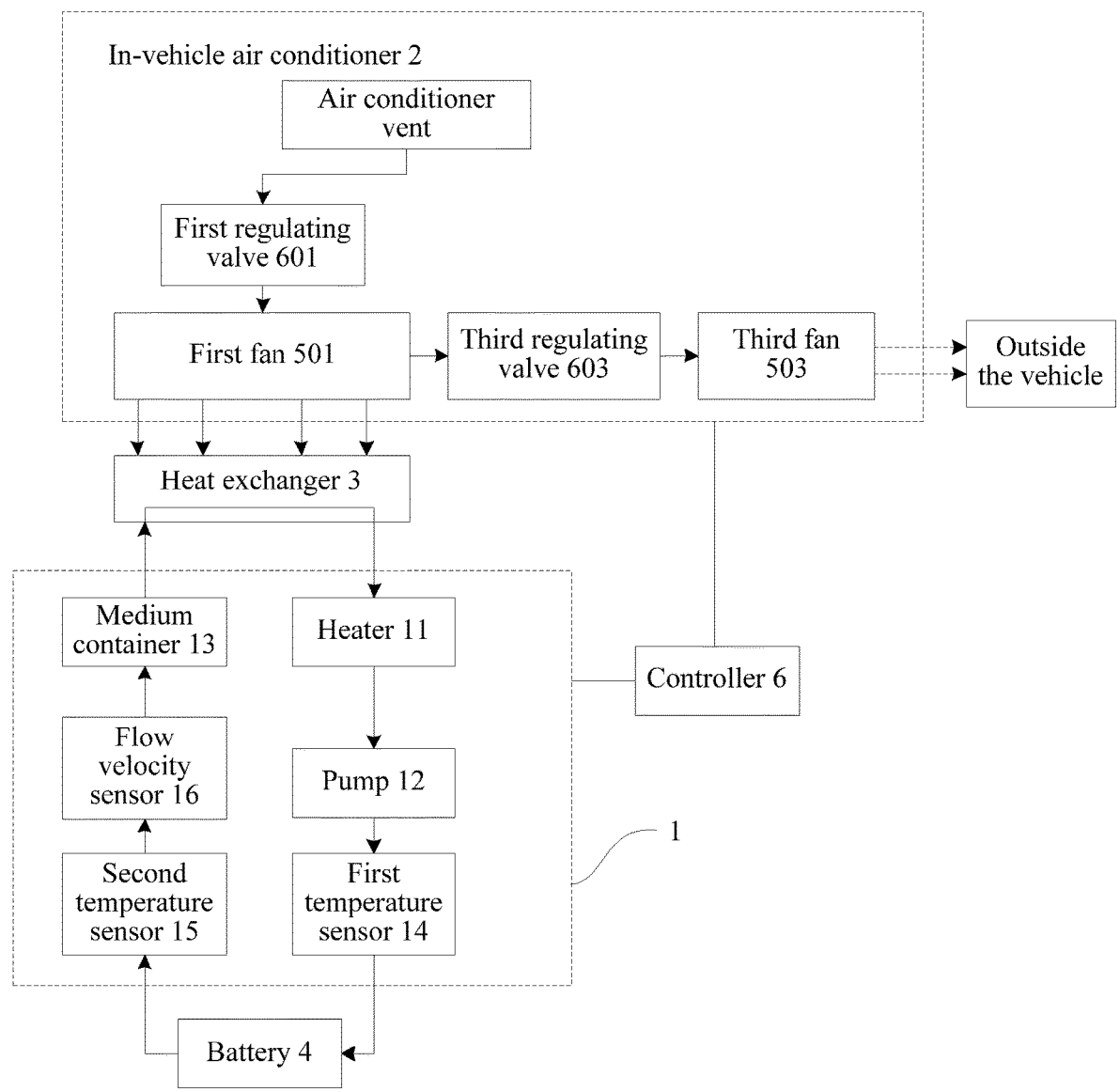
FIG. 5 is a second schematic structural diagram of a temperature regulating system of an in-vehicle battery according to a second embodiment of the present disclosure.

As shown in FIG. 4-3b, the present disclosure further provides a temperature regulating system. Compared with FIG. 1, the solution shown in FIG. 4-3b is a schematic diagram of a cooling branch when in-vehicle cooling is not turned on in 4. Because there is no requirement for turning on cooling in the vehicle, it may be determined, according to the condition of the in-vehicle temperature, whether the cooling air for battery cooling needs to be recycled to the compartment through the semiconductor heat exchange module 5 or discharged to the outside of the vehicle. If the battery cooling air needs to be recycled, according to the solution shown in FIG. 4, the battery cooling air is blown back to the compartment after passing through the third regulating valve 603 and the third fan 503 and then passing through the cooling end of the semiconductor heat exchange module 5, to cool the compartment. If the battery cooling air does not need to be recycled, according to the solution shown in FIG. 5, the battery cooling air is directly discharged to the outside of the vehicle through the third regulating valve 603 and the third fan 503.

Figure 6:
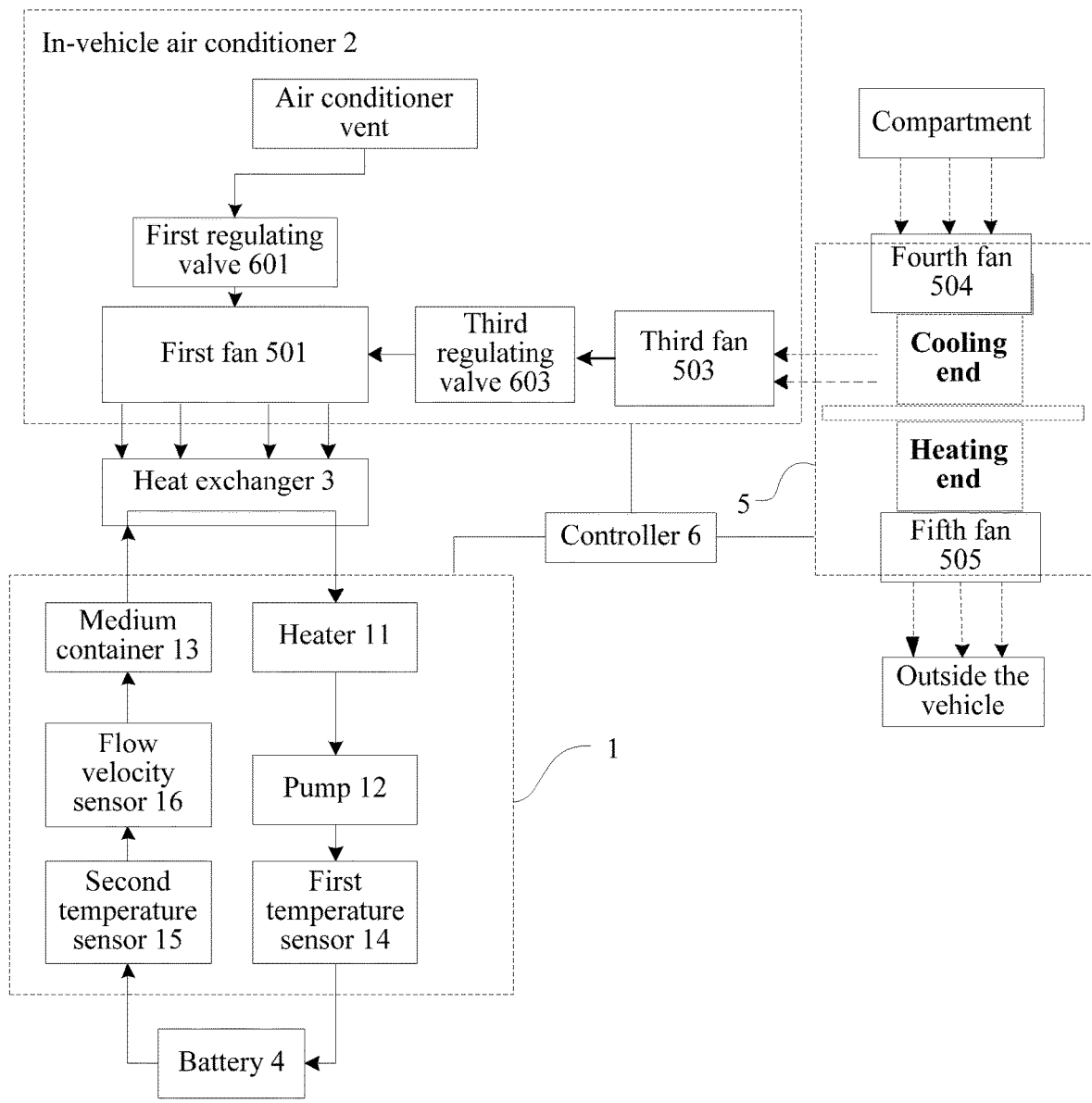
FIG. 6 is a schematic structural diagram of a temperature regulating system of an in-vehicle battery according to a third embodiment of the present disclosure.

FIG. 6 shows another temperature regulating system. Compared with FIG. 2, the solution shown in FIG. 6 is a schematic diagram of a cooling branch when in-vehicle cooling is not turned on in FIG. 2. In this case, there are two battery cooling branches. The first battery cooling branch is as follows: air conditioner vent—first regulating valve 601—first fan 501—heat exchanger 3. The second battery cooling branch is as follows: compartment—semiconductor heat exchange module 5—third fan 503—third regulating valve 603—first fan 501—heat exchanger 3.

As shown in FIG. 6, if the semiconductor controller 64 receives battery cooling function enabling information sent by the in-vehicle air conditioner controller 63, the battery cooling function is enabled, and the semiconductor controller 64 sends the battery cooling function enabling information to the battery thermal management controller 62. The semiconductor controller 64 receives the required power P1 of the battery sent by the in-vehicle air conditioner. The semiconductor controller 64 receives water temperature information and the actual power P2 of the battery that are sent by the battery thermal management controller 62. In the process of enabling the battery cooling function, the semiconductor heat exchange module 5 supplies power positively, so that the semiconductor heat exchange module 5 stays in a cooling operation state. Air in the vehicle is blown to the cooling end through the fourth fan 504, so that the air temperature is decreased. The cooling power of the semiconductor heat exchange module 5 is determined according to a difference between the required power P1 and the actual power P2. When the cooling function of the semiconductor heat exchange module is enabled, the fourth fan 504 and the fifth fan 505 start working.

Figure 7:
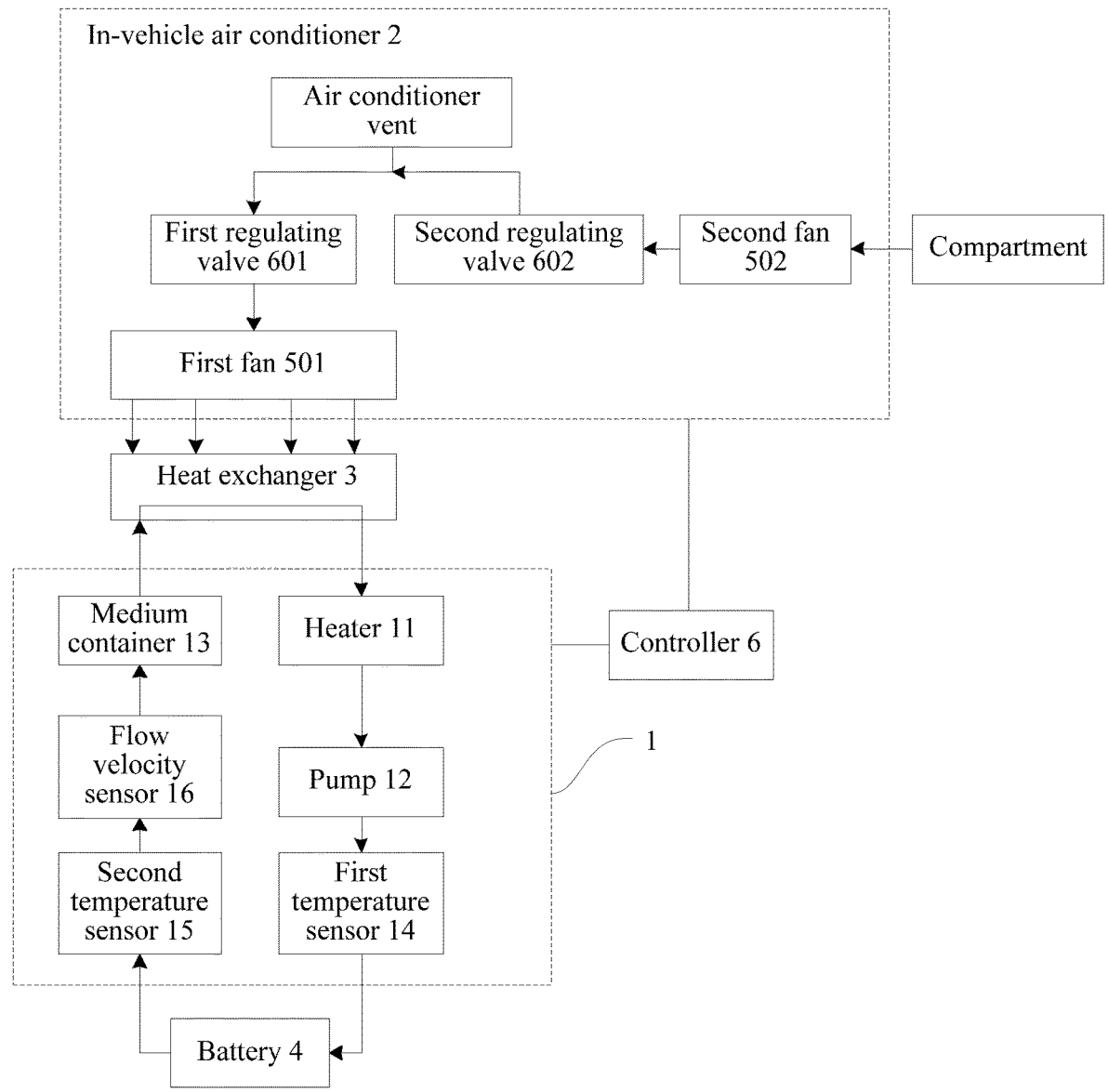
FIG. 7 is a schematic structural diagram of a temperature regulating system of an in-vehicle battery according to a fourth embodiment of the present disclosure.

FIG. 7 shows another temperature regulating system of an in-vehicle battery, and compared with FIG. 1, the biggest difference is that neither the in-vehicle air conditioner 2 nor the semiconductor heat exchange module 5 works. This solution is applicable to the case of relatively low ambient temperature in the vehicle/outside the vehicle. External cooling air is blown to the heat exchanger 3 through the second fan 502—the second regulating valve 602—the first regulating valve 601—the first fan 501, to provide a cooling power for the battery 4.

Figure 8:
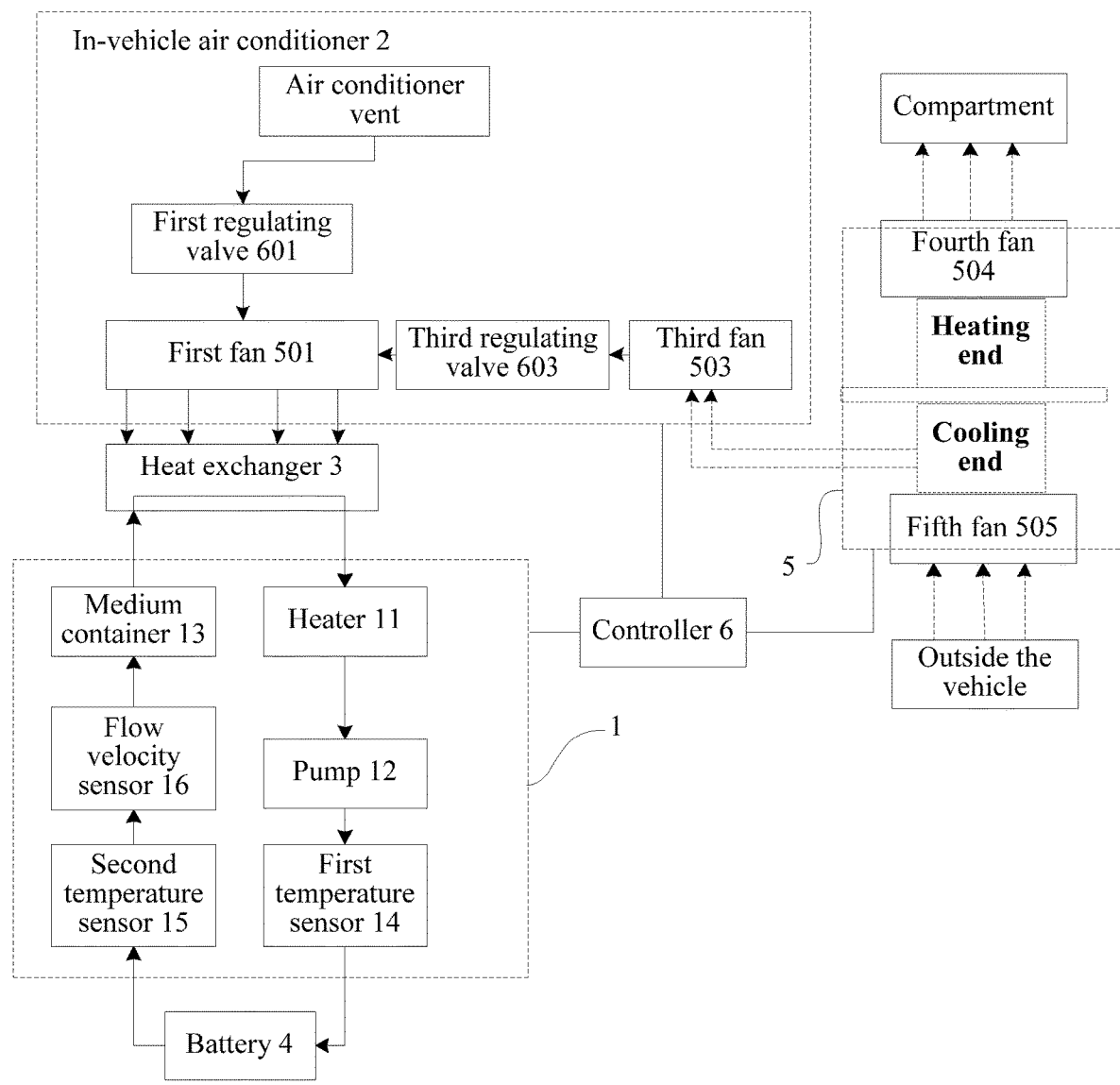
FIG. 8 is a schematic structural diagram of a temperature regulating system of an in-vehicle battery according to a fifth embodiment of the present disclosure.

In addition, the present disclosure further provides a temperature regulating system of an in-vehicle battery. As shown in FIG. 8, the temperature regulating system of an in-vehicle battery may further include a fourth fan 504 connected to the cooling end of the semiconductor heat exchange module 5, where the fourth fan 504 is connected to a fourth vent of the compartment, and a fifth fan 505 connected to the heating end of the semiconductor heat exchange module 5, where the fifth fan 505 is connected to a fifth vent outside the vehicle.

Specifically, compared with FIG. 1, the solution shown in FIG. 8 is applicable to the working condition with a low ambient temperature and a high battery heating amount. In this case, there are two battery cooling branches. The first battery cooling branch is as follows: air conditioner vent—first regulating valve 601—first fan 501—heat exchanger 3. The second battery cooling branch is as follows: outside the vehicle—cooling end—third fan 503—third regulating valve 603—first fan 501—heat exchanger 3. In addition, there is an in-vehicle heating branch. Air in the compartment is blown into the compartment after being heated by the heating end of the semiconductor heat exchange module 5, so that the temperature in the compartment rises.

In addition, when the temperature regulating system of an in-vehicle battery works in the heating mode, in addition to providing the heating power through the heater 11, the system may also provide the heating power through the semiconductor heat exchange module 5. Specifically, as shown in FIG. 9, the third fan 503 is connected to the heating end of the semiconductor heat exchange module 5.

If the semiconductor controller 64 receives battery heating function enabling information sent by the in-vehicle air conditioner controller 63, the battery heating function is enabled, and the semiconductor controller sends the battery heating function enabling information to the in-vehicle air conditioner controller 63 and the battery thermal management controller 62. The semiconductor controller 64 receives the required power P1 of the battery sent by the in-vehicle air conditioner 63. The semiconductor controller 64 receives water temperature information and an actual power P2 for temperature regulation of the battery that are sent by the battery thermal management controller 62. In the process of enabling the battery heating function, the semiconductor heat exchange module 5 supplies power reversely, so that the semiconductor heat exchange module 5 stays in a heating operation state. Air in the vehicle is blown to the heating end through the fourth fan 504, so that the air temperature rises. The heating power of the semiconductor heat exchange module 5 is determined according to a difference between the required power P1 and the actual power P2 of the battery, that is, the heating power of the semiconductor heat exchange module 5 is equal to P1−P2. When the heating function of the semiconductor heat exchange module 5 is enabled, the fourth fan 504 and the fifth fan 505 start working.

Figure 9:
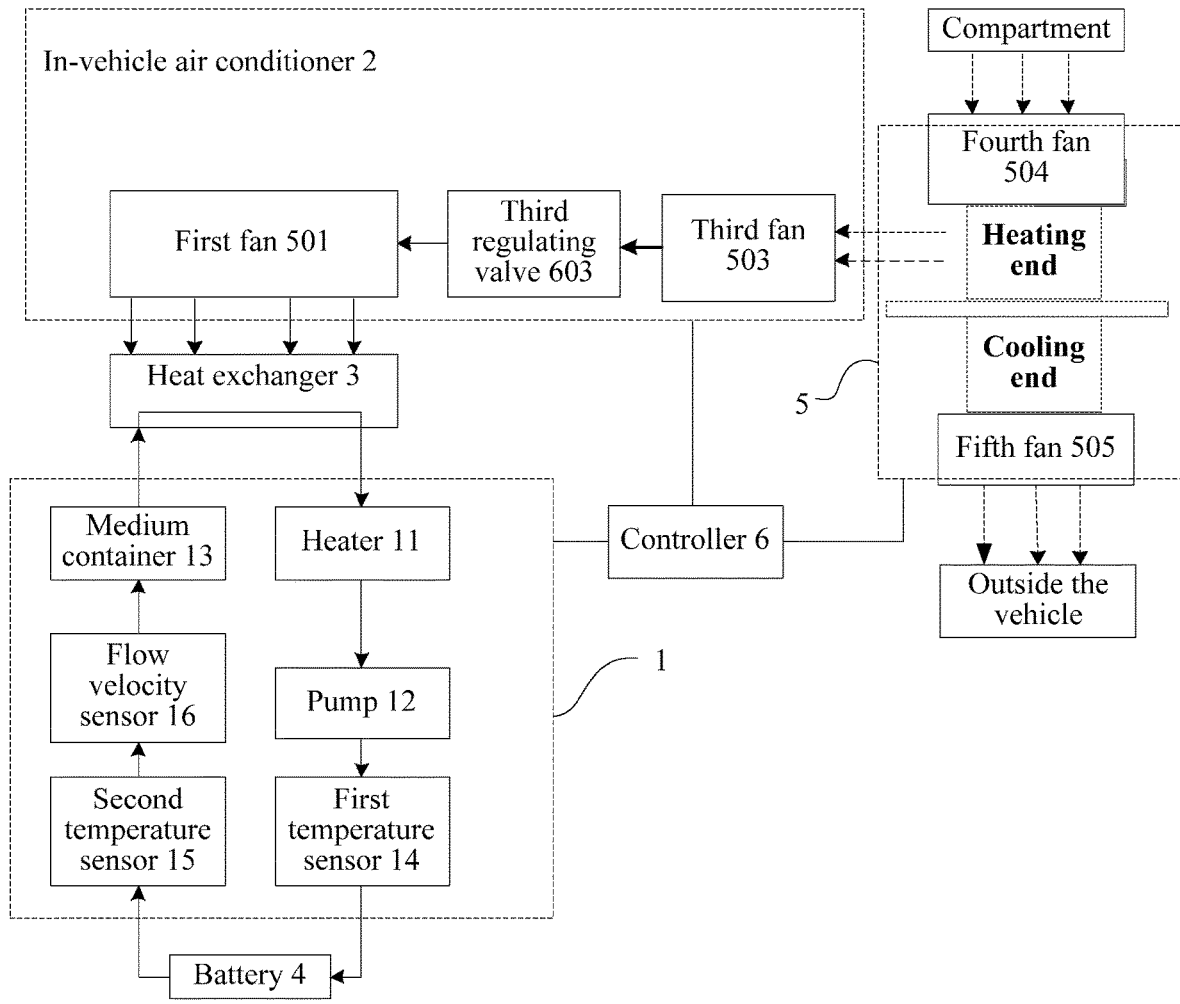
FIG. 9 is a schematic structural diagram of a temperature regulating system of an in-vehicle battery according to a sixth embodiment of the present disclosure.

As shown in FIG. 9, in the heating process of the semiconductor heat exchange module 5, the controller compares information about the required power P1 and information about the actual power P2 of the battery. If P1 is less than P2, the heating power of the semiconductor heat exchange module 5 is increased, and at the same time, the fourth fan 504 and the fifth fan 505 are controlled to work at high rotational speeds, to increase the heating power of the semiconductor heat exchange module. In the battery heating process, if the semiconductor controller 64 receives battery heating completion information from the in-vehicle air conditioner 63, battery heating is completed.

The temperature regulating system of an in-vehicle battery according to the embodiment of the present disclosure can precisely control the heating power and cooling power of the in-vehicle battery according to an actual state of the in-vehicle battery, and regulate the temperature when the temperature of the in-vehicle battery is excessively high or excessively low, so that the temperature of the in-vehicle battery is maintained in a preset range, thereby avoiding the situation that the performance of the in-vehicle battery is affected by the temperature.

Figure 10:
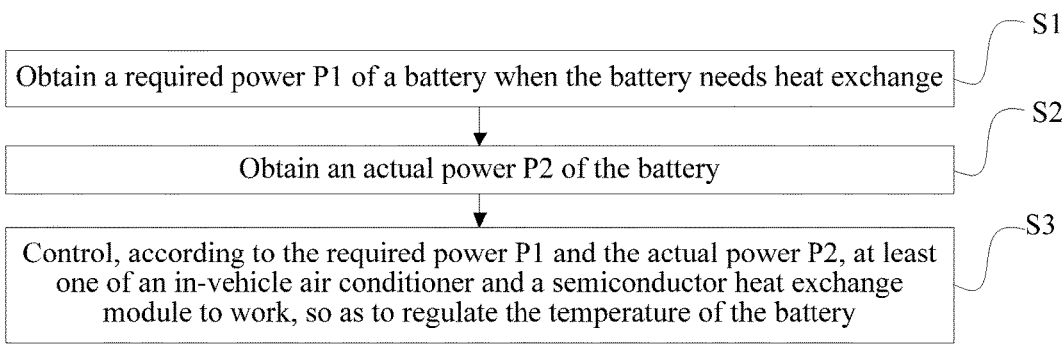
FIG. 10 is a flowchart of a temperature regulating method of an in-vehicle battery according to a first embodiment of the present disclosure.

FIG. 10 is a flowchart of a temperature regulating method of an in-vehicle battery according to a first embodiment of the present disclosure. As shown in FIG. 1 to FIG. 2, the temperature regulating system of an in-vehicle battery includes: a heat exchanger; an in-vehicle air conditioner, where the in-vehicle air conditioner is provided with an air conditioner vent, and a first air duct is formed between the air conditioner vent and the heat exchanger; a semiconductor heat exchange module, where a second air duct is formed between a cooling end of the semiconductor heat exchange module and the first fan, and a third air duct is formed between the cooling end of the semiconductor heat exchange module and a compartment; a battery thermal management module, where the battery thermal management module is connected to the heat exchanger to form a heat exchange flow path; and a controller, connected to the semiconductor heat exchange module, the battery thermal management module, and the in-vehicle air conditioner. As shown in FIG. 10, the temperature regulating method of an in-vehicle battery includes the following steps:

S1. Obtain a required power P1 of a battery when heat exchange needs to be performed on the battery.

Optionally, in the embodiment of the present disclosure, the obtaining a required power for temperature regulation of the battery by a battery management controller 61 specifically includes: obtaining, by the battery management controller 61, a first parameter of the battery when temperature regulation is started, and generating a first required power according to the first parameter; Obtaining, by the battery management controller 61, a second parameter of the battery during temperature regulation, and generating a second required power according to the second parameter; and generating the required power P1 by the battery management controller 61 according to the first required power and the second required power.

Optionally, according to an embodiment of the present disclosure, the first parameter is an initial temperature when temperature regulation of the battery is started, a target temperature, and a target time t it takes to reach the target temperature from the initial temperature. The generating a first required power by the battery management controller 61 according to the first parameter specifically includes: obtaining, by the battery management controller 61, a first temperature difference $\Delta T_1$ between the initial temperature and the target temperature; and generating first required power P1 according to the first temperature difference $\Delta T_1$ and the target time t.

Optionally, according to an embodiment of the present disclosure, the battery management controller 61 generates the first required power according to the following formula (1):

$$\Delta T_1 * C * M / t \qquad (1)$$

where $\Delta T_1$ is the first temperature difference between the initial temperature and the target temperature, t is the target time, C is the specific heat capacity of the battery, and M is the mass of the battery.

According to an embodiment of the present disclosure, the second parameter is an average current I of the battery in a preset time, and the second required power is generated through the following formula (2):

$$I^2 * R \qquad (2)$$

where I is the average current, and R is the internal resistance of the battery.

S2. Obtain an actual power P2 of the battery.

According to an embodiment of the present disclosure, the obtaining, by the battery thermal management controller 62, an actual power for temperature regulation of the battery specifically includes: obtaining, by the battery thermal management controller 62, an inlet temperature and an outlet temperature of a flow path for regulating the battery temperature, obtaining a flow velocity v of a cooling liquid flowing into the flow path, generating a second temperature difference $\Delta T_2$ according to the inlet temperature and the outlet temperature, and generating the actual power P2 according to the second temperature difference $\Delta T_2$ and the flow velocity v.

Optionally, according to an embodiment of the present disclosure, the actual power P2 is generated through the following formula (3):

$$\Delta T_2 * c * m \qquad (3)$$

where $\Delta T_2$ is the second temperature difference, c is the specific heat capacity of the battery, m is a mass of the cooling liquid flowing through a cross-sectional area of the flow path per unit time, where m=v*ρ*s, v is the flow velocity of the cooling liquid, ρ is the density of the cooling liquid, and s is the cross-sectional area of the flow path.

In addition, the flow velocity sensor may also be replaced with a flow sensor; m=Q*ρ, where Q is the amount of the cooling liquid flowing through the cross-sectional area of the flow path per unit time detected by the flow sensor.

S3. Control, according to the required power P1 and the actual power P2, at least one of an in-vehicle air conditioner and a semiconductor heat exchange module to work, to regulate the temperature of the battery.

In the embodiment of the present disclosure, the temperature of the battery is regulated within the target time according to the required power P1 and the actual power P2, so as to reach the target temperature.

Specifically, after the vehicle is powered on, it is determined, by the battery management controller 61, whether temperature regulation needs to be performed on the battery. When the temperature of the battery is relatively high, for example, higher than 40° C., the temperature regulating system of an in-vehicle battery enters a cooling mode. As shown in FIG. 1 and FIG. 2, the in-vehicle air conditioner and the battery thermal management module work; the controller controls the first regulating valve to open; the first fan blows cooling air of the in-vehicle air conditioner to the heat exchanger, to cool the medium in the cooling pipe of the heat exchanger, and the medium then cools the battery through the battery thermal management module. When the temperature regulating system of an in-vehicle battery works in the cooling mode, the flow direction of the cooling air is as follows: air conditioner vent—first regulating valve—first fan—heat exchanger; and the flow direction of the medium is as follows: heat exchanger—battery thermal management module—battery—battery thermal management module—heat exchanger. Moreover, when the battery is cooled, as shown in FIG. 2, the controller may also control the semiconductor heat exchange module to work; the third fan blows a cooling power of the cooling end of the semiconductor to the first fan; the first fan blows air to the heat exchanger, to cool the medium in the cooling pipe of the heat exchanger, and then the medium cools the battery through the battery thermal management module.

In the battery cooling process, the initial temperature (that is, the current temperature) and the target temperature of the battery, and the target time t it takes to reach the target temperature from the initial temperature may further be obtained by the battery thermal management controller 61, where the target temperature and the target time t may be preset according to an actual condition of the in-vehicle battery, and then the first required power is calculated according to formula (1). At the same time, the battery thermal management controller 61 obtains the average current I of the battery in the preset time, and calculates the second required power according to formula (2). Then, the required power P1 (that is, a power required for regulating the temperature of the battery to the target temperature) is calculated according to the first required power and the second required power. Moreover, the battery thermal management controller 62 obtains the inlet temperature and the outlet temperature of the battery, obtains flow velocity information, and calculates the actual power P2 according to formula (3). Finally, the controller regulates powers of the in-vehicle air conditioner and the semiconductor heat exchange module according to the required power P1 and the actual power P2, so as to regulate the temperature of the battery. Therefore, the control method can precisely control the time required for temperature regulation of the battery, and the actual power for temperature regulation of the battery is adjustable in real time, thereby ensuring that temperature regulation of the in-vehicle battery is completed within the target time, so that the temperature of the in-vehicle battery is maintained in the preset range, thus avoiding the situation that the performance of the in-vehicle battery is affected by the temperature.

It can be understood that a battery 4 refers to an energy storage device that is installed on a vehicle, provides power output for the vehicle, provides electricity for other electric devices on the vehicle, and can be charged repeatedly.

Specifically, as shown in FIG. 1, the in-vehicle air conditioner may provide a cooling power for the battery, and may perform CAN communication with the battery thermal management module. The in-vehicle air conditioner also controls turn-on or turn-off of the first regulating valve, and may adjust the opening of the first regulating valve. The first fan is controlled by the in-vehicle air conditioner, and has an adjustable air speed.

The required power P1 is a temperature regulating power required by the battery when the temperature of the battery is regulated to the target temperature. The actual power P2 is a temperature regulating power actually obtained by the battery when temperature regulation is performed on the battery currently. The target temperature is a set value, and may be preset according to an actual condition of the in-vehicle battery. For example, in winter when the outdoor ambient temperature is low, the battery needs to be heated, and the target temperature may be set to about 10° C.; in summer, the battery needs to be cooled, and the target temperature may be set to about 35° C.

When the temperature of the battery is relatively high, for example, higher than 40° C., the temperature regulating system of an in-vehicle battery enters a cooling mode. The in-vehicle air conditioner and the battery thermal management module work; the in-vehicle air conditioner controls the first regulating valve to open; the first fan blows cooling air of the in-vehicle air conditioner to the heat exchanger, to cool the medium in the cooling pipe of the heat exchanger, and the medium then cools the battery through the battery thermal management module.

When the battery is cooled, the initial temperature (that is, the current temperature) and the target temperature of the battery, and the target time t it takes to reach the target temperature from the initial temperature are obtained by the battery thermal management controller 61, where the target temperature and the target time t may be preset according to an actual condition, and the first required power is calculated according to formula (1). At the same time, the battery thermal management controller 61 obtains the average current I of the battery in the preset time, and calculates the second required power of the battery according to formula (2). Then, the battery management controller 61 calculates the required power P1 (that is, a power required for regulating the temperature of the battery to the target temperature) of the battery according to the first required power and the second required power. Moreover, the battery thermal management controller 62 obtains the inlet temperature and the outlet temperature of the battery, obtains flow velocity information, and calculates the actual power P2 of the battery according to formula (3). The required power P1 is a power that needs to be provided for the battery when the temperature of the battery is regulated to the set target temperature, and the actual power P2 is an actual power obtained by the battery currently when temperature regulation is performed on the battery. The target temperature is a set value, and may be preset according to an actual condition of the in-vehicle battery. For example, when the battery is cooled, the target temperature may be set to about 35° C. Then, the controller regulates the power of the first fan and the opening of the first regulating valve according to the required power P1 and the actual power P2. For example, if P1 is greater than P2, the controller increases the cooling power of the compressor, and increases the rotational speed of the first fan and the opening of the first regulating valve, to increase the actual power for temperature regulation of the battery, so that the temperature of the battery 4 is decreased as quickly as possible. Therefore, the temperature may be regulated when the temperature of the in-vehicle battery is excessively high, so that the temperature of the in-vehicle battery is maintained in a preset range, thereby avoiding the situation that the performance of the in-vehicle battery is affected by the temperature.

According to an embodiment of the present disclosure, as shown in FIG. 1 and FIG. 2, the battery thermal management module includes a pump, a first temperature sensor, a second temperature sensor, and a flow velocity sensor that are disposed on the heat exchange flow path. The pump is configured to cause a medium in the heat exchange flow path to flow. The first temperature sensor is configured to detect an inlet temperature of a medium that flows into the in-vehicle battery. The second temperature sensor is configured to detect an outlet temperature of the medium that flows out of the in-vehicle battery. The flow velocity sensor is configured to detect a flow velocity of the medium that flows in the heat exchange flow path.

Optionally, as shown in FIG. 1 and FIG. 2, the battery thermal management module may further include a medium container disposed on the heat exchange flow path, and the medium container is configured to store a medium and provide the medium for the heat exchange flow path.

Optionally, as shown in FIG. 1 and FIG. 2, the battery thermal management module may further include a heater disposed on the heat exchange flow path, and the heater is configured to heat the medium in the heat exchange flow path.

Specifically, in addition to cooling the battery through the in-vehicle air conditioner and the heat exchanger, the temperature regulating system of an in-vehicle battery may further heat the medium through the heater, to perform temperature regulation on the battery when the battery temperature is relatively low. The heater may be a PTC heater; the heater is not in direct contact with the battery, and has high safety, reliability, and practicability. The pump is mainly configured to provide dynamic. The medium container is mainly configured to store the medium and accept the medium added to the temperature regulating system. When the medium in the temperature regulating system reduces, the medium in the medium container may provide a supplement automatically. The first temperature sensor is configured to detect the temperature of the medium at the inlet of the battery flow path, and the second temperature sensor is configured to detect the temperature of the medium at the outlet of the battery flow path. The flow velocity sensor is configured to detect flow velocity information of the medium in the pipe of the temperature regulating system.

Figure 11:
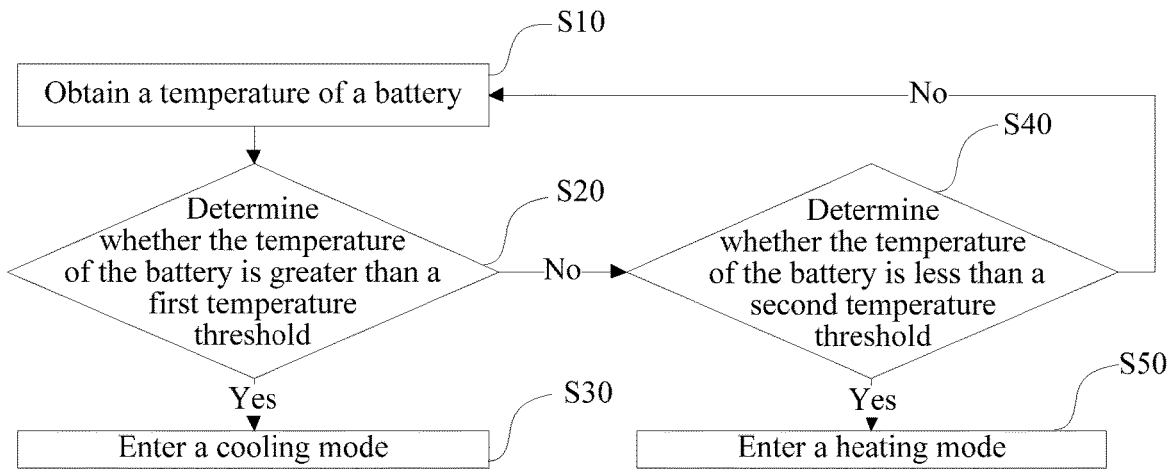
FIG. 11 is a flowchart of a temperature regulating method of an in-vehicle battery according to a second embodiment of the present disclosure.

According to an embodiment of the present disclosure, as shown in FIG. 11, the foregoing temperature regulating method may further include: The battery management controller 61 obtains the temperature of the battery, and determines whether the temperature of the battery is greater than a first temperature threshold (S10-S20); when the temperature of the battery is greater than the first temperature threshold, the battery management controller 61 controls the temperature regulating system to enter a cooling mode (S30); when the temperature of the battery is less than or equal to the first temperature threshold, the battery management controller 61 continues to determine whether the temperature of the battery is less than a second temperature threshold (S40); when the temperature of the battery is less than the second temperature threshold, the battery management controller 61 controls the temperature regulating system to enter a heating mode (S50), where the first temperature threshold is greater than the second temperature threshold. The first temperature threshold and the second temperature threshold may be preset according to the actual condition, for example, the first temperature threshold may be 40° C., and the second temperature threshold may be 0° C.

Specifically, after the vehicle is powered on, the battery management controller 61 obtains the temperature of the battery in real time, and makes a judgment. If the temperature of the battery is higher than 40° C., it indicates that the temperature of the battery is excessively high at this moment, and to prevent the high temperature from affecting the performance of the battery, the temperature of the battery needs to be decreased. The battery management controller 61 controls the temperature regulating system to enter the cooling mode. The in-vehicle air conditioner controller 63 controls the first regulating valve to open; the first fan blows the cooling air of the in-vehicle air conditioner to the heat exchanger, to cool the medium in the cooling pipe of the heat exchanger; and then the medium cools the battery through the battery thermal management module.

If the temperature of the battery is lower than 0° C., it indicates that the temperature of the battery is excessively low at this moment, and to prevent the low temperature from affecting the performance of the battery, the temperature of the battery needs to be increased. The battery management controller 61 controls the temperature regulating system to enter the heating mode, and the battery thermal management controller 62 controls the heater to turn on. At the same time, the in-vehicle air conditioner keeps the first regulating valve in a closed state, and the heater heats the medium in the cooling pipe, so that the medium exchanges heat with the battery, to complete temperature regulation of the battery.

Further, according to an embodiment of the present disclosure, as shown in FIG. 1 and FIG. 2, the in-vehicle air conditioner includes a first regulating valve disposed in the first air duct and a first fan corresponding to the heat exchanger. In the cooling mode, the foregoing method may further include: determining whether the required power P1 is greater than the actual power P2; if the required power P1 is greater than the actual power P2, obtaining a power difference between the required power P1 and the actual power P2, increasing the cooling power of the compressor according to the power difference, and increasing the rotational speed of the first fan or increasing the opening of the first regulating valve; if the required power P1 is less than or equal to the actual power P2, reducing the cooling power of the compressor, reducing the rotational speed of the first fan, and reducing the opening of the first regulating valve, or keeping the cooling power of the compressor, the rotational speed of the first fan, and the opening of the first regulating valve unchanged.

Specifically, in the system shown in FIG. 1 and FIG. 2, when the temperature regulating system works in the cooling mode, the controller obtains the required power P1 and the actual power P2 of the battery and makes a judgment. If P1 of the battery is greater than P2, it indicates that cooling of the battery cannot be completed in the target time based on the current cooling power. Therefore, the controller obtains a power difference between the required power P1 and the actual power P2 of the battery 4, and the in-vehicle air conditioner controller 63 increases the cooling power of the compressor, increases the rotational speed of the first fan, and increases the opening of the first regulating valve according to the power difference, so as to increase the amount of the cooling air blown to the heat exchanger, thus accelerating heat exchange of the heat exchanger. A larger power difference between P1 and P2 indicates a greater increase in the cooling power of the compressor, the rotational speed of the first fan, and the opening of the first regulating valve, so that the temperature of the battery is decreased to the target temperature within the preset time t. If P1 is less than or equal to P2, the in-vehicle air conditioner controller 63 may reduce the cooling power of the compressor or reduce the rotational speed of the first fan to save electrical energy, or keep the cooling power of the compressor and the rotational speed of the first fan unchanged. When the temperature of the battery is lower than 35° C., battery cooling is completed, and the battery management controller 61 sends information of disabling the temperature regulation function to the in-vehicle air conditioner through CAN communication. The in-vehicle air conditioner controller 63 controls the first regulating valve and the first fan to turn off. If the temperature of the battery is still higher than 35° C. after the temperature regulating system stays in the cooling mode for a long time, for example, one hour, the in-vehicle air conditioner controller 63 further increases the cooling power of the compressor, increases the rotational speed of the first fan, or increases the opening of the first regulating valve appropriately, to complete cooling of the battery as quickly as possible.

According to an embodiment of the present disclosure, in the heating mode, the foregoing method may further include: determining whether the required power P1 is greater than the actual power P2; if the required power P1 is greater than the actual power P2, obtaining a temperature difference between the required power P1 and the actual power P2, and increasing, according to the temperature difference, the power of the heater for heating the battery; if the required power P1 is less than or equal to the actual power P2, reducing the power of the heater or keeping the power of the heater unchanged.

Specifically, when the temperature regulating system works in the heating mode, the controller obtains the required power P1 and the actual power P2 of the battery and makes a judgment. If P1 of the battery is greater than P2, it indicates that heating of the battery cannot be completed in the target time based on the current heating power. The controller obtains the power difference between the required power P1 and the actual power P2 of the battery, and the battery thermal management controller 62 increases the power of the heater according to the power difference, where a greater power difference between P1 and P2 indicates a greater increase in the power of the heater 11, so that the temperature of the battery is increased to the target temperature within the preset time t. If P1 is less than or equal to P2, the battery thermal management controller 62 may reduce the heating power of the heater to save electrical energy, or keep the power of the heater unchanged. When the temperature of the battery reaches 10° C., battery heating is completed, and the battery thermal management controller 62 controls the heater to stop heating. If the temperature of the battery is still lower than 10° C. after the temperature regulating system stays in the heating mode for a long time, for example, hours, the battery thermal management controller 62 increases the power of the heater appropriately, so that heating of the battery is completed as quickly as possible.

Further, according to an embodiment of the present disclosure, as shown in FIG. 1 and FIG. 2, the foregoing method may further include: reducing the rotational speed of the pump or keep the rotational speed of the pump unchanged when the required power P1 is less than or equal to the actual power P2, and increasing the rotational speed of the pump when the required power P1 is greater than the actual power P2.

Specifically, when the temperature regulating system enters the heating mode or the cooling mode, if P1 of the battery is less than or equal to P2, the battery thermal management controller 62 controls the rotational speed of the pump to reduce, so as to save electrical energy, or keep the rotational speed of the pump unchanged. If P1 of the battery is greater than P2, in addition to controlling, by the in-vehicle air conditioner controller 63, the cooling power of the compressor, the rotational speed of the first fan, and the opening of the first regulating valve to increase or controlling, by the battery thermal management controller 62, the power of the heater to increase, it is also possible to control, by the battery thermal management controller 62, the rotational speed of the pump to increase, so as to increase the mass of the medium flowing through a cross-sectional area of a cooling flow path per unit time, thereby improving the actual power P2 of the battery, to implement temperature regulation within the target time t.

According to an embodiment of the present disclosure, as shown in FIG. 1 and FIG. 2, a fourth air duct is formed between the air conditioner vent and the compartment, and the in-vehicle air conditioner includes a second regulating valve and a second fan disposed in the fourth air duct. The method further includes: obtaining a compartment temperature of the compartment, and regulating the opening of the first regulating valve and the second regulating valve according to the compartment temperature, the required power P1, and the actual power P2.

Optionally, the regulating the opening of the first regulating valve and the second regulating valve according to the compartment temperature, the required power P1, and the actual power P2 includes: determining whether the required power P1 is less than the actual power P2; if the required power P1 is less than the actual power P2, determining whether the temperature of the battery is greater than a first preset temperature threshold; if the temperature of the battery is greater than the first preset temperature threshold, reducing the opening of the second regulating valve, and increasing the opening of the first regulating valve. The first preset temperature threshold may be preset according to an actual condition, and may be, for example, 45° C.

Optionally, if the temperature of the battery is less than the first preset temperature threshold, it is further determined whether the temperature in the compartment reaches a set temperature of the air conditioner; if the temperature in the compartment does not reach the set temperature of the air conditioner, the opening of the second regulating valve is increased, and the opening of the first regulating valve is reduced; if the temperature in the compartment reaches the set temperature of the air conditioner, the opening of the second regulating valve is reduced, and the opening of the first regulating valve is increased.

Specifically, as shown in FIG. 1 and FIG. 2, the battery cooling branch provides a cooling power for the battery through the heat exchanger, and the first regulating valve is configured to control a cooling air inlet volume of the battery cooling branch. The second regulating valve may be configured to control a cooling air inlet volume of an in-vehicle cooling loop. When the battery cooling function is enabled, the battery cooling branch is as follows: air conditioner vent—first regulating valve—first fan—heat exchanger. The in-vehicle cooling branch is as follows: air conditioner vent—second regulating valve—second fan—compartment.

In other words, the temperature in the compartment is detected, and distribution of the cooling loops is regulated according to the compartment temperature as well as the required power P1 and the actual power P2 of the battery, thereby balancing cooling requirements of in-vehicle cooling and battery cooling.

According to an embodiment of the present disclosure, as shown in FIG. 1 and FIG. 2, the semiconductor heat exchange module further includes a third fan and a third regulating valve that are disposed in the second air duct and that are disposed corresponding to the cooling end of the semiconductor heat exchange module. The semiconductor heat exchange module is provided with a heating end and a cooling end. The third fan corresponds to the cooling end of the semiconductor heat exchange module.

Optionally, according to an embodiment of the present disclosure, as shown in FIG. 1 and FIG. 2, the temperature regulating system of an in-vehicle battery may further include:

a fourth fan connected to the cooling end of the semiconductor heat exchange module, where the fourth fan 504 is connected to a fourth vent of the compartment; and a fifth fan connected to the heating end of the semiconductor heat exchange module.

Specifically, the semiconductor heat exchange module is provided with the heating end and the cooling end, and after the power source is reversed, positions of the heating end and the cooling end are exchanged. The heating end and the cooling end of the semiconductor heat exchange module are each installed with a heat exchange fan (the fourth fan and the fifth fan), to accelerate heat exchange at the heating end and the cooling end. An increase in the rotational speed of the heat exchange fan can increase the cooling power of the semiconductor heat exchange module.

After the battery cooling function is enabled, the battery management controller 61 obtains the required power P1 of the battery. In the battery cooling process, the in-vehicle air conditioner controller 63 controls the first regulating valve and the second regulating valve to open, and also controls the first fan and the second fan to start working. Moreover, the battery thermal management controller 62 obtains the actual power P2 of the battery. In the battery cooling process, information about the required power P1 of the battery is compared with information about the temperature actual power P2 of the battery. If the required power P1 is less than the temperature actual power P2, it is determined whether the temperature of the battery reaches 45° C. (a relatively high temperature). If the temperature of the battery reaches 45° C., the in-vehicle air conditioner controller 63 reduces the opening of the second regulating valve, increases the opening of the first regulating valve, reduces an in-vehicle cooling air flow rate, and increases a cooling air flow rate of the battery cooling branch, so as to adjust the distribution of refrigerating capacity between battery cooling and in-vehicle cooling. If the temperature of the battery is not higher than 45° C., it is determined whether the temperature in the compartment reaches a set temperature of the air conditioner. If the set temperature is reached, the in-vehicle air conditioner controller 63 reduces the opening of the second regulating valve, and increases the opening of the first regulating valve. If the temperature in the compartment does not reach the set temperature of the air conditioner, the refrigerating capacity in the vehicle is satisfied first. In this case, the differential cooling power between the required power for temperature regulation and the actual power for temperature regulation is provided by the semiconductor heat exchange module. In the battery cooling process, if the temperature of the battery reaches 35° C., the in-vehicle air conditioner forwards the battery cooling completion information to the battery thermal management controller 62, and battery cooling is completed.

Hierarchical processing is performed on the average temperature of the battery herein, and thresholds for temperature control are set to 40° C., 45° C. and 35° C. respectively. When the battery temperature is higher than 40° C., the battery cooling function is enabled; when the battery temperature reaches 35° C., battery cooling is completed; and when the battery temperature reaches 45° C. or higher, the in-vehicle air conditioner first satisfies the refrigerating capacity of the battery cooling. In addition, when P1 is less than P2, if the battery temperature does not exceed 45° C., the refrigerating capacity of the compartment is still prioritized. If the cooling power in the compartment is already sufficient and a balance is achieved, the in-vehicle air conditioner then increases the battery cooling power.

As shown in FIG. 1, the in-vehicle air conditioner may have 3 cooling branches, including one battery cooling branch and two in-vehicle cooling branches. The first regulating valve may be configured to control a cooling air inlet volume of the battery cooling branch. The second regulating valve may be configured to control a cooling air inlet volume of the first in-vehicle cooling loop. The third regulating valve may be configured to control a cooling air inlet volume of the second in-vehicle cooling loop. When the battery cooling function is enabled, the battery cooling branch is as follows: air conditioner vent—first regulating valve—first fan—heat exchanger. The first in-vehicle cooling loop is as follows: air conditioner vent—second regulating valve—second fan—compartment. The second in-vehicle cooling branch loop mainly provides cooling air for space inside the compartment through the third fan, and the cooling air is first cooled by the semiconductor heat exchange module, and flows into the compartment. The second in-vehicle cooling loop is as follows: air conditioner vent—first regulating valve—first fan—third regulating valve—third fan—semiconductor heat exchange module—compartment. When the battery cooling function is not enabled, the first regulating valve is closed. When the battery cooling function is enabled, the first regulating valve is open. A medium circulation direction in the battery cooling pipe is as follows: heat exchanger—heater (turned off)—pump—first temperature sensor—battery—second temperature sensor—flow velocity sensor—medium container—heat exchanger. When the battery heating function is enabled, the medium circulation direction in the battery cooling pipe is as follows: heat exchanger—heater (open)—pump—first temperature sensor—battery—second temperature sensor—flow velocity sensor—medium container—heat exchanger. The fourth fan may blow cooling air at the cooling end to the compartment, and the fifth fan may blow air at the heating end to the outside of the vehicle.

In the solution shown in FIG. 1, after the cooling air of the in-vehicle air conditioner passes through the third regulating valve and the third fan and passes through the cooling end of the semiconductor heat exchange module (positive power supply), the temperature is decreased, and then the cooling air is blown back to the compartment, thereby achieving effect of cooling the compartment, and alleviating impact of battery cooling on the in-vehicle cooling of the in-vehicle air conditioner.

In the cooling process, the required power P1 and the actual power P2 of the battery are compared. If P1 is less than P2, the cooling power of the semiconductor heat exchange module 5 is increased, and at the same time, the fourth fan and the fifth fan are controlled to work at high rotational speeds, to increase the cooling power of the semiconductor heat exchange module. In the battery cooling process, if the semiconductor heat exchange module receives battery cooling completion information from the in-vehicle air conditioner, battery cooling is completed.

The main difference between FIG. 2 and FIG. 1 is that, there are two battery cooling branches and one in-vehicle cooling branch in the solution shown in FIG. 2. The first battery cooling branch is as follows: air conditioner vent—first regulating valve—first fan—heat exchanger. The second battery cooling branch is as follows: compartment—semiconductor heat exchange module—third fan—third regulating valve—first fan—heat exchanger. The in-vehicle cooling branch is as follows: air conditioner vent—second regulating valve—second fan—compartment. The cooling air of the second battery cooling branch comes from the cooling air in the compartment. After being cooled by the cooling end of the semiconductor heat exchange module, the cooling air in the compartment is provided to the heat exchanger after passing through the third fan, the third regulating valve, and the first fan.

According to an embodiment of the present disclosure, as shown in FIG. 8, the temperature regulating system of an in-vehicle battery further includes: a fourth fan connected to the heating end of the semiconductor heat exchange module, where the fourth fan is connected to a fourth vent of the compartment; and a fifth fan connected to the cooling end of the semiconductor heat exchange module, where the fifth fan is connected to a fifth vent outside the vehicle.

Specifically, compared with FIG. 1, the solution shown in FIG. 8 is applicable to the working condition with a low ambient temperature and a high battery heating amount. In this case, there are two battery cooling branches. The first battery cooling branch is as follows: air conditioner vent—first regulating valve—first fan—heat exchanger. The second battery cooling branch is as follows: outside the vehicle—cooling end—third fan—third regulating valve—first fan—heat exchanger 3. In addition, there is an in-vehicle heating loop. Air in the compartment is blown into the compartment after being heated by the heating end of the semiconductor heat exchange module, so that the temperature in the compartment rises.

In addition, when the temperature regulating system of an in-vehicle battery works in the heating mode, in addition to providing the heating power through the heater, the system may also provide the heating power through the semiconductor heat exchange module. Specifically, as shown in FIG. 9, the third fan is connected to the heating end of the semiconductor heat exchange module.

In the process of enabling the battery heating function, the semiconductor heat exchange module supplies power reversely, so that the semiconductor heat exchange module stays in a heating operation state. Air in the vehicle is blown to the heating end through the fourth fan, so that the air temperature rises. The heating power of the semiconductor heat exchange module is determined according to the difference between the required power P1 and the actual power P2 of the battery, that is, the heating power of the semiconductor heat exchange module is equal to P1–P2. When the heating function of the semiconductor heat exchange module is enabled, the fourth fan and the fifth fan start working.

As shown in FIG. 9, in the heating process of the semiconductor heat exchange module, the semiconductor heat exchange module compares information about the required power P1 and information about the actual power P2 of the battery. If P1 is less than P2, the heating power of the semiconductor heat exchange module is increased, and at the same time, the fourth fan and the fifth fan are controlled to work at high rotational speeds, to increase the heating power of the semiconductor heat exchange module. In the battery heating process, if the semiconductor heat exchange module receives battery heating completion information from the in-vehicle air conditioner, battery heating is completed.

In temperature regulating method of an in-vehicle battery according to the embodiment of the present disclosure, the heating power and cooling power of each battery may be precisely controlled according to an actual state of each battery, and the temperature is regulated when the temperature of the battery is excessively high or excessively low, so that the temperature of the battery is maintained in a preset range, thereby avoiding the situation that the performance of the in-vehicle battery is affected by the temperature.

An embodiment of the present disclosure further provides a non-temporary computer readable storage medium, which stores a computer program. When executed by a processor, the program implements the foregoing temperature regulating method.

According to the non-temporary computer readable storage medium in the embodiment of the present disclosure, when a battery needs heat exchange, a required power for temperature regulation and an actual power for temperature regulation of the battery are obtained, and the temperature of the battery is regulated according to the required power for temperature regulation and the actual power for temperature regulation, to regulate the temperature of the battery when the temperature of the in-vehicle battery is excessively high, so that the temperature of the in-vehicle battery is maintained in a preset range, thereby avoiding the situation that the performance of the in-vehicle battery is affected by the temperature.

Figure 12:
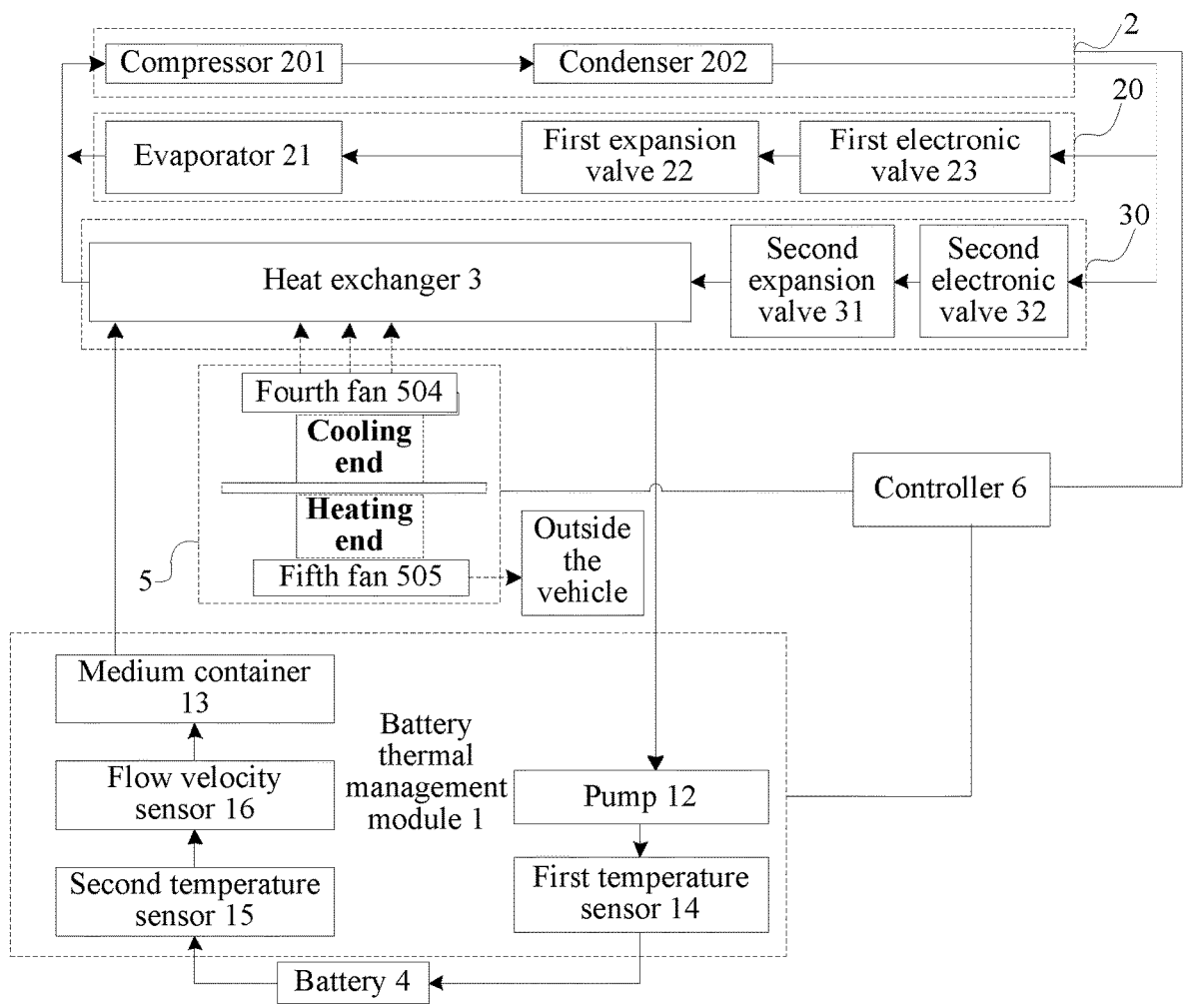
FIG. 12 is a first schematic structural diagram of a temperature regulating system of an in-vehicle battery according to a seventh embodiment of the present disclosure.
Figure 13:
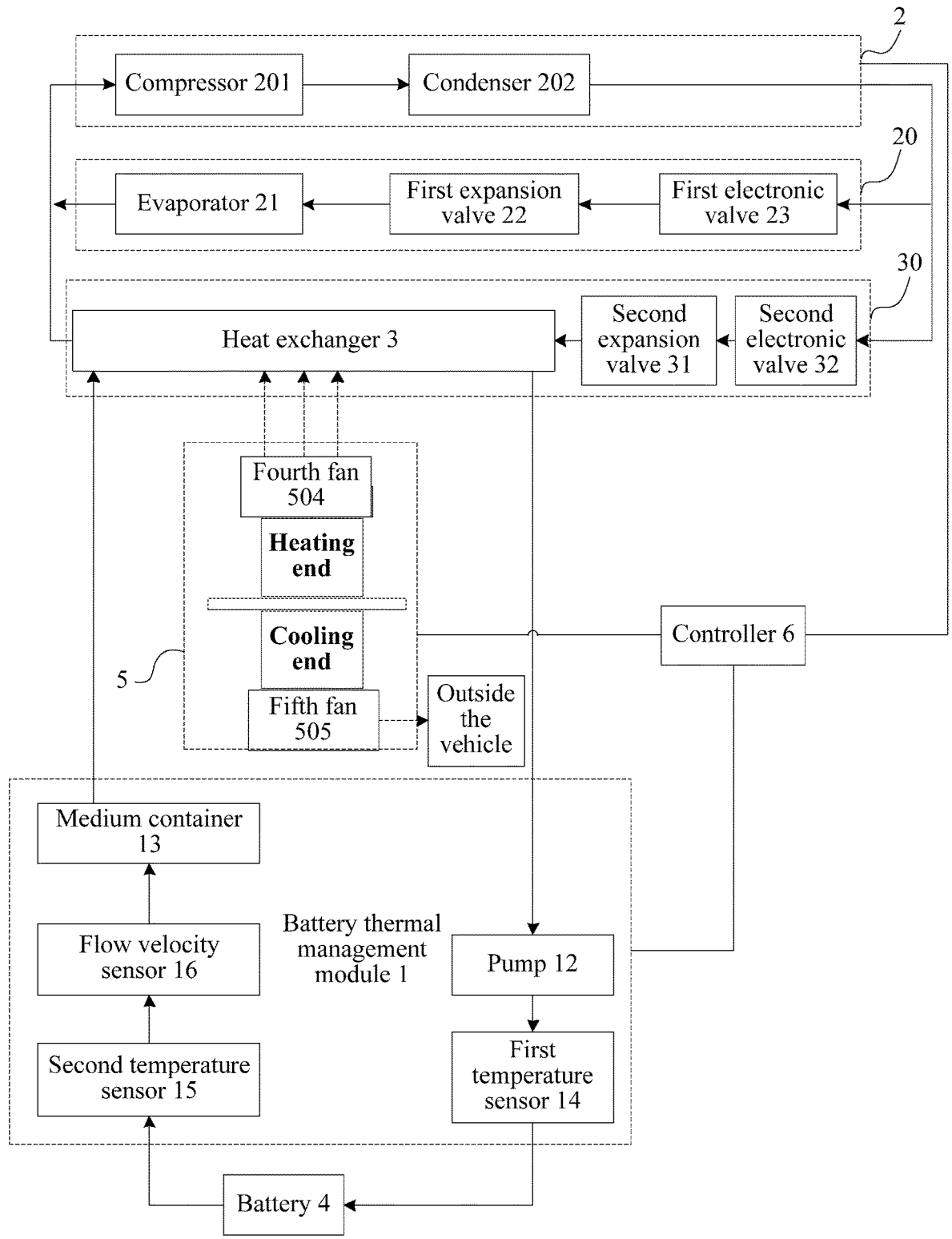
FIG. 13 is a second schematic structural diagram of a temperature regulating system of an in-vehicle battery according to a seventh embodiment of the present disclosure.

FIG. 12 and FIG. 13 are schematic structural diagrams of a temperature regulating system of an in-vehicle battery according to a seventh embodiment of the present disclosure. As shown in FIG. 12 and FIG. 13, the temperature regulating system of an in-vehicle battery includes: a battery thermal management module 1, a semiconductor heat exchange module 5, a battery cooling branch 30, an in-vehicle air conditioner 2, an in-vehicle cooling branch 20, and a controller 6.

The battery cooling branch 30 includes a heat exchanger 3. The semiconductor heat exchange module 5 is configured to refrigerating the heat exchanger 3. The battery thermal management module 1 is connected to the battery 4 and the heat exchanger 3. The battery thermal management module 1 is connected to the battery 4 and the heat exchanger 3. The in-vehicle air conditioner 2 includes a compressor 201 and a condenser 202. The in-vehicle cooling branch 20 is connected to the compressor 201 and the heat exchanger 3. The controller is configured to obtain a required power P1 and an actual power P2 of the battery, and controls, according to the required power P1 and the actual power P2, the semiconductor heat exchange module 5 and/or the in-vehicle air conditioner 2 to regulate the temperature of the battery.

Specifically, the semiconductor heat exchange module 5 is provided with a heating end and a cooling end, and after the power source is reversed, positions of the heating end and the cooling end are exchanged. The heating end and the cooling end of the semiconductor heat exchange module 5 are each installed with a heat exchange fan (the fourth fan 504 and the fifth fan 505), to accelerate heat exchange at the heating end and the cooling end. An increase in the rotational speed of the heat exchange fan can increase the cooling/heating power of the semiconductor heat exchange module 5. FIG. 12 shows that the power source of the semiconductor heat exchange module is normally connected, and FIG. 13 shows that the power source of the semiconductor heat exchange module is reversely connected.

When the temperature of the battery 4 is relatively high, for example, higher than 40° C., the temperature regulating system of an in-vehicle battery enters a cooling mode. The battery thermal management module 1 and the battery thermal management module 5 work. The battery thermal management module 5 supplies power positively. The cooling end starts refrigeration, and the fourth fan 504 blows cooling air to the heat exchanger, to cool a medium in a cooling pipe of the heat exchanger 3, and the medium then cools the battery through the battery thermal management module 1. Meanwhile, the fifth fan 505 blows heat at the heating end to the outside of the vehicle.

When the temperature of the battery is relatively low, for example, lower than 0° C., the temperature regulating system of an in-vehicle battery enters a heating mode. The battery thermal management module 1 and the battery thermal management module 5 work. The battery thermal management module 5 supplies power reversely. The heating end of the semiconductor starts heating, and the fourth fan 504 blows heating air to the heat exchanger 3, to cool the medium in the cooling pipe of the heat exchanger 3, and the medium then cools the battery through the battery thermal management module 1. Meanwhile, the fifth fan 505 blows cold air at the cooling end to the outside of the vehicle.

As shown in FIG. 12 and FIG. 13, the in-vehicle air conditioner 2 forms a refrigerating branch. For example, the refrigerating branch includes a compressor 201 and a condenser 202 in series connection; an evaporator 21, a first expansion valve 22, and a first electronic valve 23 form the in-vehicle cooling branch 20; the heat exchanger 3, a second expansion valve 31, and a second electronic valve 32 form the battery cooling branch 30.

The heat exchanger 3 may be a plate heat exchanger, and may be physically located in the loop where the compressor 201 of the in-vehicle air conditioner is located, to facilitate factory commissioning of the in-vehicle air conditioner, so that the in-vehicle air conditioner can be supplied and assembled independently. Moreover, the medium only needs to be injected once during the installation process of the in-vehicle air conditioner. The heat exchanger 11 may also be physically located in the battery thermal management module 1.

Inside the in-vehicle air conditioner, two independent cooling branches are divided starting from the condenser 202, which are the in-vehicle cooling branch 20 and the battery cooling branch 30 respectively. The in-vehicle cooling branch 20 mainly provides the cooling power for space in the compartment through the evaporator 21, and the battery cooling branch mainly provides the cooling power for the battery 4 through the heat exchanger 3. There are mainly two sources for the cooling power of the battery cooling branch, where one source is that the refrigerant of the compressor 201 flows into the heat exchanger 3 to provide the cooling power for the heat exchanger 3, and the other is that the cooling end of the semiconductor heat exchange module 5 blows cooling air to the heat exchanger 3 through the fourth fan 504, to provide the cooling power for the heat exchanger.

The first electronic valve 23 and the second electronic valve 32 are respectively configured to control opening and closing of the in-vehicle cooling branch 20 and the battery cooling branch 30. The first expansion valve 22 and the second expansion valve 31 may be respectively configured to control refrigerant flow rates of the in-vehicle cooling branch 20 and the battery cooling branch 30, to control the cooling powers of the in-vehicle cooling branch 20 and the battery cooling branch 30 respectively.

When the cooling function of the battery 4 is enabled, the refrigerant flows along two directions. The in-vehicle cooling branch 20 is as follows: compressor 201—condenser 202—first electronic valve 23—first expansion valve 22—evaporator 21—compressor 201; and the battery cooling branch 30 is as follows: compressor 201—condenser 202—second electronic valve 32—second expansion valve 31—heat exchanger 3—compressor 201. In addition, the semiconductor heat exchange module 5 cools the cooling air in the compartment through the cooling end of the semiconductor heat exchanger, and then blows the cooling air to the heat exchanger 3 through the fourth fan 504. When the battery cooling function is not enabled, the second electronic valve 32 is closed. When the battery cooling function is enabled, the second electronic valve 32 is open. If refrigeration is not required in the vehicle at this moment, the first electronic valve 32 is closed. If the battery cooling function is not enabled, the semiconductor heat exchange module is not electrified. As shown in FIG. 12, after the vehicle is powered on, the controller 6 obtains the temperature of the battery in real time, and makes a judgment. If the temperature of the battery is higher than 40° C., it indicates that the temperature of the battery 4 is excessively high at this moment, and to prevent the high temperature from affecting the performance of the battery 4, the temperature of the battery 4 needs to be decreased. The temperature regulating system enters the cooling mode. The controller controls the second electronic valve to open, and controls the semiconductor heat exchange module 5 to supply power positively. When the battery is cooled, the first electronic valve is open, and the flow direction of the refrigerant is as follows: compressor 201—condenser 202—second electronic valve 32—second expansion valve 31—heat exchanger 3; and the flow direction of the medium is as follows: heat exchanger 3—heater 11 (turned off)—pump 12—first temperature sensor 14—battery 4—second temperature sensor 15—flow velocity sensor 16—medium container 13—heat exchanger 3.

As shown in FIG. 13, if the temperature of the battery 4 is lower than 0° C., it indicates that the temperature of the battery 4 is excessively low at this moment, and to prevent the low temperature from affecting the performance of the battery 4, the temperature of the battery 4 needs to be increased. The temperature regulating system enters the heating mode. The second electronic valve 32 is in a closed state, and the semiconductor heat exchange module 5 supplies power reversely.

When the battery 4 is cooled or heated, the controller 6 further obtains the required power P1 and the actual power P2 of the battery in real time, where the required power P1 is a power that needs to be provided for the battery 4 when the temperature of the battery is regulated to the set target temperature, and the actual power P2 is an actual regulating power obtained by the battery 4 currently when temperature regulation is performed on the battery. The target temperature is a set value, and may be preset according to an actual condition of the in-vehicle battery. For example, when the battery is cooled, the target temperature may be set to about 35° C. When the battery is heated, the target temperature may be set to about 10° C. Moreover, the controller regulates the power of the semiconductor heat exchange module 5 or the compressor according to the required power P1 and the actual power P2. For example, when the battery is cooled, if P1 is greater than P2, the power of the semiconductor heat exchange module 5 is increased, and the rotational speeds of the fourth fan 504 and the fifth fan 505 are controlled to increase, or the power of the compressor 201 is controlled to increase, so that cooling of the battery 4 is completed as quickly as possible. Therefore, the temperature regulating system can regulate the temperature when the temperature of the in-vehicle battery is excessively high or excessively low, so that the temperature of the in-vehicle battery is maintained in a preset range, thereby avoiding the situation that the performance of the in-vehicle battery is affected by the temperature.

Figure 14:
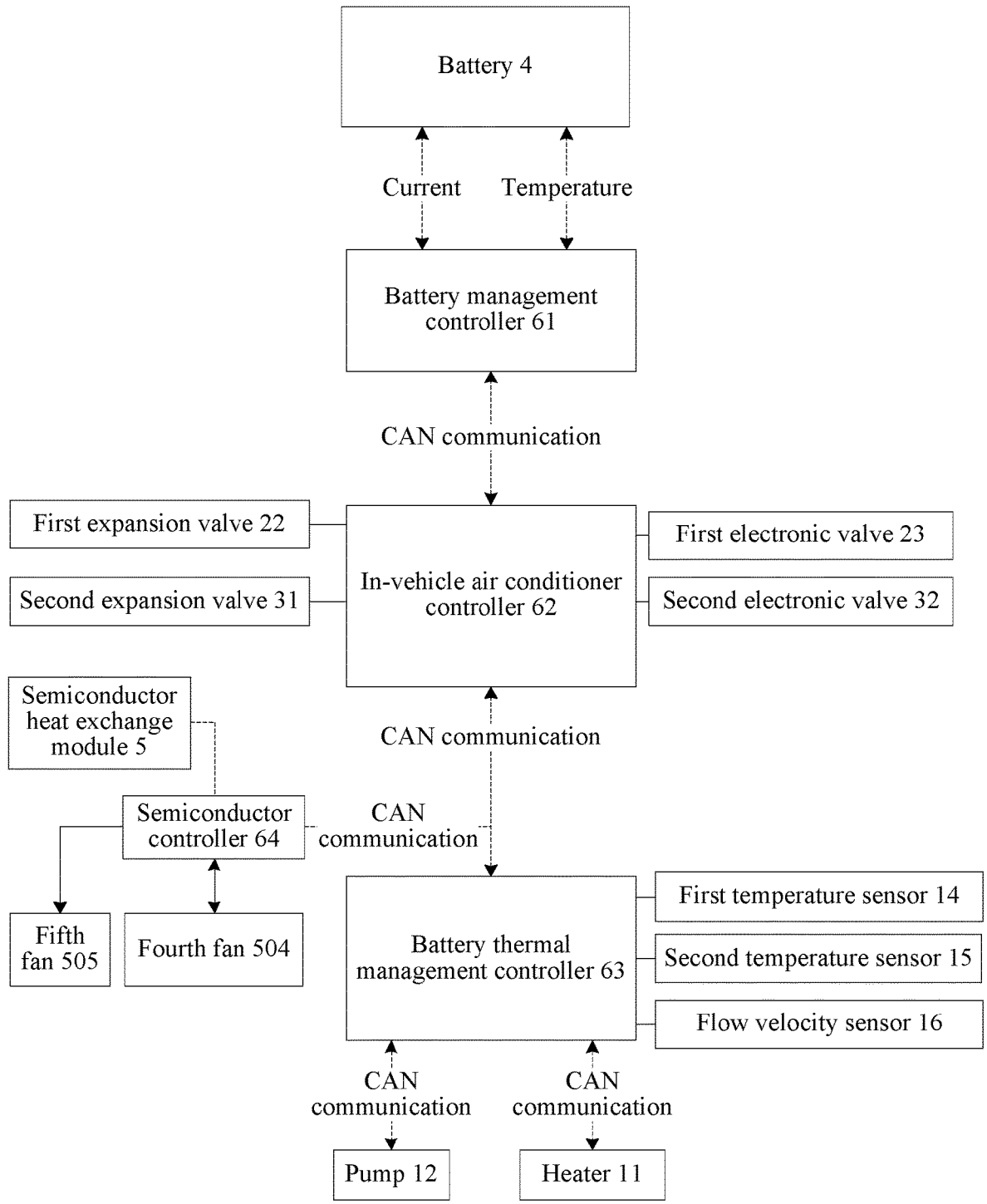
FIG. 14 is a control topological diagram of a temperature regulating system of an in-vehicle battery according to a second embodiment of the present disclosure.

It may be appreciated that, as shown in FIG. 14, the electronic valves and the expansion valves are controlled by the in-vehicle air conditioner controller 63. As shown in FIG. 12 and FIG. 13, the battery thermal management module 1 includes a pump 12, a first temperature sensor 14, a second temperature sensor 15, and a flow velocity sensor 16 that are disposed on the heat exchange flow path. The pump 12 is configured to cause a medium in the heat exchange flow path to flow. The first temperature sensor 14 is configured to detect an inlet temperature of a medium that flows into the in-vehicle battery. The second temperature sensor 15 is configured to detect an outlet temperature of the medium that flows out of the in-vehicle battery. The flow velocity sensor 16 is configured to detect a flow velocity of the medium that flows in the heat exchange flow path.

Optionally, as shown in FIG. 12 and FIG. 13, the battery thermal management module 1 may further include a medium container 13 disposed on the heat exchange flow path, and the medium container 13 is configured to store a medium and provide the medium for the heat exchange flow path.

How to obtain the required power P1 and the actual power P2 of the battery 4 is described in the following with a specific example.

According to an embodiment of the present disclosure, the controller may be configured to obtain a first parameter when temperature regulation of the battery is started, and generate a first required power for temperature regulation of the battery according to the first parameter; obtain a second parameter during temperature regulation of the battery, and a second required power for temperature regulation of the battery according to the second parameter; and generate the required power P1 of the battery according to the first required power of the battery and the second required power of the battery.

Optionally, according to an embodiment of the present disclosure, the first parameter is an initial temperature when temperature regulation of the battery is started, a target temperature, and a target time t it takes to reach the target temperature from the initial temperature. A first temperature difference $\Delta T_1$ between the initial temperature and the target temperature is obtained, and the first required power is generated according to the first temperature difference $\Delta T_1$ and the target time t.

Optionally, the first required power is generated through the following formula (1):

$$\Delta T_1 * C * M / t \tag{1}$$

where $\Delta T_1$ is the first temperature difference between the initial temperature and the target temperature, t is the target time, C is the specific heat capacity of the battery 4, and M is the mass of the battery 4.

The second parameter is an average current I of the battery in a preset time, and the second required power is calculated through the following formula (2):

$$I^2 * R \tag{2}$$

where I is the average current, and R is the internal resistance of the battery 4.

Specifically, a charge-discharge current parameter of the battery 4 may be detected by using a current Hall sensor. The battery management controller 61 may estimate the average current battery 4 of the according to the current parameter of the battery 4 in a period of time.

When the battery 4 is cooled, $P1=\Delta T_1 * C * M / t + I^2 * R$; and when the battery 4 is heated, $P1=\Delta T_1 * C * M / t - I^2 * R$.

According to an embodiment of the present disclosure, the controller further generates a second temperature difference $\Delta T_2$ according to the inlet temperature detected by the first temperature sensor 14 and the outlet temperature detected by the second temperature sensor, and generates the actual power P2 of the battery according to the second temperature difference $\Delta T_2$ of each battery and the flow velocity v detected by the flow velocity sensor.

Optionally, according to an embodiment of the present disclosure, the actual power P2 is generated through the following formula (3):

$$\Delta T_2 * c * m \tag{3}$$

where $\Delta T_2$ is the second temperature difference, c is the specific heat capacity of the medium in the flow path, and m is a mass of the medium flowing through a cross-sectional area of the flow path per unit time, where m=v*ρ*s, v is the flow velocity of the medium, ρ is the density of the medium, and s is the cross-sectional area of the flow path.

According to an embodiment of the present disclosure, the controller is further configured to obtain the temperature of the battery, and determine whether the temperature of the battery is greater than a first temperature threshold. When the temperature of the battery is greater than the first temperature threshold, the cooling mode begins. When the temperature of the battery is less than or equal to the first temperature threshold, it is further determined whether the temperature of the battery is less than a second temperature threshold; when the temperature of the battery is less than the second temperature threshold, the heating mode begins. The first temperature threshold is greater than the second temperature threshold. The first temperature threshold and the second temperature threshold may be preset according to an actual condition. For example, the first temperature threshold may be 40° C., and the second temperature threshold may be 0° C.

Specifically, after the vehicle is powered on, the controller 6 obtains the temperature of the battery in real time, and makes a judgment. If the temperature of the battery is higher than 40° C., it indicates that the temperature of the battery is excessively high at this moment, and to prevent the high temperature from affecting the performance of the battery, the temperature of the battery needs to be decreased. The temperature regulating system enters the cooling mode. If the temperature of the battery is lower than 0° C., it indicates that the temperature of the battery 4 is excessively low at this moment, and to prevent the low temperature from affecting the performance of the battery, the temperature of the battery needs to be increased. The temperature regulating system enters the heating mode. The controller 6 controls the heater to turn on, and keeps the second electronic valve 32 in a closed state.

According to an embodiment of the present disclosure, as shown in FIG. 12 to FIG. 13, in the cooling mode, the controller 6 is further configured to obtain a power difference between the required power P1 and the actual power P2 when the required power P1 is greater than the actual power P2, so that the power of the semiconductor heat exchange module 5 is increased according to the power difference, and when the required power P1 is less than or equal to the actual power P2, the power of the semiconductor heat exchange module 5 is reduced and/or the cooling power of the compressor is reduced, to save electrical energy, or the power of the semiconductor heat exchange module 5 and/or the compressor is kept unchanged.

Specifically, when the temperature regulating system works in the cooling mode, the controller 6 obtains the required power P1 and the actual power P2 of the battery 4 and makes a judgment. If P1 of the battery 4 is greater than P2, it indicates that cooling of the battery 4 cannot be completed in the target time based on the current cooling power. Therefore, the controller obtains the power difference between the required power P1 and the actual power P2 of the battery 4, and increases the power of the semiconductor heat exchange module 5 and the rotational speeds of the fourth fan 504 and the fifth fan 505 according to the power difference, so that the temperature of the battery 4 is decreased to the target temperature within the preset time t. If P1 is less than or equal to P2, the controller 6 may reduce the cooling power of the semiconductor heat exchange module 5, the rotational speeds of the fourth fan 504 and the fifth fan 505, and the cooling power of the compressor to save electrical energy, or keep the powers of the semiconductor heat exchange module 5 and the compressor unchanged. When the temperature of the battery is lower than 35° C., cooling of the battery 4 is completed; the controller 6 controls the semiconductor heat exchange module 5 to stop cooling and controls the second electronic valve 32 to close. If the temperature of the battery 4 is still higher than 35° C. after the temperature regulating system stays in the cooling mode for a long time, for example, one hour, the controller 6 further increases the cooling power, and the rotational speeds of the fourth fan 504 and the fifth fan 505 appropriately, to complete cooling of the battery 4 as quickly as possible.

When the temperature regulating system works in the cooling mode, if the required power P1 is greater than the actual power P2, the controller 6 further determines whether the temperature of the battery is greater than the first preset temperature threshold; if the temperature of the battery is greater than or equal to the first preset temperature threshold, the controller 6 increases a flow rate of the cooling liquid of the battery cooling branch, and reduces a flow rate of the cooling liquid of the in-vehicle cooling branch. If the temperature of the battery is less than the first preset temperature threshold, the controller further determines whether the temperature in the compartment reaches a set temperature of the air conditioner. If the temperature in the compartment does not reach the set temperature of the air conditioner, the flow rate of the cooling liquid of the in-vehicle cooling branch is increased, and the flow rate of the cooling liquid of the battery cooling branch is reduced. The first preset temperature threshold may be 45° C. Specifically, the flow rate of the cooling liquid of the in-vehicle cooling branch may be regulated by regulating the opening of the first expansion valve, and the flow rate of the cooling liquid of the battery cooling branch may be regulated by regulating the opening of the second expansion valve.

Figure 15:
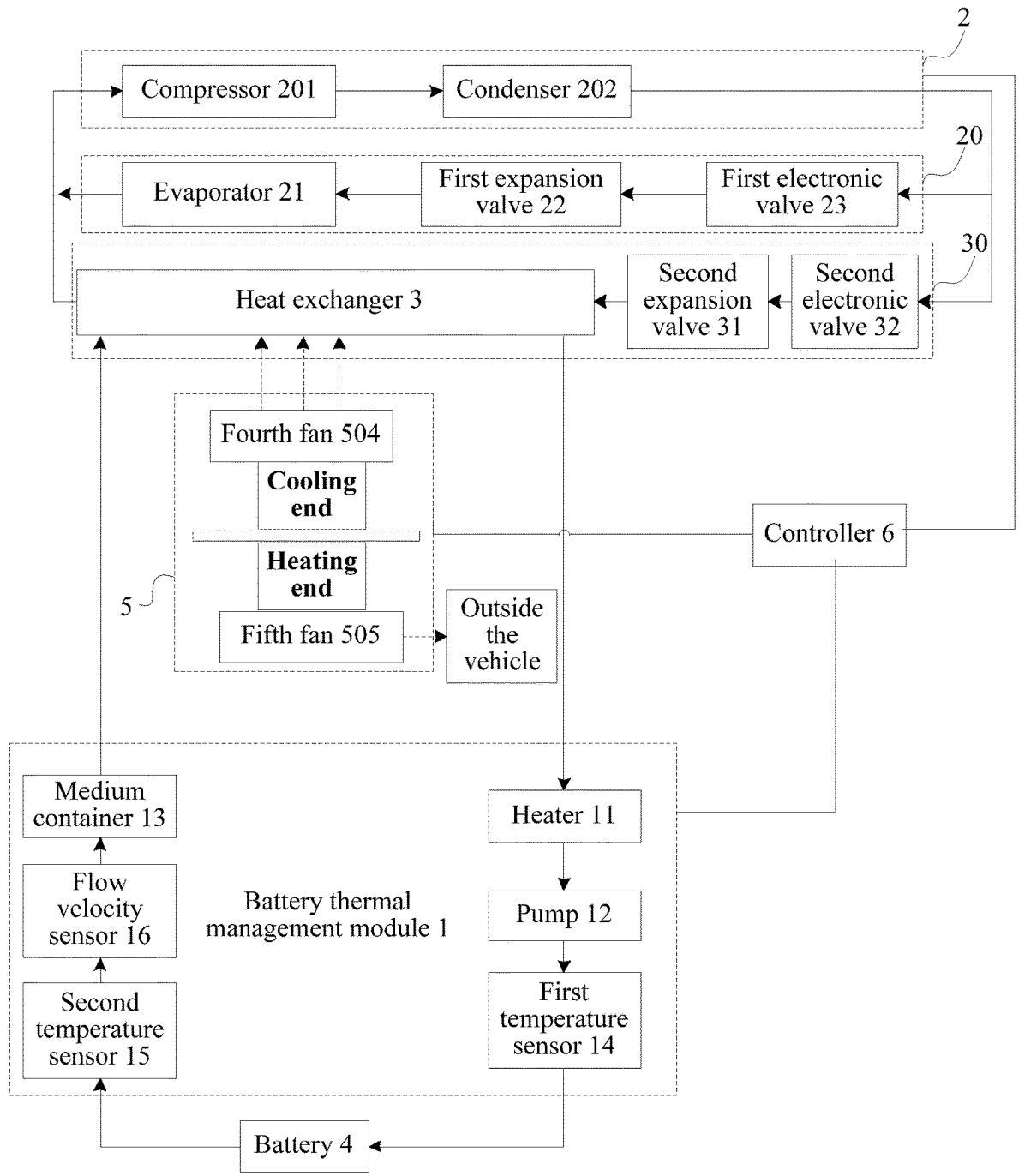
FIG. 15 is a first schematic structural diagram of a temperature regulating system of an in-vehicle battery according to an eighth embodiment of the present disclosure.
Figure 16:
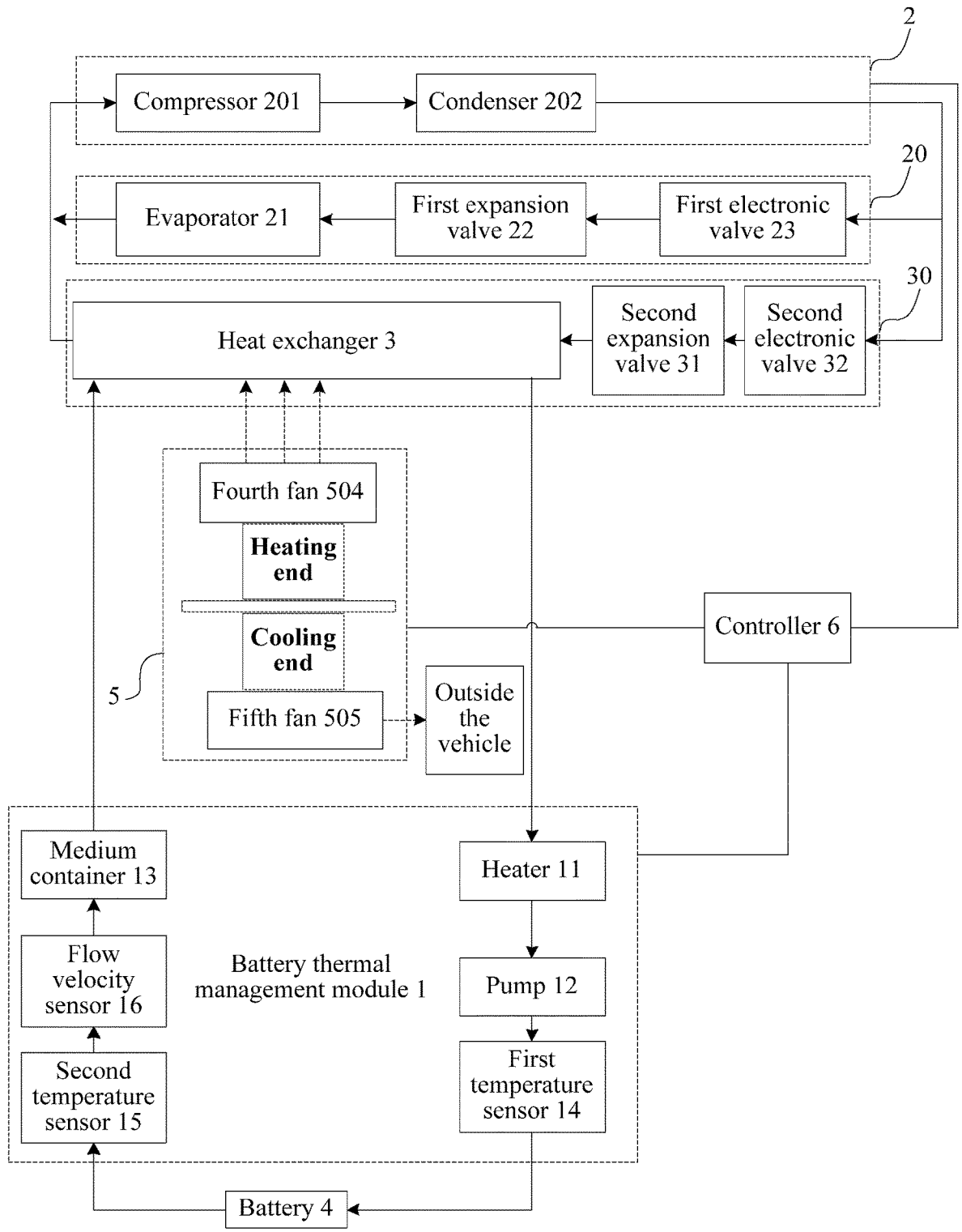
FIG. 16 is a second schematic structural diagram of a temperature regulating system of an in-vehicle battery according to an eighth embodiment of the present disclosure.

According to an embodiment of the present disclosure, as shown in FIG. 15 and FIG. 16, the battery thermal management module 1 may further include a heater 11 disposed on the heat exchange flow path, and the heater 11 is configured to heat the medium in the heat exchange flow path.

Specifically, in addition to heating through the semiconductor heat exchange module 5, the temperature regulating system of an in-vehicle battery may further heat the medium through the heater, to perform temperature regulation on the battery when the battery temperature is relatively low. The heater 11 may be a PTC heater; the heater is not in direct contact with the battery, and has high safety, reliability, and practicability. The pump 12 is mainly configured to provide dynamic. The medium container 13 is mainly configured to store the medium and accept the medium added to the temperature regulating system. When the medium in the temperature regulating system reduces, the medium in the medium container 13 may provide a supplement automatically. The first temperature sensor 14 is configured to detect the temperature of the medium at the inlet of the battery flow path, and the second temperature sensor 15 is configured to detect the temperature of the medium at the outlet of the battery flow path. The flow velocity sensor 16 is configured to detect flow velocity information of the medium in the pipe of the temperature regulating system.

As shown in FIG. 15 and FIG. 16, in the heating mode, when the required power P1 is greater than the actual power P2, the controller 6 obtains a temperature difference between the required power P1 and the actual power P2, and increases the heating power of the heater 11 according to the temperature difference, and when the required power P1 is less than or equal to the actual power P2, keeps the heating power of the heater 11 unchanged.

Specifically, when the temperature regulating system works in the heating mode, the controller 6 obtains the required power P1 and the actual power P2 of the battery 4 and makes a judgment. If P1 of the battery 4 is greater than P2, it indicates that heating of the battery 4 cannot be completed in the target time based on the current heating power. The battery thermal management module 1 obtains the power difference between the required power P1 and the actual power P2 of the battery 4, and increases the power of the heater 11 according to the power difference, where a greater power difference between P1 and P2 indicates a greater increase in the power of the heater 11, so that the temperature of the battery 4 is increased to the target temperature within the preset time t. If P1 is less than or equal to P2, the heating power of the heater 11 may be reduced to save electrical energy, or the power of the heater 11 is kept unchanged. When the temperature of the battery reaches a second set temperature, for example, 10° C., heating of the battery 4 is completed; the battery management controller 61 sends information of turning off the temperature regulation function to the battery thermal management controller 62 through CAN communication, to control the heater 11 to stop heating. If the temperature of the battery 4 is still lower than 10° C. after the temperature regulating system stays in the heating mode for a long time, for example, two hours, the battery thermal management controller 62 increases the power of the heater 11 appropriately, so that heating of the battery 4 is completed as quickly as possible.

Further, according to an embodiment of the present disclosure, as shown in FIG. 12, FIG. 13, FIG. 15 and FIG. 16, the controller 6 is further configured to reduce the rotational speed of the pump 12 or keep the rotational speed of the pump 12 unchanged when the required power P1 is less than or equal to the actual power P2, and increase the rotational speed of the pump 12 when the required power P1 is greater than the actual power P2.

Specifically, when the temperature regulating system enters the heating mode or the cooling mode, if P1 of the battery 4 is less than or equal to P2, the battery thermal management module 1 controls the rotational speed of the pump 12 to reduce, so as to save electrical energy, or keep the rotational speed of the pump 12 unchanged. If P1 of the battery 4 is greater than P2, in addition to controlling the power of the semiconductor heat exchange module 5 or the heater 11 to increase, it is also possible to control the rotational speed of the pump 12 to increase, so as to increase the mass of the medium flowing through a cross-sectional area of a cooling flow path per unit time, thereby increasing the actual power P2 of the battery 4, to implement temperature regulation within the target time t.

In a word, as shown in FIG. 15 and FIG. 16, when the in-vehicle air conditioner does not work and only the semiconductor heat exchange module cools the battery, it is assumed that the required power for temperature regulation of the battery is P1, the actual power for temperature regulation of the battery is P2, and P3 is a maximum cooling power of the semiconductor heat exchange module.

If P1<P3, the semiconductor heat exchange module provides a cooling power for the battery based on the cooling power P1.

If P1>P3, the semiconductor heat exchange module provides a cooling power for the battery based on the maximum heating power P3. The rotational speeds of the fourth fan and the fifth fan are increased, and at the same time, the battery thermal management heat exchange module increases the rotational speed of the pump, to increase the heat exchange power.

In the cooling process, if P1>P2, Pc=P1−P2, and P1+Pc≤P3, the semiconductor heat exchange module reduces the cooling power Pc, and reduces the rotational speeds of the fourth fan and the fifth fan; at the same time, the battery thermal management heat exchange module reduces the rotational speed of the pump, to save electrical energy. Alternatively, the current power is kept unchanged for cooling.

In the cooling process, if P1>P2, Pc=P1−P2, and P1+Pc≤P3, the semiconductor heat exchange module increases the cooling power Pc, and increases the rotational speeds of the fourth fan and the fifth fan; at the same time, the battery thermal management heat exchange module increases the rotational speed of the pump, to increase the battery cooling power. If P1>P3, the semiconductor heat exchange module provides a cooling power for the battery based on the maximum heating power P3. The rotational speeds of the fourth fan and the fifth fan are increased, and at the same time, the battery thermal management heat exchange module increases the rotational speed of the pump, to increase the heat exchange power.

When the battery is heated, it is assumed that the required power for temperature regulation of the battery is P1, the actual power for temperature regulation of the battery is P2, P4 is a maximum heating power of the semiconductor heat exchange module, and P5 is a maximum heating power of the PTC heater.

If P1≤P5, the PTC heater provides a heating power for the battery based on the heating power P1.

If P1>P5, P1≤P5+P4, and P1−P5=Pd, the PTC heater provides the heating power for the battery based on the maximum heating power P5, and the semiconductor heat exchange module provides the heating power for the battery based on a heating power of Pd. In addition, the rotational speeds of the fourth fan and the fifth fan are increased, and the battery thermal management heat exchange module increases the rotational speed of the pump, to increase the heat exchange power. If P1>P5, and P1>P5+P4, the PTC heater provides the heating power for battery based on the maximum heating power P5, and the semiconductor heat exchange module provides the heating power for the battery based on the maximum heating power P3. In addition, the rotational speeds of the fourth fan and the fifth fan are increased, and the battery thermal management heat exchange module increases the rotational speed of the pump, to increase the heat exchange power.

In the heating process, if P1≤P2, and Pc=P2−P1, the semiconductor heat exchange module reduces the heating power Pc, and reduces the rotational speeds of the fourth fan and the fifth fan; alternatively, the heating power of the PTC heater is reduced by Pc, and the battery thermal management heat exchange module reduces the rotational speed of the pump, to save electrical energy. Alternatively, the current heating power is kept unchanged.

In the heating process, if P1>P2, Pc=P1−P2, and P1+Pc≤P5, the PTC heater increases the heating power by Pc, and the battery thermal management module controls the pump to increase the rotational speed, so as to increase the heating power of the battery.

If P1>P2, Pc=P1−P2, P5<P1+Pc≤P5+P4, Pi=P1+Pc−P5, and Pj=P1+Pc−P4, the PTC heater runs based on the maximum heating power P5, and the semiconductor heat exchange module runs based on a heating power of Pi. Alternatively, the PTC heater runs based on a heating power of Pj, and the semiconductor heat exchange module runs based on the maximum heating power P4. Alternatively, the PTC heater provides the heating power for the battery based on the maximum heating power P5, and the heating power of the semiconductor heat exchange module is increased by Pc. Alternatively, the heating power of the heater remains unchanged, and the heating power of the semiconductor heat exchange module is increased by Pc. Alternatively, the heating power of the heater is increased by Pc, and the heating power of the semiconductor heat exchange module remains unchanged. Alternatively, the heating power of the PTC heater is increased by 0.5*Pc, and the heating power of the semiconductor heat exchange module is increased by 0.5 Pc. Alternatively, the heating powers of the PTC heater and the semiconductor heat exchange module are increased proportionally based on a ratio between respective maximum heating powers. In addition, the rotational speeds of the fourth fan and the fifth fan are increased, and the battery thermal management heat exchange module increases the rotational speed of the pump, so as to increase the heat exchange power, so that the heating power of the battery is increased by Pc.

If P1>P2, Pc=P1−P2, and P1+Pc>P5+P4, the PTC heater provides the heating power for the battery based on the maximum heating power P5, and the semiconductor heat exchange module provides the heating power for the battery based on the maximum heating power P4. In addition, the rotational speeds of the fourth fan and the fifth fan are increased, and the battery thermal management heat exchange module increases the rotational speed of the pump, to increase the heat exchange power.

Moreover, when the battery is cooled, if P1≤P3, the semiconductor heat exchange module provides a cooling power for the battery based on the cooling power P1. If P1>P3, the semiconductor heat exchange module provides a cooling power for the battery based on the maximum heating power P3. The rotational speeds of the fourth fan and the fifth fan are increased, and at the same time, the battery thermal management heat exchange module increases the rotational speed of the pump, to increase the heat exchange power.

In the cooling process, if P1>P2, Pc=P1−P2, and P1+Pc≤P3, the semiconductor heat exchange module reduces the cooling power Pc, and reduces the rotational speeds of the fourth fan and the fifth fan; at the same time, the battery thermal management heat exchange module reduces the rotational speed of the pump, to save electrical energy. Alternatively, the current power is kept unchanged for cooling.

In the cooling process, if P1>P2, Pc=P1−P2, and P1+Pc≤P3, the semiconductor heat exchange module increases the cooling power Pc, and increases the rotational speeds of the fourth fan and the fifth fan; at the same time, the battery thermal management heat exchange module increases the rotational speed of the pump, to increase the battery cooling power. If P1>P3, the semiconductor heat exchange module provides a cooling power for the battery based on the maximum heating power P3. The rotational speeds of the fourth fan and the fifth fan are increased, and at the same time, the battery thermal management heat exchange module increases the rotational speed of the pump, to increase the heat exchange power.

When the battery is heated, if P1≤P5, the PTC heater provides a heating power for the battery based on the heating power P1. If P1>P5, P1≤P5+P4, and P1−P5=Pd, the PTC heater provides the heating power for the battery based on the maximum heating power P5, and the semiconductor heat exchange module provides the heating power for the battery based on a heating power of Pd. In addition, the rotational speeds of the fourth fan and the fifth fan are increased, and the battery thermal management heat exchange module increases the rotational speed of the pump, to increase the heat exchange power. If P1>P5, and P1>P5+P4, the PTC heater provides the heating power for battery based on the maximum heating power P5, and the semiconductor heat exchange module provides the heating power for the battery based on the maximum heating power P3. In addition, the rotational speeds of the fourth fan and the fifth fan are increased, and the battery thermal management heat exchange module increases the rotational speed of the pump, to increase the heat exchange power.

In the heating process, if P1≤P2, and Pc=P2−P1, the semiconductor heat exchange module reduces the heating power Pc, and reduces the rotational speeds of the fourth fan and the fifth fan; alternatively, the heating power of the PTC heater is reduced by Pc, and the battery thermal management heat exchange module reduces the rotational speed of the pump, to save electrical energy. Alternatively, the current heating power is kept unchanged.

In the heating process, if P1>P2, Pc=P1−P2, and P1+Pc≤P5, the PTC heater increases the heating power by Pc, and the battery thermal management module controls the pump to increase the rotational speed, so as to increase the heating power of the battery.

If P1>P2, Pc=P1−P2, P5<P1+Pc≤P5+P4, Pi=P1+Pc−P5, and Pj=P1+Pc−P4, the PTC heater runs based on the maximum heating power P5, and the semiconductor heat exchange module runs based on a heating power of Pi. Alternatively, the PTC heater runs based on a heating power of Pj, and the semiconductor heat exchange module runs based on the maximum heating power P4. Alternatively, the PTC heater provides the heating power for the battery based on the maximum heating power P5, and the heating power of the semiconductor heat exchange module is increased by Pc. Alternatively, the heating power of the heater remains unchanged, and the heating power of the semiconductor heat exchange module is increased by Pc. Alternatively, the heating power of the heater is increased by Pc, and the heating power of the semiconductor heat exchange module remains unchanged. Alternatively, the heating power of the PTC heater is increased by 0.5*Pc, and the heating power of the semiconductor heat exchange module is increased by 0.5 Pc. Alternatively, the heating powers of the PTC heater and the semiconductor heat exchange module are increased proportionally based on a ratio between respective maximum heating powers. In addition, the rotational speeds of the fourth fan and the fifth fan are increased, and the battery thermal management heat exchange module increases the rotational speed of the pump, so as to increase the heat exchange power, so that the heating power of the battery is increased by Pc.

If P1>P2, Pc=P1−P2, and P1+Pc>P5+P4, the PTC heater provides the heating power for the battery based on the maximum heating power P5, and the semiconductor heat exchange module provides the heating power for the battery based on the maximum heating power P4. In addition, the rotational speeds of the fourth fan and the fifth fan are increased, and the battery thermal management heat exchange module increases the rotational speed of the pump, to increase the heat exchange power.

It may be appreciated that, the in-vehicle air conditioner controller 63 may regulate power distribution of the cooling loops according to the compartment temperature as well as the required power P1 and the actual power P2 of the battery, thereby balancing cooling requirements of in-vehicle cooling and battery cooling.

As shown in FIG. 15 and FIG. 16, when the in-vehicle air conditioner and the semiconductor heat exchange module cool the battery at the same time, initial power distribution of battery cooling and in-vehicle cooling is as follows:

It is assumed that the required power for cooling of the battery is P1, the actual cooling power of the battery is P2, P3 is a maximum cooling power of the semiconductor heat exchange module, P6 is an in-vehicle cooling power, and P7 is a maximum cooling power of the compressor.

When a sum of the required power P1 for battery cooling and the required power P6 for in-vehicle cooling is less than or equal to the total power P7 of the compressor, that is, P1+P6≤P7, the compressor runs based on a cooling power of P1+P6. Moreover, P1<P7, and P6<P7. In addition, the opening of the first expansion valve is controlled, so that the in-vehicle cooling power is P6. The opening of the second expansion valve is controlled, so that the battery cooling power is P1.

When P7<P1+P6≤P7+P3, Pe=P1+P6−P7, and Pf=P1+P6−P3, the compressor runs based on the maximum cooling power P7, and the semiconductor heat exchange module runs based on a cooling power of Pe. The cooling power of the battery cooling branch is P1, and the power of the in-vehicle cooling branch is equal to P6. Alternatively, the semiconductor ventilation module runs based on the maximum cooling power P3, and the compressor runs based on a cooling power of Pf. In addition, the opening of the first expansion valve is controlled, so that the in-vehicle cooling power is P6. The opening of the second expansion valve is controlled, so that the battery cooling power is P1.

When P1+P6>P7+P3, it is determined whether the battery temperature is greater than 45° C. If the battery temperature is greater than 45° C., the cooling power is first provided for the battery cooling, the compressor runs based on the maximum cooling power P7, and the semiconductor heat exchange module runs based on the maximum cooling power P3. In addition, the rotational speed of the fan is increased. The opening of the second expansion valve is increased, so that the cooling power of the battery cooling branch is P1, and the opening of the first expansion valve is reduced, so that the power of the in-vehicle cooling branch is equal to P7+P3−P1. If it is determined that the battery temperature is not greater than 45° C., and the in-vehicle temperature has not reached the set temperature yet, the cooling power is first provided for the interior of the compartment, the compressor runs based on the maximum cooling power P7, and the semiconductor heat exchange module runs based on the maximum cooling power P3. In addition, the rotational speed of the fan is increased. The opening of the first expansion valve is increased, so that the cooling power of the in-vehicle cooling branch is P6, and the opening of the second expansion valve is reduced, so that the cooling power of the battery cooling branch is equal to P7+P3−P6. If the in-vehicle temperature has already reached the set temperature, the cooling power of the battery is satisfied first.

The power distribution in the battery cooling process is as follows:

If P1>P2, Pc=P1−P2, and P1+P6+Pc<P7, the cooling power of the compressor is increased by Pc accordingly, and the opening of the second expansion valve is increased, to increase the rotational speed of the water pump, so as to increase the battery cooling power.

If P1>P2, Pc=P1−P2, P7<P1+P6+Pc≤P7+P3, Pg=P1+P6+Pc−P7, and Ph=P1+P6+Pc−P3, the compressor runs based on the maximum cooling power P7, and the semiconductor ventilation module runs based on a cooling power of Pg. Alternatively, the compressor runs based on a cooling power of Ph, and the semiconductor ventilation module runs based on the maximum cooling power P3. Alternatively, the compressor runs based on the maximum cooling power P7, and the cooling power of the semiconductor heat exchange module is increased by Pc. Alternatively, the cooling power of the compressor is increased by Pc, and the semiconductor heat exchange module runs based on the maximum cooling power P3. Alternatively, the cooling power of the compressor remains unchanged, and the cooling power of the semiconductor heat exchange module is increased by Pc. Alternatively, the cooling power of the compressor is increased by Pc, and the cooling power of the semiconductor heat exchange module remains unchanged. Alternatively, the cooling power of the compressor is increased by 0.5*Pc, and the cooling power of the semiconductor heat exchange module is increased by 0.5 Pc. Alternatively, the cooling powers of the compressor and the semiconductor heat exchange module are increased proportionally based on a ratio between respective maximum cooling powers. In addition, the opening of the second expansion valve is increased, the rotational speed of the pump is controlled to increase, and the rotational speed of the fan is increased, so that the cooling power of the battery cooling branch is increased by Pc.

If P1>P2, Pc=P1−P2, and P1+P6+Pc>P7+P3, the compressor runs based on the maximum cooling power P5, and the semiconductor heat exchange module runs based on the maximum cooling power P3. In addition, the rotational speed of the fan is increased, and the battery thermal management heat exchange module increases the rotational speed of the pump, so as to increase the heat exchange power. In this case, it is determined whether the battery temperature is greater than 45° C. If the battery temperature is greater than 45° C., the cooling power is first provided for the battery cooling, the compressor runs based on the maximum cooling power P7, and the semiconductor heat exchange module runs based on the maximum cooling power P3. In addition, the rotational speed of the fan is increased. The opening of the second expansion valve is increased, so that the cooling power of the battery cooling branch is P1+Pc, and the opening of the first expansion valve is reduced, so that the power of the in-vehicle cooling branch is equal to P7+P3−P1−Pc. In addition, the rotational speed of the pump is controlled to increase, and the rotational speed of the fan is increased, so that the cooling power of the battery cooling branch is increased by Pc. If it is determined that the battery temperature is not greater than 45° C., and the in-vehicle temperature has not reached the set temperature yet, the cooling power is first provided for the interior of the compartment, the compressor runs based on the maximum cooling power P7, and the semiconductor heat exchange module runs based on the maximum cooling power P3. In addition, the rotational speed of the fan is increased. The opening of the first expansion valve is increased, so that the cooling power of the in-vehicle cooling branch is P6, and the opening of the second expansion valve is reduced, so that the cooling power of the battery cooling branch is equal to P7+P3−P6. If the in-vehicle temperature has already reached the set temperature, the cooling power of the battery is satisfied first.

If P1≤P2 and Pc=P2−P1, the cooling power of the compressor remains unchanged, and the cooling power of the semiconductor remains unchanged; alternatively, the cooling power of the compressor is reduced, and the cooling power of the semiconductor heat exchange module is reduced; alternatively, the opening of the second expansion valve is reduced, or the rotational speed of the pump is reduced, so that the cooling power of the battery cooling branch is decreased by Pc.

When the battery is heated, it is assumed that the required power for heating of the battery is P1, the actual heating power of the battery is P2, P4 is a maximum heating power of the semiconductor heat exchange module, and P5 is a maximum heating power of the PTC heater.

If P1≤P5, the PTC heater provides a heating power for the battery based on the heating power P1.

If P1>P5, P1≤P5+P4, and P1−P5=Pd, the PTC heater provides the heating power for the battery based on the maximum heating power P5, and the semiconductor heat exchange module provides the heating power for the battery based on a heating power of Pd. In addition, the rotational speeds of the fourth fan and the fifth fan are increased, and the battery thermal management heat exchange module increases the rotational speed of the pump, to increase the heat exchange power. If P1>P5, and P1>P5+P4, the PTC heater provides the heating power for battery based on the maximum heating power P5, and the semiconductor heat exchange module provides the heating power for the battery based on the maximum heating power P3. In addition, the rotational speeds of the fourth fan and the fifth fan are increased, and the battery thermal management heat exchange module increases the rotational speed of the pump, to increase the heat exchange power.

In the heating process, if P1≤P2, and Pc=P2−P1, the semiconductor heat exchange module reduces the heating power Pc, and reduces the rotational speeds of the fourth fan and the fifth fan; alternatively, the heating power of the PTC heater is reduced by Pc, and the battery thermal management heat exchange module reduces the rotational speed of the pump, to save electrical energy. Alternatively, the current heating power is kept unchanged.

In the heating process, if P1>P2, Pc=P1−P2, and P1+Pc≤P5, the PTC heater increases the heating power by Pc, and the battery thermal management module controls the pump to increase the rotational speed, so as to increase the heating power of the battery.

If P1>P2, Pc=P1−P2, P5<P1+Pc≤P5+P4, Pi=P1+Pc−P5, and Pj=P1+Pc−P4, the PTC heater runs based on the maximum heating power P5, and the semiconductor heat exchange module runs based on a heating power of Pi. Alternatively, the PTC heater runs based on a heating power of Pj, and the semiconductor heat exchange module runs based on the maximum heating power P4. Alternatively, the PTC heater provides the heating power for the battery based on the maximum heating power P5, and the heating power of the semiconductor heat exchange module is increased by Pc. Alternatively, the heating power of the heater remains unchanged, and the heating power of the semiconductor heat exchange module is increased by Pc. Alternatively, the heating power of the heater is increased by Pc, and the heating power of the semiconductor heat exchange module remains unchanged. Alternatively, the heating power of the PTC heater is increased by 0.5*Pc, and the heating power of the semiconductor heat exchange module is increased by 0.5 Pc. Alternatively, the heating powers of the PTC heater and the semiconductor heat exchange module are increased proportionally based on a ratio between respective maximum heating powers. In addition, the rotational speeds of the fourth fan and the fifth fan are increased, and the battery thermal management heat exchange module increases the rotational speed of the pump, so as to increase the heat exchange power, so that the heating power of the battery is increased by Pc.

If P1>P2, Pc=P1−P2, and P1+Pc>P5+P4, the PTC heater provides the heating power for the battery based on the maximum heating power P5, and the semiconductor heat exchange module provides the heating power for the battery based on the maximum heating power P4. In addition, the rotational speeds of the fourth fan and the fifth fan are increased, and the battery thermal management heat exchange module increases the rotational speed of the pump, to increase the heat exchange power.

The temperature regulating system of an in-vehicle battery according to the embodiment of the present disclosure can precisely control the heating power and cooling power of the in-vehicle battery according to an actual state of the in-vehicle battery, and regulate the temperature when the temperature of the in-vehicle battery is excessively high or excessively low, so that the temperature of the in-vehicle battery is maintained in a preset range, thereby avoiding the situation that the performance of the in-vehicle battery is affected by the temperature.

Figure 17:
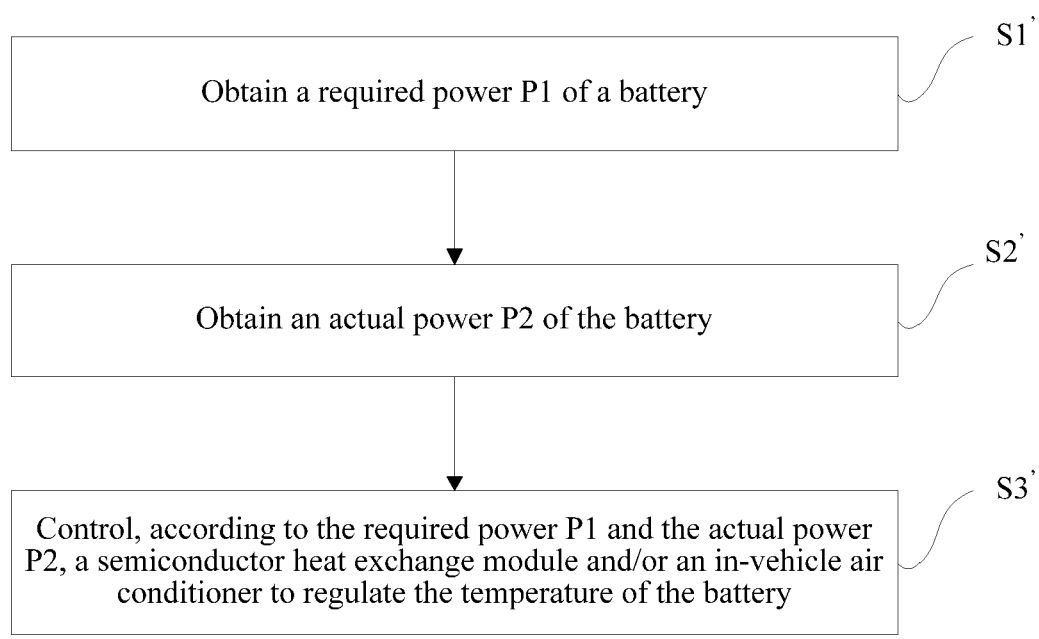
FIG. 17 is a flowchart of a temperature regulating method of an in-vehicle battery according to a third embodiment of the present disclosure.

FIG. 17 is a flowchart of a temperature regulating method of an in-vehicle battery according to a third embodiment of the present disclosure. As shown in FIG. 12 and FIG. 13, the temperature regulating system of an in-vehicle battery includes a battery cooling branch, where the battery cooling branch includes a heat exchanger; a semiconductor heat exchange module, where the semiconductor heat exchange module is configured to refrigerate the heat exchanger; a battery thermal management module connected to the battery and the heat exchanger; an in-vehicle air conditioner, where the in-vehicle air conditioner includes a compressor and a condenser; and an in-vehicle cooling branch connected to the compressor and the heat exchanger. As shown in FIG. 17, the method includes the following steps:

S1'. Obtain a required power P1 of the battery.

Optionally, according to an embodiment of the present disclosure, the obtaining a required power P1 of the battery by a battery management controller 61 specifically includes: obtaining, by the battery management controller 61, a first parameter of the battery when temperature regulation is started, and generating a first required power for temperature regulation of the battery according to the first parameter; obtaining, by the battery management controller 61, a second parameter of the battery during temperature regulation, and generating a second required power for temperature regulation of the battery according to the second parameter; and generating the required power P1 of the battery by the battery management controller 61 according to the first required power of the battery and the second required power of the battery.

Optionally, according to an embodiment of the present disclosure, the first parameter is an initial temperature when temperature regulation of the battery is started, a target temperature, and a target time t it takes to reach the target temperature from the initial temperature. The generating, by the battery management controller 61, a first required power for temperature regulation of the battery according to the first parameter specifically includes: obtaining, by the battery management controller 61, a first temperature difference $\Delta T_1$ between the initial temperature and the target temperature, and generating the first required power according to the first temperature difference $\Delta T_1$ and the target time t.

Optionally, according to an embodiment of the present disclosure, the battery management controller 61 generates the first required power according to the following formula (1):

$$\Delta T_1 * C * M / t \tag{1}$$

where $\Delta T_1$ is the first temperature difference between the initial temperature and the target temperature, t is the target time, C is the specific heat capacity of the battery, and M is the mass of the battery.

According to an embodiment of the present disclosure, the second parameter is an average current I of the battery in a preset time, and the second required power is generated through the following formula (2):

$$I^2 * R \tag{2}$$

where I is the average current, and R is the internal resistance of the battery.

When the battery is cooled, $P1 = \Delta T_1 * C * M/t + I^2 * R$; and when the battery is heated, $P1 = \Delta T_1 * C * M/t - I^2 * R$.

S2'. Obtain an actual power P2 of the battery.

According to an embodiment of the present disclosure, the obtaining, by the battery thermal management controller 62, an actual power P2 of the battery specifically includes: obtaining an inlet temperature and an outlet temperature of a flow path for regulating the battery temperature, obtaining a flow velocity v of a medium flowing into the flow path, generating a second temperature difference $\Delta T_2$ according to the inlet temperature and the outlet temperature of the flow path of the battery, and generating the actual power P2 according to the second temperature difference $\Delta T_2$ and the flow velocity v.

Optionally, according to an embodiment of the present disclosure, the actual power P2 is generated through the following formula (3):

$$\Delta T_2 * c * m \tag{3}$$

where $\Delta T_2$ is the second temperature difference, c is the specific heat capacity of the medium in the flow path, and m is a mass of the medium flowing through a cross-sectional area of the flow path per unit time, where $m = v * \rho * s$, v is the flow velocity of the medium, $\rho$ is the density of the medium, and s is the cross-sectional area of the flow path. It is not limited to a semiconductor? This is true when there is only a semiconductor but no air conditioner, and it is not true in other cases.

S3'. Control the semiconductor heat exchange module and/or the in-vehicle air conditioner to regulate the temperature of the battery according to the required power P1 and the actual power P2.

Optionally, as shown in FIG. 12 and FIG. 13, the semiconductor heat exchange module is provided with a heating end and a cooling end, and after the power source is reversed, positions of the heating end and the cooling end are exchanged. The heating end and the cooling end of the semiconductor heat exchange module are each installed with a heat exchange fan (the fourth fan and the fifth fan), to accelerate heat exchange at the heating end and the cooling end. An increase in the rotational speed of the heat exchange fan can increase the cooling/heating power of the semiconductor heat exchange module. FIG. 12 shows that the power source of the semiconductor heat exchange module is normally connected, and FIG. 13 shows that the power source of the semiconductor heat exchange module is reversely connected.

When the temperature of the battery is relatively high, for example, higher than 40° C., the temperature regulating system of an in-vehicle battery enters a cooling mode. The battery thermal management module and the battery thermal management module work. The battery thermal management module supplies power positively. The cooling end starts refrigeration, and the fourth fan blows cooling air to the heat exchanger, to cool a medium in a cooling pipe of the heat exchanger, and the medium then cools the battery through the battery thermal management module. Meanwhile, the fifth fan blows heat at the heating end to the outside of the vehicle.

When the temperature of the battery is relatively low, for example, lower than 0° C., the temperature regulating system of an in-vehicle battery enters a heating mode. The battery thermal management module and the battery thermal management module work. The battery thermal management module supplies power reversely. The heating end of the semiconductor starts heating, and the fourth fan blows heating air to the heat exchanger, to cool the medium in the cooling pipe of the heat exchanger 3, and the medium then cools the battery through the battery thermal management module. Meanwhile, the fifth fan blows cold air at the cooling end to the outside of the vehicle.

As shown in FIG. 12 and FIG. 13, the in-vehicle air conditioner forms a refrigerating branch. For example, the refrigerating branch includes a compressor and a condenser in series connection; an evaporator, a first expansion valve, and a first electronic valve form the in-vehicle cooling branch; the heat exchanger, a second expansion valve, and a second electronic valve form the battery cooling branch.

Inside the in-vehicle air conditioner, two independent cooling branches are divided starting from the condenser, which are the in-vehicle cooling branch and the battery cooling branch respectively. The in-vehicle cooling branch mainly provides the cooling power for space in the compartment through the evaporator, and the battery cooling branch mainly provides the cooling power for the battery through the heat exchanger. There are mainly two sources for the cooling power of the battery cooling branch, where one source is that the refrigerant of the compressor flows into the heat exchanger 3 to provide the cooling power for the heat exchanger 3, and the other is that the cooling end of the semiconductor heat exchange module blows cooling air to the heat exchanger through the fourth fan, to provide the cooling power for the heat exchanger. If the battery cooling function is not enabled, the semiconductor heat exchange module is not electrified. If the temperature of the battery is lower than 0° C., it indicates that the temperature of the battery is excessively low at this moment, and to prevent the low temperature from affecting the performance of the battery, the temperature of the battery needs to be increased. The temperature regulating system enters the heating mode. Electrically controlled heating is turned on; at the same time, the second electronic valve is kept in a closed state, and the semiconductor heat exchange supplies power reversely.

When the battery 4 is cooled or heated, the initial temperature (that is, the current temperature) and the target temperature of the battery, and the target time t it takes to reach the target temperature from the initial temperature are obtained by the battery thermal management controller 61, where the target temperature and the target time t may be preset according to an actual condition, and the first required power is calculated according to formula (1). At the same time, the battery thermal management controller 61 obtains the average current I of the battery in the preset time, and calculates the second required power of the battery according to formula (2). Then, the battery management controller 61 calculates the required power P1 (that is, a power required for regulating the temperature of the battery to the target temperature) of the battery according to the first required power and the second required power. Moreover, the battery thermal management controller 62 obtains the inlet temperature and the outlet temperature of the battery, obtains flow velocity information, and calculates the actual power P2 of the battery according to formula (3). The required power P1 is a power that needs to be provided for the battery when the temperature of the battery is regulated to the set target temperature, and the actual power P2 is an actual power obtained by the battery currently when temperature regulation is performed on the battery. The target temperature is a set value, and may be preset according to an actual condition of the in-vehicle battery. For example, when the battery is cooled, the target temperature may be set to about 35° C. Then, the controller controls the semiconductor heat exchange module and the in-vehicle air conditioner according to the required power P1 and the actual power P2. For example, if P1 is greater than P2, the cooling power of the semiconductor heat exchange module is increased, and the rotational speeds of the fourth fan and the fifth fan are controlled to increase, so that cooling of the battery is completed as quickly as possible. Therefore, the temperature may be regulated when the temperature of the in-vehicle battery is excessively high, so that the temperature of the in-vehicle battery is maintained in a preset range, thereby avoiding the situation that the performance of the in-vehicle battery is affected by the temperature.

According to an embodiment of the present disclosure, the temperature regulating method of an in-vehicle battery may further include: obtaining the temperature of the battery, and determining whether the temperature of the battery is greater than a first temperature threshold; when the temperature of the battery is greater than the first temperature threshold, entering the cooling mode; when the temperature of the battery is less than or equal to the first temperature threshold, further determining whether the temperature of the battery is less than a second temperature threshold; when the temperature of the battery is less than the second temperature threshold, entering the heating mode. The first temperature threshold is greater than the second temperature threshold.

Specifically, after the vehicle is powered on, the battery management controller 61 obtains the temperature of the battery in real time, and makes a judgment. If the temperature of the battery is higher than 40° C., it indicates that the temperature of the battery is excessively high at this moment, and to prevent the high temperature from affecting the performance of the battery, the temperature of the battery needs to be decreased. The temperature regulating system enters the cooling mode.

If the temperature of the battery is lower than 0° C., it indicates that the temperature of the battery 4 is excessively low at this moment, and to prevent the low temperature from affecting the performance of the battery, the temperature of the battery needs to be increased. The temperature regulating system enters the heating mode. The battery thermal management controller 62 controls the heater to turn on, and keeps the battery cooling branch to stay in a closed state.

Optionally, as shown in FIG. 12 to FIG. 13, in the cooling mode, the controlling the semiconductor heat exchange module and/or the in-vehicle air conditioner to regulate the temperature of the battery according to the required power P1 and the actual power P2 includes: determining whether the required power P1 is greater than the actual power P2; if the required power P1 is greater than the actual power P2, obtaining a power difference between the required power P1 and the actual power P2, and increasing the power of the semiconductor heat exchange module and/or the compressor according to the power difference; if the required power P1 is less than or equal to the actual power P2, reducing the power of the semiconductor heat exchange module and/or the cooling power of the compressor, or keeping the power of the semiconductor heat exchange module and/or the compressor unchanged.

Specifically, when the temperature regulating system works in the cooling mode, the controller obtains the required power P1 and the actual power P2 of the battery and makes a judgment. If P1 of the battery is greater than P2, it indicates that cooling of the battery cannot be completed in the target time based on the current cooling power. Therefore, the controller obtains the power difference between the required power P1 and the actual power P2 of the battery, and the semiconductor controller 64 increases the power of the semiconductor heat exchange module and the rotational speeds of the fourth fan and the fifth fan according to the power difference, so that the temperature of the battery is decreased to the target temperature within the preset time t. If P1 is less than or equal to P2, the semiconductor controller 64 may reduce the power of the semiconductor heat exchange module and the rotational speeds of the fourth fan and the fifth fan, and/or the in-vehicle air conditioner controller 63 reduces the cooling power of the compressor to save electrical energy, or keeps the powers of the semiconductor heat exchange module and the compressor unchanged. When the temperature of the battery is lower than 35° C., cooling of the battery is completed; the semiconductor controller 64 controls the semiconductor heat exchange module to stop cooling. If the temperature of the battery is still higher than 35° C. after the temperature regulating system stays in the cooling mode for a long time, for example, one hour, the semiconductor controller 64 further increases the cooling power of the semiconductor heat exchange module, and the rotational speeds of the fourth fan and the fifth fan appropriately, to complete cooling of the battery as quickly as possible.

As shown in FIG. 12 and FIG. 13, when the temperature regulating system works in the cooling mode, if the required power P1 is greater than the actual power P2, it is determined whether the temperature of the battery is greater than the first preset temperature threshold; if the temperature of the battery is greater than or equal to the first preset temperature threshold, the in-vehicle air conditioner controller 63 increases a flow rate of the cooling liquid of the battery cooling branch, and reduces a flow rate of the cooling liquid of the in-vehicle cooling branch. If the temperature of the battery is less than the first preset temperature threshold, it is further determined whether the temperature in the compartment reaches a set temperature of the air conditioner. If the temperature in the compartment does not reach the set temperature of the air conditioner, the in-vehicle air conditioner controller 63 increases the flow rate of the cooling liquid of the in-vehicle cooling branch, and reduces the flow rate of the cooling liquid of the battery cooling branch. Specifically, the flow rate of the cooling liquid of the in-vehicle cooling branch may be regulated by regulating the opening of the first expansion valve, and the flow rate of the cooling liquid of the battery cooling branch may be regulated by regulating the opening of the second expansion valve.

According to an embodiment of the present disclosure, as shown in FIG. 15 and FIG. 16, the battery thermal management module further includes a heater. The heater is connected to the controller, and is configured to heat the medium in the heat exchange flow path. In the heating mode, the method may further include: determining whether the required power P1 is greater than the actual power P2; if the required power P1 is greater than the actual power P2, obtaining a power difference between the required power P1 and the actual power P2, and increasing the heating power of the heater according to the power difference; if the required power P1 is less than or equal to the actual power P2, keeping the heating power of the heater unchanged.

Specifically, when the temperature regulating system works in the heating mode, the controller obtains the required power P1 and the actual power P2 of the battery and makes a judgment. If P1 of the battery is greater than P2, it indicates that heating of the battery cannot be completed in the target time based on the current heating power. The controller obtains the power difference between the required power P1 and the actual power P2 of the battery 4, and the battery thermal management controller 62 increases the power of the heater according to the power difference, where a greater power difference between P1 and P2 indicates a greater increase in the power of the heater, so that the temperature of the battery is increased to the target temperature within the preset time t. If P1 is less than or equal to P2, the battery thermal management controller 62 may reduce the heating power of the heater to save electrical energy, or keep the power of the heater unchanged. When the temperature of the battery reaches a second set temperature, for example, 10° C., battery heating is completed, and the battery thermal management controller 62 controls the heater to stop heating. If the temperature of the battery is still lower than 10° C. after the temperature regulating system stays in the heating mode for a long time, for example, two hours, the battery thermal management controller 62 increases the power of the heater appropriately, so that heating of the battery is completed as quickly as possible.

Further, according to an embodiment of the present disclosure, as shown in FIG. 12, FIG. 13, FIG. 15 and FIG. 16, the battery thermal management module includes a pump, a first temperature sensor, a second temperature sensor, and a flow velocity sensor that are disposed on the heat exchange flow path. The pump, the first temperature sensor, the second temperature sensor, and the flow velocity sensor are connected to the controller. The pump is configured to cause a medium in the heat exchange flow path to flow. The first temperature sensor is configured to detect an inlet temperature of a medium that flows into the in-vehicle battery. The second temperature sensor is configured to detect an outlet temperature of the medium that flows out of the in-vehicle battery. The flow velocity sensor is configured to detect a flow velocity of the medium that flows in the heat exchange flow path. The foregoing method further includes: if the required power P1 is less than or equal to the actual power P2, reducing the rotational speed of the pump or keeping the rotational speed of the pump unchanged; if the required power P1 is greater than the actual power P2, increasing the rotational pump of the pump.

Specifically, when the temperature regulating system enters the heating mode or the cooling mode, if P1 of the battery is less than or equal to P2, the battery thermal management controller 62 controls the rotational speed of the pump to reduce, so as to save electrical energy, or keep the rotational speed of the pump unchanged. If P1 of the battery is greater than P2, further, the battery thermal management controller 62 may control the rotational speed of the pump to increase, so as to increase the mass of the medium flowing through a cross-sectional area of a cooling flow path per unit time, thereby increasing the actual power P2 of the battery, to implement temperature regulation within the target time t.

According to the temperature regulating method of an in-vehicle battery in the embodiment of the present disclosure, a required power for temperature regulation of the battery and an actual power for temperature regulation of the battery are obtained, and the semiconductor heat exchange module and/or the in-vehicle air conditioner is controlled to regulate according to the required power for temperature regulation and the actual power for temperature regulation. Temperature may be regulated when the temperature of the in-vehicle battery is excessively high or excessively low, so that the temperature of the in-vehicle battery is maintained in a preset range, thereby avoiding the situation that the performance of the in-vehicle battery is affected by the excessively high or excessively low temperature.

In addition, the present disclosure further provides a non-temporary computer readable storage medium, which stores a computer program. When executed by a processor, the program implements the foregoing temperature regulating method.

According to the non-temporary computer readable storage medium in the embodiment of the present disclosure, a required power for temperature regulation of the battery and an actual power for temperature regulation of the battery are obtained, and the semiconductor heat exchange module and/or the in-vehicle air conditioner is controlled to regulate according to the required power for temperature regulation and the actual power for temperature regulation. Temperature may be regulated when the temperature of the in-vehicle battery is excessively high or excessively low, so that the temperature of the in-vehicle battery is maintained in a preset range, thereby avoiding the situation that the performance of the in-vehicle battery is affected by the excessively high or excessively low temperature.

Figure 18:
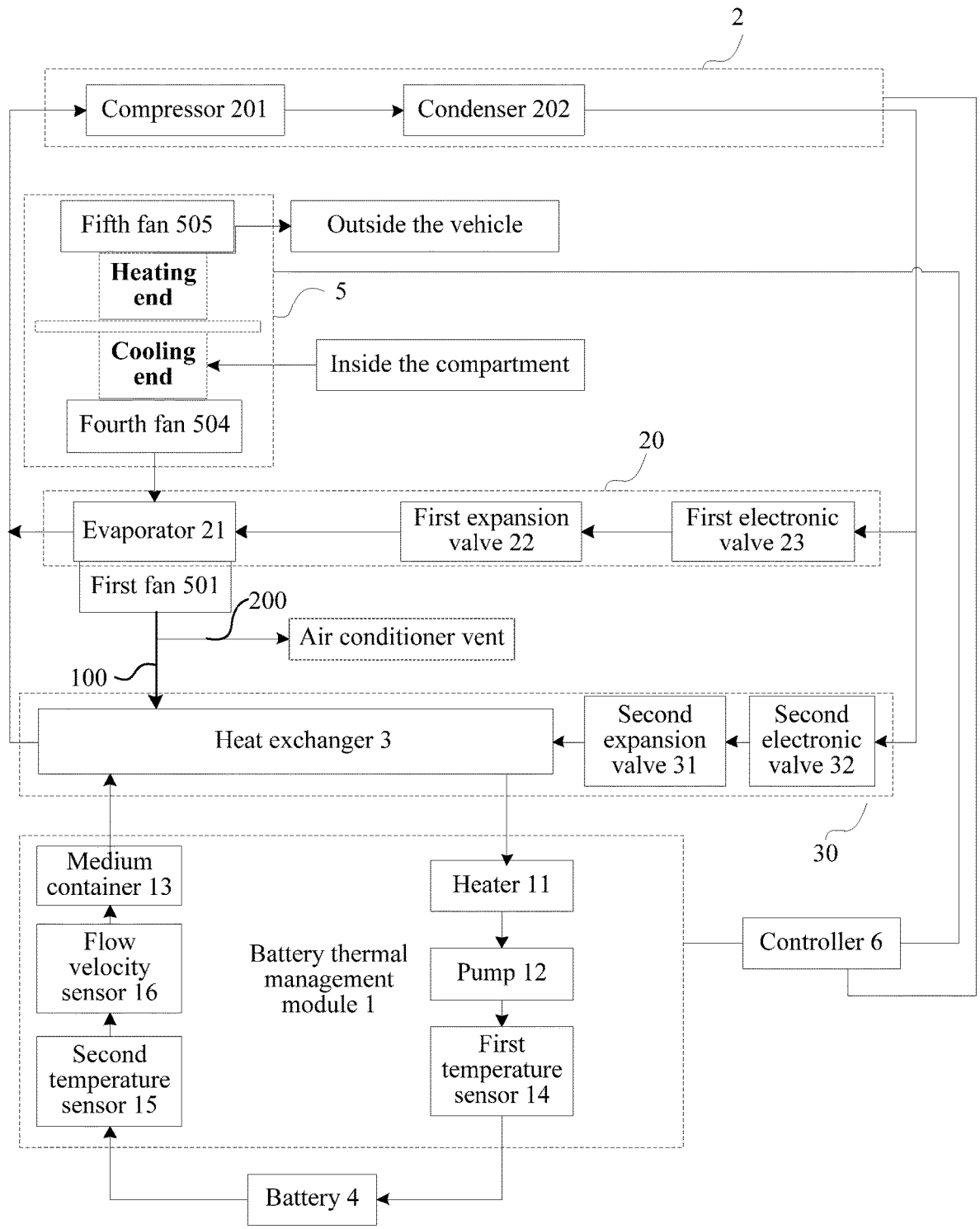
FIG. 18 is a schematic structural diagram of a temperature regulating system of an in-vehicle battery according to a ninth embodiment of the present disclosure.

FIG. 18 is a schematic structural diagram of a temperature regulating system of an in-vehicle battery according to a ninth embodiment of the present disclosure. As shown in FIG. 18, the temperature regulating system of an in-vehicle battery includes: an in-vehicle air conditioner 2, an in-vehicle cooling branch 20, a battery cooling branch 30, a semiconductor heat exchange module 5, a battery thermal management module 1, and a controller 6.

The in-vehicle air conditioner 2 is configured to provide a cooling power for the in-vehicle cooling branch 20 and the battery cooling branch 30. The battery cooling branch 30 is connected to the in-vehicle air conditioner 2. The semiconductor heat exchange module 5 is configured to provide a cooling power for the in-vehicle cooling branch 30 and the battery cooling branch 10. The battery thermal management module 1 is connected between the battery cooling branch 30 and the battery 4. The controller is configured to obtain a required power P1 and an actual power P2 of the battery, and regulate powers of the semiconductor heat exchange module 5 and the in-vehicle air conditioner 2 according to the required power P1 and the actual power P2 of the battery.

Optionally, as shown in FIG. 18, the temperature regulating system of an in-vehicle battery further includes an air conditioner vent and a first fan 501 disposed at the air conditioner vent. The in-vehicle air conditioner 2 includes a compressor 201; the battery cooling branch 30 includes a heat exchanger 3; the in-vehicle cooling branch 20 includes an evaporator 21; the semiconductor heat exchange module 5 includes a cooling end, a heating end, and fans (a fourth fan 504 and a fifth fan 505) connected to the heating end and the cooling end of the semiconductor. The cooling end of the semiconductor heat exchange module 5 corresponds to the in-vehicle cooling branch 20.

Specifically, as shown in FIG. 18, the in-vehicle air conditioner includes a compressor 201 and a condenser 202. The battery cooling branch 30 includes: a heat exchanger 3, a second expansion valve 31, and a second electronic valve 32. The in-vehicle cooling branch 20 includes: an evaporator 21, a first expansion valve 22, and a first electronic valve 23. The compressor 201 is divided into two independent cooling branches starting from the condenser 202, which are the in-vehicle cooling branch 20 and the battery cooling branch 30 respectively. The first electronic valve 23 and the second electronic valve 32 are respectively configured to control opening and closing of the in-vehicle cooling branch 20 and the battery cooling branch 30. The first expansion valve 22 and the second expansion valve 31 may be respectively configured to control refrigerant flow rates of the in-vehicle cooling branch 20 and the battery cooling branch 30, to control the cooling powers of the in-vehicle cooling branch 20 and the battery cooling branch 30 respectively.

The battery cooling branch may include two branches. One branch is the in-vehicle air conditioner. The refrigerant of the in-vehicle air conditioner flows into the heat exchanger 3, and after the medium in the battery cooling pipe flows through the heat exchanger 3, the temperature is decreased, so that the battery temperature is decreased. The other branch is the semiconductor heat exchange module and the compressor 201. Air in the vehicle passes through the cooling end of the semiconductor heat exchanger, and the temperature is decreased. Then, the fourth fan 504 blows cooling air to the evaporator 21, so that the temperature of the evaporator 21 is decreased. At the same time, the refrigerant of the compressor 201 flows into the evaporator 21, and the air in the vehicle cooled by the semiconductor heat exchange module 5 flows through the evaporator 21, so that the temperature of the air is decreased again. Then, the first fan 501 blows cooling air to the heat exchanger 3 and the air conditioner vent, so that the temperature of the heat exchanger 3 is decreased, and the battery temperature is decreased. It may be appreciated that, the air conditioner vent may be disposed corresponding to the compartment, so that the first fan 501 blows cooling air to the compartment, the temperature of air in the vehicle is decreased, and the semiconductor further enhances the cooling effect of the air conditioner for the interior of the vehicle.

The cooling power of the in-vehicle cooling branch 20 mainly has two sources, one is the semiconductor heat exchange module 5, and the other is the compressor 201. The refrigerant of the in-vehicle air conditioner 201 flows into the heat exchanger 21, and after the medium in the battery cooling pipe flows through the heat exchanger 3, the temperature is decreased, so that the battery temperature is decreased. Air in the vehicle passes through the cooling end of the semiconductor heat exchanger 5, and the temperature is decreased. Then, the fourth fan 504 blows cooling air to the evaporator 21, so that the temperature of the evaporator 21 is decreased. At the same time, the refrigerant flows into the evaporator 21, and the air in the vehicle cooled by the semiconductor heat exchange module 5 flows through the evaporator 21, so that the temperature of the air is decreased again. Then, the first fan 501 blows cooling air to the heat exchanger 3, so that the temperature of the heat exchanger 3 is decreased, and the battery temperature is decreased.

The cooling power of the battery is provided by the in-vehicle air conditioner and the semiconductor heat exchange module, and shares the refrigerating capacity with an in-vehicle refrigerating system. The volume and refrigerating capacity of the temperature regulating system are distributed more flexibly, which not only can meet the requirement of the cooling power in the compartment, but also can meet the cooling requirement of the battery.

Definitely, the semiconductor heat exchange module 5 may also provide a heating power for the battery. When the battery is heated, the semiconductor heat exchange module 5 may be controlled to supply power reversely, and positions of the cooling end and the heating end are exchanged; the first fan 501 may blow the power of the heating end to the heat exchanger, to provide a heating power.

When the temperature of the battery 4 is regulated, the controller further obtains the required power P1 and the actual power P2 of the battery in real time, where the required power P1 is a power that needs to be provided for the battery 4 when the temperature of the battery is regulated to the set target temperature, and the actual power P2 is an actual regulating power obtained by the battery 4 currently when temperature regulation is performed on the battery. The target temperature is a set value, and may be preset according to an actual condition of the in-vehicle battery. For example, when the battery is cooled, the target temperature may be set to about 35° C. Moreover, the controller regulates the power of the in-vehicle air conditioner and/or the semiconductor heat exchange module according to the required power P1 and the actual power P2. For example, when the battery is cooled, if P1 is greater than P2, the cooling power of the semiconductor heat exchange module 5 is increased, and the rotational speeds of the fourth fan 504 and the fifth fan 505 are controlled to increase, so that cooling of the battery 4 is completed as quickly as possible. Therefore, the temperature may be regulated when the temperature of the in-vehicle battery is excessively high, so that the temperature of the in-vehicle battery is maintained in a preset range, thereby avoiding the situation that the performance of the in-vehicle battery is affected by the excessively high temperature. Moreover, the cooling power of the battery is provided by the in-vehicle air conditioner and the semiconductor heat exchange module, and shares the refrigerating capacity with an in-vehicle refrigerating system. The volume and refrigerating capacity of the temperature regulating system are distributed more flexibly, which not only can meet the requirement of the cooling power in the compartment, but also can meet the cooling requirement of the battery.

As shown in FIG. 18, the battery thermal management module 1 includes a pump 12, a first temperature sensor 14, a second temperature sensor 15, and a flow velocity sensor 16 that are disposed on the heat exchange flow path. The pump 12 is configured to cause a medium in the heat exchange flow path to flow. The first temperature sensor 14 is configured to detect an inlet temperature of a medium that flows into the in-vehicle battery. The second temperature sensor 15 is configured to detect an outlet temperature of the medium that flows out of the in-vehicle battery. The flow velocity sensor 16 is configured to detect a flow velocity of the medium that flows in the heat exchange flow path.

Optionally, as shown in FIG. 18, the battery thermal management module 1 may further include a medium container 13 disposed on the heat exchange flow path, and the medium container 13 is configured to store a medium and provide the medium for the heat exchange flow path.

How to obtain the required power P1 and the actual power P2 of the battery 4 is described in the following with a specific example.

According to an embodiment of the present disclosure, the controller may be configured to obtain a first parameter when temperature regulation of the battery is started, and generate a first required power for temperature regulation of the battery according to the first parameter; obtain a second parameter during temperature regulation of the battery, and a second required power for temperature regulation of the battery according to the second parameter; and generate the required power P1 of the battery according to the first required power of the battery and the second required power of the battery.

Optionally, according to an embodiment of the present disclosure, the first parameter is an initial temperature when temperature regulation of the battery 4 is started, a target temperature, and a target time t it takes to reach the target temperature from the initial temperature. A first temperature difference $\Delta T_1$ between the initial temperature and the target temperature is obtained, and the first required power is generated according to the first temperature difference $\Delta T_1$ and the target time t.

Optionally, the first required power is generated through the following formula (1):

$$\Delta T_1 * C * M/t \qquad (1),$$

where $\Delta T_1$ is the first temperature difference between the initial temperature and the target temperature, t is the target time, C is the specific heat capacity of the battery 4, and M is the mass of the battery 4.

The second parameter is an average current I of the battery 4 in a preset time, and the battery thermal management module 1 generates the second required power through the following formula (2):

$$I^1 * R \qquad (2),$$

where I is the average current, and R is the internal resistance of the battery 4.

Specifically, a charge-discharge current parameter of the battery 4 may be detected by using a current Hall sensor. The battery management controller 61 may estimate the average current battery 4 of the according to the current parameter of the battery 4 in a period of time.

When the battery 4 is cooled, $P1=\Delta T_1 * C * M/t + I^2 * R$; and when the battery 4 is heated, $P1=\Delta T_1 * C * M/t - I^2 * R$.

According to an embodiment of the present disclosure, the controller further generates a second temperature difference $\Delta T_2$ according to the inlet temperature and the outlet temperature of the flow path of the battery, and generates the actual power P2 of the battery according to the second temperature difference $\Delta T_2$ of the battery and the flow velocity v of the medium in the flow path.

Optionally, according to an embodiment of the present disclosure, the actual power P2 is generated through the following formula (3):

$$\Delta T_2 * c * m \qquad (3)$$

where $\Delta T_2$ is the second temperature difference, c is the specific heat capacity of the medium in the flow path, and m is a mass of the medium flowing through a cross-sectional area of the flow path per unit time, where $m = v * \rho * s$, v is the flow velocity of the medium, $\rho$ is the density of the medium, and s is the cross-sectional area of the flow path.

Specifically, after the vehicle is powered on, the battery management controller 61 determines, according to the battery temperature, whether the battery requires temperature regulation. If it is determined that the battery requires temperature regulation, temperature regulating function enabling information is sent to the in-vehicle air conditioner through CAN communication, the in-vehicle air conditioner forwards the information to the battery thermal management controller 62, and the battery thermal management controller 62 controls the pump 12 to start working at a default rotational speed (for example, at a low rotational speed).

Then, the battery thermal management controller 62 obtains the initial temperature (that is, the current temperature) and the target temperature of the battery 4 and the target time t it takes to reach the target temperature from the initial temperature, where the target temperature and the target time t may be preset according to an actual condition, and the first required power of the battery 4 is calculated according to formula (1). At the same time, the battery thermal management controller 62 obtains the average current I of the battery 4 in the preset time, and calculates the second required power of the battery 4 according to formula (2). Then, the battery thermal management controller 62 calculates the required power P1 (that is, the required power for regulating the temperature of the battery 4 to the target temperature within the target time) according to the first required power and the second required power of the battery 4, where when the battery 4 is cooled, $P1=\Delta T_1 * C * M/t + I^2 * R$, and when the battery 4 is heated, $P1=\Delta T_1 * C * M/t - I^2 * R$. Moreover, the battery thermal management controller 62 respectively obtains temperature information detected by the first temperature sensor 14 and the second temperature sensor 15, obtains flow velocity information detected by the flow velocity sensor 16, and calculates the actual power P2 of the battery 4 according to the formula (3). Finally, the battery thermal management controller 62 controls the power of the semiconductor heat exchange module 5, or the in-vehicle air conditioner, or the heater 11 according to P1 and P2 of the battery 4, so as to precisely control the heating power/cooling power of the battery 4.

According to an embodiment of the present disclosure, the controller is further configured to obtain the temperature of the battery, and determine whether the temperature of the battery is greater than a first temperature threshold or less than a second temperature threshold. When the temperature of the battery is greater than the first temperature threshold, the cooling mode begins; and when the temperature of the battery is less than the second temperature threshold, the heating mode begins. The first temperature threshold is greater than the second temperature threshold. The first temperature threshold and the second temperature threshold may be preset according to an actual condition. For example, the first temperature threshold may be 40° C., and the second temperature threshold may be 0° C.

Specifically, after the vehicle is powered on, the battery management controller 61 obtains the temperature of the battery in real time, and makes a judgment. If the temperature of the battery is higher than 40° C., it indicates that the temperature of the battery 4 is excessively high at this moment, and to prevent the high temperature from affecting the performance of the battery 4, the temperature of the battery 4 needs to be decreased. The temperature regulating system enters the cooling mode. The controller controls the second electronic valve 32 to open and the semiconductor heat exchange module 3 to work.

If the temperature of the battery 4 is lower than 0° C., it indicates that the temperature of the battery 4 is excessively low, and to prevent the low temperature from affecting the performance of the battery 4, the temperature of the battery 4 needs to be increased. The temperature regulating system enters the heating mode. The battery thermal management controller 62 controls the heater 11 to turn on; at the same time, the in-vehicle air conditioner 2 keeps the second electronic valve 32 in a closed state; the flow direction of the medium is as follows: heat exchanger 3—heater 11 (turned on)—pump 12—first temperature sensor 14—battery 4—second temperature sensor 15—flow velocity sensor 16—medium container 13—heat exchanger 3. The heater 11 heats the medium in the cooling pipe, so that the medium exchanges heat with the battery 4, to complete temperature regulation of the battery.

According to an embodiment of the present disclosure, in the cooling mode, the controller is further configured to obtain a power difference between the required power P1 and the actual power P2 when the required power P1 is greater than the actual power P2, so that the power of the semiconductor heat exchange module 5 is increased according to the power difference, and when the required power P1 is less than or equal to the actual power P2, the power of the semiconductor heat exchange module 5 is reduced and/or the cooling power of the compressor is reduced, to save electrical energy, or the power of the semiconductor heat exchange module 5 and/or the compressor is kept unchanged.

Specifically, when the temperature regulating system works in the cooling mode, the controller obtains the required power P1 and the actual power P2 of the battery 4 and makes a judgment. If P1 of the battery 4 is greater than P2, it indicates that cooling of the battery 4 cannot be completed in the target time based on the current cooling power. Therefore, the controller increases the power of the semiconductor heat exchange module 5 and the rotational speeds of the fourth fan 504 and the fifth fan 505 according to the power difference, so that the temperature of the battery 4 is decreased to the target temperature within the preset time t. If P1 is less than or equal to P2, the cooling power of the semiconductor heat exchange module 5, the rotational speeds of the fourth fan 504 and the fifth fan 505, and the cooling power of the compressor may be reduced to save electrical energy, or the powers of the semiconductor heat exchange module 5 and the compressor may be kept unchanged. When the temperature of the battery is lower than 35° C., cooling of the battery 4 is completed; the semiconductor heat exchange module 5 is controlled to stop cooling and the second electronic valve 32 is controlled to close. If the temperature of the battery 4 is still higher than 35° C. after the temperature regulating system stays in the cooling mode for a long time, for example, one hour, the cooling power, and the rotational speeds of the fourth fan 504 and the fifth fan 505 are further increased appropriately, to complete cooling of the battery 4 as quickly as possible.

According to an embodiment of the present disclosure, as shown in FIG. 18, the battery thermal management module 1 may further include a heater 11 disposed on the heat exchange flow path, and the heater 11 is configured to heat the medium in the heat exchange flow path.

Specifically, the heater 11 may heat the medium, to perform temperature regulation on the battery when the battery temperature is relatively low. The heater may be a PTC heater; the heater is not in direct contact with the battery, and has high safety, reliability, and practicability. The pump 12 is mainly configured to provide dynamic. The medium container 13 is mainly configured to store the medium and accept the medium added to the temperature regulating system. When the medium in the temperature regulating system reduces, the medium in the medium container 13 may provide a supplement automatically. The first temperature sensor 14 is configured to detect the temperature of the medium at the inlet of the battery flow path, and the second temperature sensor 15 is configured to detect the temperature of the medium at the outlet of the battery flow path. The flow velocity sensor 16 is configured to detect flow velocity information of the medium in the pipe of the temperature regulating system.

As shown in FIG. 18, in the heating mode, when the required power P1 is greater than the actual power P2, the controller 6 obtains a temperature difference between the required power P1 and the actual power P2, and increases the heating power of the heater 11 according to the temperature difference, and when the required power P1 is less than or equal to the actual power P2, keeps the heating power of the heater 11 unchanged.

Specifically, when the temperature regulating system works in the heating mode, the controller obtains the required power P1 and the actual power P2 of the battery 4 and makes a judgment. If P1 of the battery 4 is greater than P2, it indicates that heating of the battery 4 cannot be completed in the target time based on the current heating power. The controller obtains the power difference between the required power P1 and the actual power P2 of the battery 4, and increases the power of the heater 11 and/or the semiconductor heat exchange module 5 according to the power difference, so that the temperature of the battery 4 is increased to the target temperature within the preset time t. If P1 is less than or equal to P2, the power of the heater 11 and/or the semiconductor heat exchange module 5 may be reduced to save electrical energy, or the power of the heater 11 and/or the semiconductor heat exchange module 5 is kept unchanged. When the temperature of the battery reaches a second set temperature, for example, 10° C., heating of the battery 4 is completed; the battery management controller 61 sends information of turning off the temperature regulation function to the battery thermal management controller 62 through CAN communication, to control the heater 11 to stop heating. If the temperature of the battery 4 is still lower than 10° C. after the temperature regulating system stays in the heating mode for a long time, for example, two hours, the battery thermal management controller 62 increases the power of the heater 11 appropriately, so that heating of the battery 4 is completed as quickly as possible.

Further, according to an embodiment of the present disclosure, as shown in FIG. 18, the controller is further configured to reduce the rotational speed of the pump 12 or keep the rotational speed of the pump 12 unchanged when the required power P1 is less than or equal to the actual power P2, and increase the rotational power of the pump 12 when the required power P1 is greater than the actual power P2.

Specifically, when the temperature regulating system enters the heating mode or the cooling mode, if P1 of the battery 4 is less than or equal to P2, the controller controls the rotational speed of the pump 12 to reduce, so as to save electrical energy, or keep the rotational speed of the pump 12 unchanged. If P1 of the battery 4 is greater than P2, in addition to increasing the power of the heater 11, it is also possible to control the rotational speed of the pump 12 to increase, so as to increase the mass of the medium flowing through a cross-sectional area of a cooling flow path per unit time, thereby increasing the actual power P2 of the battery 4, to implement temperature regulation within the target time t.

It may be appreciated that, the in-vehicle air conditioner may regulate power distribution of the cooling loops according to the compartment temperature as well as the required power P1 and the actual power P2 of the battery, thereby balancing cooling requirements of in-vehicle cooling and battery cooling.

In the cooling mode, if the required power P1 is greater than the actual power P2, the controller further determines whether the temperature of the battery is greater than the first preset temperature threshold; if the temperature of the battery is greater than or equal to the first preset temperature threshold, the controller increases a flow rate of the cooling liquid of the battery cooling branch, and reduces a flow rate of the cooling liquid of the in-vehicle cooling branch. If the temperature of the battery is less than the first preset temperature threshold, the controller further determines whether the temperature in the compartment reaches a set temperature of the air conditioner. If the temperature in the compartment does not reach the set temperature of the air conditioner, the flow rate of the cooling liquid of the in-vehicle cooling branch is increased, and the flow rate of the cooling liquid of the battery cooling branch is reduced. The first preset temperature threshold may be 45° C. Specifically, the flow rate of the cooling liquid of the in-vehicle cooling branch may be regulated by regulating the opening of the first expansion valve, and the flow rate of the cooling liquid of the battery cooling branch may be regulated by regulating the opening of the second expansion valve.

In a word, in the system shown in FIG. 18, The battery cooling power is a cooling power (provided by the compressor and controlled through the opening of the second expansion valve opening) in the battery cooling branch 30, and the in-vehicle cooling power is a cooling power (provided by the compressor and controlled through the opening of the first expansion valve opening) in the in-vehicle cooling branch 20.

1. When the battery is cooled, initial power distribution of battery cooling and in-vehicle cooling is as follows:

It is assumed that the required power for cooling of the battery is P1, the actual cooling power of the battery is P2, P3 is a maximum cooling power of the semiconductor heat exchange module, P6 is an in-vehicle cooling power, and P7 is a maximum cooling power of the compressor.

When a sum of the required power P1 for battery cooling and the required power P6 for in-vehicle cooling is less than or equal to the total power P7 of the compressor, that is, P1+P6≤P7, the compressor runs based on a cooling power of P1+P6. Moreover, P1<P7, and P6<P7. In addition, the opening of the first expansion valve is controlled, so that the in-vehicle cooling power is P6. The opening of the second expansion valve is controlled, so that the battery cooling power is P1.

When P7<P1+P6≤P7+P3, Pe=P1+P6−P7, and Pf=P1+P6−P3, the compressor runs based on the maximum cooling power P7, and the semiconductor heat exchange module runs based on a cooling power of Pe. The cooling power of the battery cooling branch is P1, and the power of the in-vehicle cooling branch is equal to P6. Alternatively, the semiconductor ventilation module runs based on the maximum cooling power P3, and the compressor runs based on a cooling power of Pf. In addition, the opening of the first expansion valve is controlled, so that the in-vehicle cooling power is P6. The opening of the second expansion valve is controlled, so that the battery cooling power is P1.

When P1+P6>P7+P3, it is determined whether the battery temperature is greater than 45° C. If the battery temperature is greater than 45° C., the cooling power is first provided for the battery cooling, the compressor runs based on the maximum cooling power P7, and the semiconductor heat exchange module runs based on the maximum cooling power P3. In addition, the rotational speed of the fan is increased. The opening of the second expansion valve is increased, so that the cooling power of the battery cooling branch is P1, and the opening of the first expansion valve is reduced, so that the power of the in-vehicle cooling branch is equal to P7+P3−P1. If it is determined that the battery temperature is not greater than 45° C., and the in-vehicle temperature has not reached the set temperature yet, the cooling power is first provided for the interior of the compartment, the compressor runs based on the maximum cooling power P7, and the semiconductor heat exchange module runs based on the maximum cooling power P3. In addition, the rotational speed of the fan is increased. The opening of the first expansion valve is increased, so that the cooling power of the in-vehicle cooling branch is P6, and the opening of the second expansion valve is reduced, so that the cooling power of the battery cooling branch is equal to P7+P3−P6. If the in-vehicle temperature has already reached the set temperature, the cooling power of the battery is satisfied first.

The power distribution in the battery cooling process is as follows:

If P1>P2, Pc=P1−P2, and P1+P6+Pc<P7, the cooling power of the compressor is increased by Pc accordingly, and the opening of the second expansion valve is increased, to increase the rotational speed of the water pump, so as to increase the battery cooling power.

If P1>P2, Pc=P1−P2, P7<P1+P6+Pc≤P7+P3, Pg=P1+P6+Pc−P7, and Ph=P1+P6+Pc−P3, the compressor runs based on the maximum cooling power P7, and the semiconductor ventilation module runs based on a cooling power of Pg. Alternatively, the compressor runs based on a cooling power of Ph, and the semiconductor ventilation module runs based on the maximum cooling power P3. Alternatively, the compressor runs based on the maximum cooling power P7, and the cooling power of the semiconductor heat exchange module is increased by Pc. Alternatively, the cooling power of the compressor is increased by Pc, and the semiconductor heat exchange module runs based on the maximum cooling power P3. Alternatively, the cooling power of the compressor remains unchanged, and the cooling power of the semiconductor heat exchange module is increased by Pc. Alternatively, the cooling power of the compressor is increased by Pc, and the cooling power of the semiconductor heat exchange module remains unchanged. Alternatively, the cooling power of the compressor is increased by 0.5*Pc, and the cooling power of the semiconductor heat exchange module is increased by 0.5 Pc. Alternatively, the cooling powers of the compressor and the semiconductor heat exchange module are increased proportionally based on a ratio between respective maximum cooling powers. In addition, the opening of the second expansion valve is increased, the rotational speed of the pump is controlled to increase, and the rotational speed of the fan is increased, so that the cooling power of the battery cooling branch is increased by Pc.

If P1>P2, Pc=P1−P2, and P1+P6+Pc>P7+P3, the compressor runs based on the maximum cooling power P5, and the semiconductor heat exchange module runs based on the maximum cooling power P3. In addition, the rotational speed of the fan is increased, and the rotational speed of the pump is increased, so as to increase the heat exchange power. In this case, it is determined whether the battery temperature is greater than 45° C. If the battery temperature is greater than 45° C., the cooling power is first provided for the battery cooling, the compressor runs based on the maximum cooling power P7, and the semiconductor heat exchange module runs based on the maximum cooling power P3. In addition, the rotational speed of the fan is increased. The opening of the second expansion valve is increased, so that the cooling power of the battery cooling branch is P1+Pc, and the opening of the first expansion valve is reduced, so that the power of the in-vehicle cooling branch is equal to P7+P3−P1−Pc. In addition, the rotational speed of the pump is controlled to increase, and the rotational speed of the fan is increased, so that the cooling power of the battery cooling branch is increased by Pc. If it is determined that the battery temperature is not greater than 45° C., and the in-vehicle temperature has not reached the set temperature yet, the cooling power is first provided for the interior of the compartment, the compressor runs based on the maximum cooling power P7, and the semiconductor heat exchange module runs based on the maximum cooling power P3. In addition, the rotational speed of the fan is increased. The opening of the first expansion valve is increased, so that the cooling power of the in-vehicle cooling branch is P6, and the opening of the second expansion valve is reduced, so that the cooling power of the battery cooling branch is equal to P7+P3−P6. If the in-vehicle temperature has already reached the set temperature, the cooling power of the battery is satisfied first.

If P1≤P2 and Pc=P2−P1, the cooling power of the compressor remains unchanged, and the cooling power of the semiconductor heat exchange module remains unchanged; alternatively, the cooling power of the compressor is reduced, and the cooling power of the semiconductor heat exchange module is reduced; alternatively, the opening of the second expansion valve is reduced, or the rotational speed of the pump is reduced, so that the cooling power of the battery cooling branch is decreased by Pc.

2. When the battery is heated, it is assumed that the required power for heating of the battery is P1, the actual heating power of the battery is P2, P4 is a maximum heating power of the semiconductor heat exchange module, and P5 is a maximum heating power of the PTC heater.

If P1≤P5, the PTC heater provides a heating power for the battery based on the heating power P1.

If P1>P5, P1≤P5+P4, and P1−P5=Pd, the PTC heater provides the heating power for the battery based on the maximum heating power P5, and the semiconductor heat exchange module provides the heating power for the battery based on a heating power of Pd. In addition, the rotational speeds of the fourth fan and the fifth fan are increased, and the rotational speed of the pump is also increased, to increase the heat exchange power. If P1>P5 and P1>P5+P4, the PTC heater provides the heating power for the battery based on the maximum heating power P5, and the semiconductor heat exchange module provides the heating power for the battery based on the maximum heating power P3. In addition, the rotational speeds of the fourth fan and the fifth fan are increased, and the rotational speed of the pump is also increased, to increase the heat exchange power.

In the heating process, if P1≤P2, and Pc=P2−P1, the semiconductor heat exchange module reduces the heating power Pc, and reduces the rotational speeds of the fourth fan and the fifth fan; alternatively, the heating power of the PTC heater is reduced by Pc, and the rotational speed of the pump is reduced, to save electrical energy. Alternatively, the current heating power is kept unchanged.

In the heating process, if P1>P2, Pc=P1−P2, and P1+Pc≤P5, the PTC heater increases the heating power by Pc, and the pump is controlled to increase the rotational speed, so as to increase the heating power of the battery.

If P1>P2, Pc=P1−P2, P5<P1+Pc≤P5+P4, Pi=P1+Pc−P5, and Pj=P1+Pc−P4, the PTC heater runs based on the maximum heating power P5, the semiconductor heat exchange module runs based on a heating power of Pi. Alternatively, the PTC heater runs based on a heating power of Pj, and the semiconductor heat exchange module runs based on the maximum heating power P4. Alternatively, the PTC heater provides the heating power for the battery based on the maximum heating power P5, and the heating power of the semiconductor heat exchange module is increased by Pc. Alternatively, the heating power of the heater remains unchanged, and the heating power of the semiconductor heat exchange module is increased by Pc. Alternatively, the heating power of the heater is increased by Pc, and the heating power of the semiconductor heat exchange module remains unchanged. Alternatively, the heating power of the PTC heater is increased by 0.5*Pc, and the heating power of the semiconductor heat exchange module is increased by 0.5 Pc. Alternatively, the heating powers of the PTC heater and the semiconductor heat exchange module are increased proportionally based on a ratio between respective maximum heating powers. In addition, the rotational speeds of the fourth fan and the fifth fan are increased, and the rotational speed of the pump is increased, so as to increase the heat exchange power, so that the heating power of the battery is increased by Pc.

If P1>P2, Pc=P1−P2, and P1+Pc>P5+P4, the PTC heater provides the heating power for the battery based on the maximum heating power P5, and the semiconductor heat exchange module provides the heating power for the battery based on the maximum heating power P4. In addition, the rotational speeds of the fourth fan and the fifth fan are increased, and the rotational speed of the pump is also increased, to increase the heat exchange power.

Figure 19:
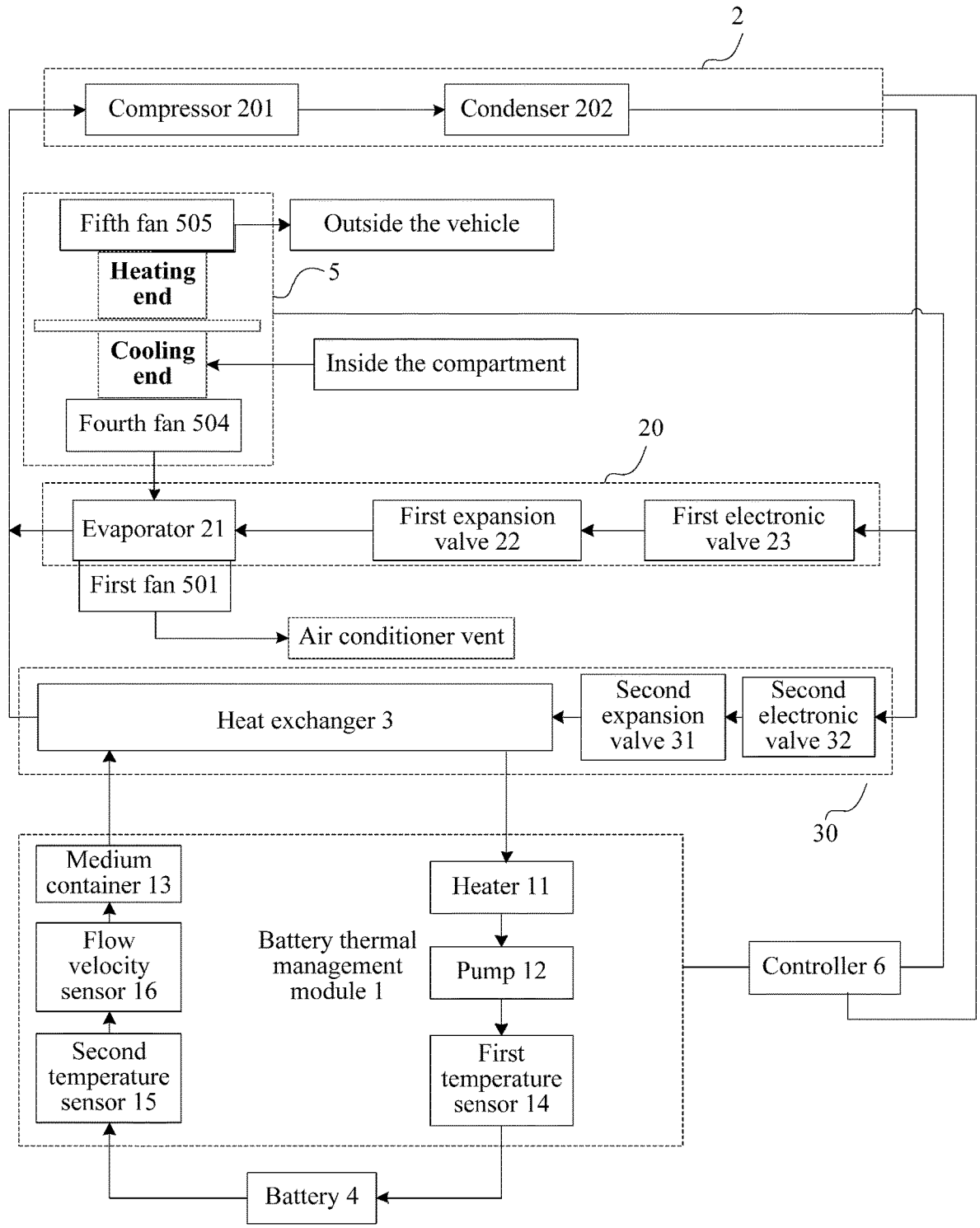
FIG. 19 is a schematic structural diagram of a temperature regulating system of an in-vehicle battery according to a tenth embodiment of the present disclosure.

In addition, as shown in FIG. 19, the present disclosure further provides a temperature regulating system of an in-vehicle battery, which differs from the solution shown in FIG. 18 in that, the battery cooling branch 30 in FIG. 19 mainly provides the cooling power for the battery 4 through the heat exchanger 3. The semiconductor heat exchange module does not participate in temperature regulation of the batter.

Figure 20:
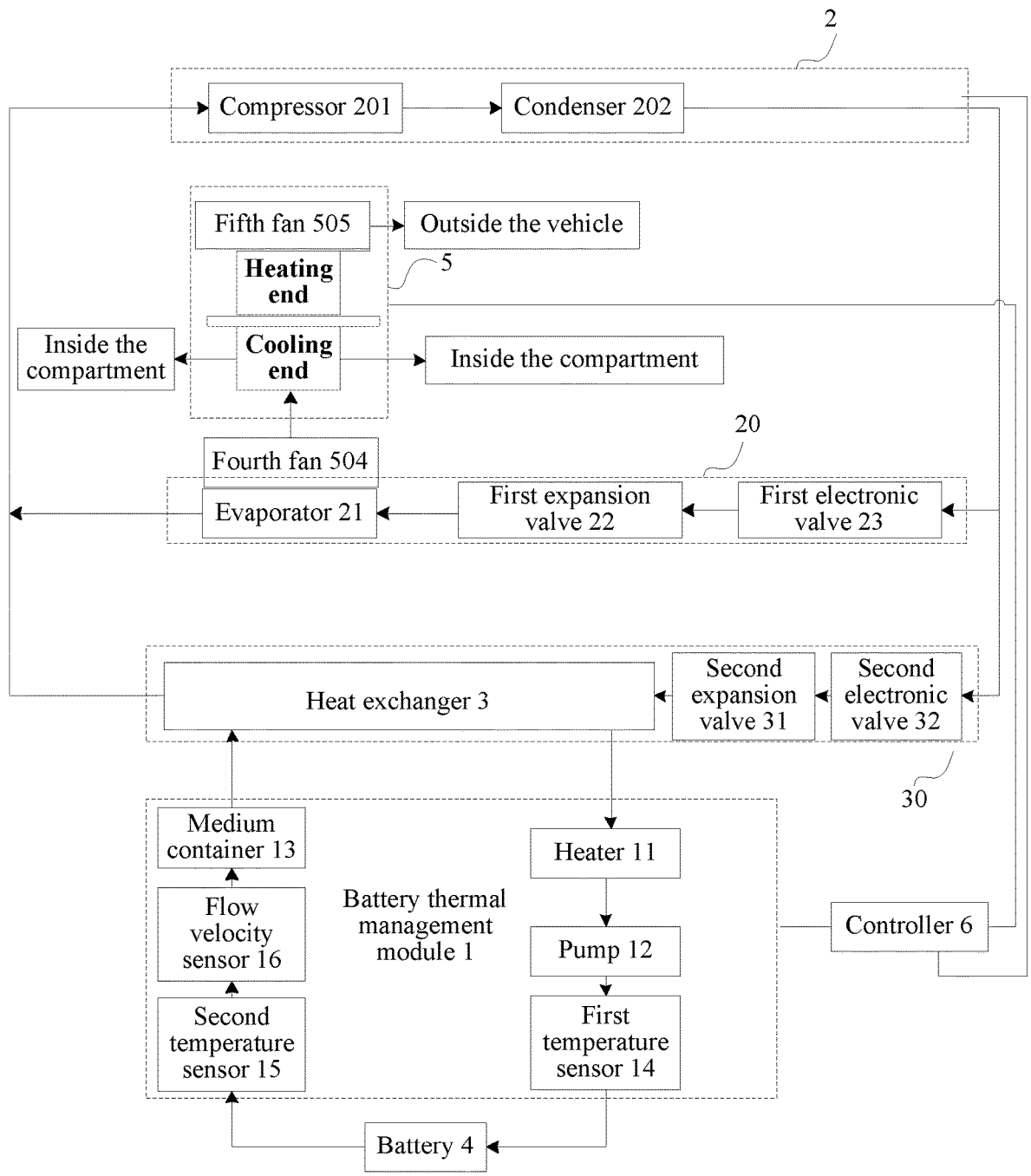
FIG. 20 is a schematic structural diagram of a temperature regulating system of an in-vehicle battery according to an eleventh embodiment of the present disclosure.

FIG. 20 shows another temperature regulating system of an in-vehicle battery. The compressor 201 is divided into two independent cooling branches starting from the condenser, which are the in-vehicle cooling branch 20 and the battery cooling branch 30 respectively. The in-vehicle cooling branch 20 mainly provides the cooling power for space in the compartment through the evaporator 21, and the battery cooling branch 30 mainly provides the cooling power for battery cooling through the heat exchanger 3. The cooling power of the in-vehicle cooling branch mainly has two sources, one is the compressor 201. The refrigerant of the compressor 201 flows into the evaporator 21, air in the vehicle flows through the evaporator 21 so that the temperature of the air is decreased. Then, the fourth fan 504 blows cooling air to the cooling end of the semiconductor heat exchange module 5, so that the temperature of the cooling end of the semiconductor heat exchange module 5 is decreased. The other is the semiconductor heat exchange module 5. After air in the vehicle is cooled by the evaporator 21, the temperature is decreased. The air then passes through the cooling end of the semiconductor heat exchange module 5, and the temperature is decreased again. Then, the cooling air is blown into the vehicle, so that the temperature in the vehicle is decreased. Heat of the heating end is dissipated heat through the fifth fan 505, and hot air is blown to the outside of the vehicle.

The temperature regulating system of an in-vehicle battery according to the embodiments of the present disclosure can regulate the temperature when the temperature of the in-vehicle battery is excessively high or excessively low, so that the temperature of the in-vehicle battery is maintained in a preset range, thereby avoiding the situation that the performance of the in-vehicle battery is affected by the excessively high temperature.

Figure 21:
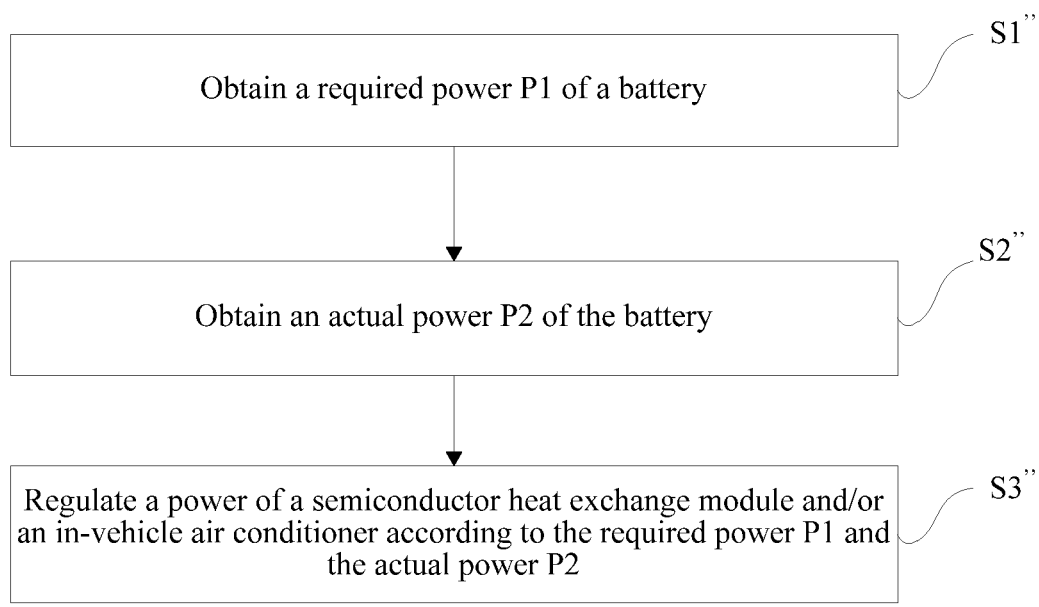
FIG. 21 is a flowchart of a temperature regulating method of an in-vehicle battery according to a fourth embodiment of the present disclosure.

FIG. 21 is a flowchart of a temperature regulating method of an in-vehicle battery according to a fourth embodiment of the present disclosure. As shown in FIG. 18, there are an in-vehicle air conditioner, an in-vehicle cooling branch, a battery cooling branch, a semiconductor heat exchange module, and a battery thermal management module. The in-vehicle air conditioner is configured to provide a cooling power for the in-vehicle cooling branch and the battery cooling branch. The battery cooling branch is connected to the in-vehicle air conditioner. The battery thermal management module is connected between the battery cooling branch and the battery. The semiconductor heat exchange module is configured to provide a cooling power for the in-vehicle cooling branch and the battery cooling branch. As shown in FIG. 21, the method includes the following steps:

S1". Obtain a required power P1 of the battery.

Optionally, according to an embodiment of the present disclosure, the obtaining a required power P1 of the battery by a battery management controller 61 specifically includes: obtaining, by the battery management controller 61, a first parameter of the battery when temperature regulation is started, and generating a first required power for temperature regulation of the battery according to the first parameter; obtaining, by the battery management controller 61, a second parameter of the battery during temperature regulation, and generating a second required power according to the second parameter; and generating the required power P1 of the battery by the battery management controller 61 according to the first required power of the battery and the second required power of the battery.

Optionally, according to an embodiment of the present disclosure, the first parameter is an initial temperature when temperature regulation of the battery is started, a target temperature, and a target time t it takes to reach the target temperature from the initial temperature. The generating, by the battery management controller 61, a first required power for temperature regulation of the battery according to the first parameter specifically includes: obtaining, by the battery management controller 61, a first temperature difference $\Delta T_1$ between the initial temperature and the target temperature; and generating first required power according to the first temperature difference $\Delta T_1$ and the target time t.

Optionally, according to an embodiment of the present disclosure, the first required power is generated according to the following formula (1):

$$\Delta T_1 * C * M / t \quad (1)$$

where $\Delta T_1$ is the first temperature difference between the initial temperature and the target temperature, t is the target time, C is the specific heat capacity of the battery, and M is the mass of the battery.

According to an embodiment of the present disclosure, the second parameter is an average current I of the battery in a preset time, and the second required power is generated through the following formula (2):

$$I^2 * R \quad (2)$$

where I is the average current, and R is the internal resistance of the battery.

When the battery is cooled, $P1=\Delta T_1*C*M/t+I^2*R$; and when the battery is heated, $P1=\Delta T_1*C*M/t-I^2*R$.

S2". Obtain an actual power P2 of the battery.

According to an embodiment of the present disclosure, the obtaining, by the battery thermal management controller 62, an actual power P2 of the battery specifically includes: obtaining, by the battery thermal management controller 62, an inlet temperature and an outlet temperature of a flow path for regulating the battery temperature, obtaining a flow velocity v of a medium flowing into the flow path, generating a second temperature difference $\Delta T_2$ according to the inlet temperature and the outlet temperature of the flow path of the battery, and generating the actual power P2 according to the second temperature difference $\Delta T_2$ and the flow velocity v.

Optionally, according to an embodiment of the present disclosure, the actual power P2 is generated through the following formula (3):

$$\Delta T_2 * c * m \quad (3)$$

where $\Delta T_2$ is the second temperature difference, c is the specific heat capacity of the medium in the flow path, and m is a mass of the medium flowing through a cross-sectional area of the flow path per unit time, where $m=v*\rho*s$, v is the flow velocity of the medium, $\rho$ is the density of the medium, and s is the cross-sectional area of the flow path.

S3". Regulate the power of the semiconductor heat exchange module and/or the in-vehicle air conditioner according to the required power P1 and the actual power P2.

Optionally, as shown in FIG. 18, the temperature regulating system of an in-vehicle battery further includes an air conditioner vent and a first fan disposed at the air conditioner vent.

Specifically, when the temperature of the battery is relatively high, for example, higher than 40° C., the temperature regulating system of an in-vehicle battery enters the cooling mode, the battery thermal management module and the semiconductor heat exchange module supply power positively (FIG. 18), and the in-vehicle air conditioner performs refrigeration. If the temperature of the battery is lower than 0° C., it indicates that the temperature of the battery is excessively low at this moment, and to prevent the low temperature from affecting the performance of the battery, the temperature of the battery needs to be increased. The temperature regulating system enters the heating mode. The semiconductor controller 64 controls the semiconductor heat exchange module to supply power reversely, so that positions of the cooling end and the heating end are exchanged. The first fan may blow the power of the heating end to the heater, to increase the heating power.

When the temperature of the battery is regulated, the initial temperature (that is, the current temperature) and the target temperature of the battery, and the target time t it takes to reach the target temperature from the initial temperature are obtained by the battery thermal management controller 61, where the target temperature and the target time t may be preset according to an actual condition, and the first required power is calculated according to formula (1). At the same time, the battery thermal management controller 61 obtains the average current I of the battery in the preset time, and calculates the second required power of the battery according to formula (2). Then, the battery management controller 61 calculates the required power P1 (that is, a power required for regulating the temperature of the battery to the target temperature) of the battery according to the first required power and the second required power. Moreover, the battery thermal management controller 62 obtains the inlet temperature and the outlet temperature of the battery, obtains flow velocity information, and calculates the actual power P2 of the battery according to formula (3). The required power P1 is a power that needs to be provided for the battery when the temperature of the battery is regulated to the set target temperature, and the actual power P2 is an actual power obtained by the battery currently when temperature regulation is performed on the battery. The target temperature is a set value, and may be preset according to an actual condition of the in-vehicle battery. For example, when the battery is cooled, the target temperature may be set to about 35° C. Then, the power of the semiconductor heat exchange module and/or the in-vehicle air conditioner is regulated according to the required power P1 and the actual power P2. For example, when the battery is cooled, if P1 is greater than P2, the controller increases the cooling power of the semiconductor heat exchange module and/or the in-vehicle air conditioner, and controls the rotational speeds of the fourth fan and the fifth fan to increase, so that cooling of the battery is completed as quickly as possible. Therefore, the temperature may be regulated when the temperature of the in-vehicle battery is excessively high, so that the temperature of the in-vehicle battery is maintained in a preset range, thereby avoiding the situation that the performance of the in-vehicle battery is affected by the temperature. The cooling power of the battery temperature regulating system is provided by the in-vehicle air conditioner and the semiconductor heat exchange module, and shares the refrigerating capacity with an in-vehicle refrigerating system. The volume and refrigerating capacity of the temperature regulating system are distributed more flexibly, which not only can meet the requirement of the cooling power in the compartment, but also can meet the cooling requirement of the battery.

According to an embodiment of the present disclosure, as shown in FIG. 18, a pump, a first temperature sensor, a second temperature sensor, and a flow velocity sensor are disposed on the heat exchange flow path. The pump is configured to cause a medium in the heat exchange flow path to flow. The first temperature sensor is configured to detect an inlet temperature of a medium that flows into the in-vehicle battery. The second temperature sensor is configured to detect an outlet temperature of the medium that flows out of the in-vehicle battery. The flow velocity sensor is configured to detect a flow velocity of the medium that flows in the heat exchange flow path.

Optionally, as shown in FIG. 18, the battery thermal management module may further include a medium container disposed on the heat exchange flow path, and the medium container is configured to store a medium and provide the medium for the heat exchange flow path.

According to an embodiment of the present disclosure, the foregoing temperature regulating method may further include: obtaining the temperature of the battery, and determining whether the temperature of the battery is greater than a first temperature threshold; when the temperature of the battery is greater than the first temperature threshold, entering the cooling mode; when the temperature of the battery is less than or equal to the first temperature threshold, further determining whether the temperature of the battery is less than a second temperature threshold; when the temperature of the battery is less than the second temperature threshold, entering the heating mode. The first temperature threshold is greater than the second temperature threshold. The first temperature threshold and the second temperature threshold may be preset according to the actual condition, for example, the first temperature threshold may be 40° C., and the second temperature threshold may be 0° C.

Specifically, after the vehicle is powered on, the battery management controller 61 obtains the temperature of the battery in real time, and makes a judgment. If the temperature of the battery is higher than 40° C., it indicates that the temperature of the battery is excessively high at this moment, and to prevent the high temperature from affecting the performance of the battery, the temperature of the battery needs to be decreased. The temperature regulating system enters the cooling mode, to control the in-vehicle air conditioner to perform refrigeration and the semiconductor heat exchange module to supply power positively.

If the temperature of the battery is lower than 0° C., it indicates that the temperature of the battery 4 is excessively low at this moment, and to prevent the low temperature from affecting the performance of the battery, the temperature of the battery needs to be increased. The temperature regulating system enters the heating mode. The semiconductor controller 64 controls the semiconductor heat exchange module to supply power reversely.

Optionally, in the cooling mode, the regulating the power of the semiconductor heat exchange module and/or the in-vehicle air conditioner according to the required power P1 and the actual power P2 includes: determining whether the required power P1 is greater than the actual power P2; if the required power P1 is greater than the actual power P2, obtaining a power difference between the required power P1 and the actual power P2, and increasing the power of the semiconductor heat exchange module and/or the compressor according to the power difference; if the required power P1 is less than or equal to the actual power P2, reducing the power of the semiconductor heat exchange module and/or the cooling power of the compressor, or keeping the power of the semiconductor heat exchange module and/or the compressor unchanged.

Specifically, when the temperature regulating system works in the cooling mode, the controller obtains the required power P1 and the actual power P2 of the battery and makes a judgment. If P1 of the battery is greater than P2, it indicates that cooling of the battery cannot be completed in the target time based on the current cooling power. Therefore, the controller obtains the power difference between the required power P1 and the actual power P2 of the battery, and the semiconductor controller 64 increases the power of the semiconductor heat exchange module and the rotational speeds of the fourth fan and the fifth fan according to the power difference, so that the temperature of the battery is decreased to the target temperature within the preset time t. If P1 is less than or equal to P2, the power of the semiconductor heat exchange module and the rotational speeds of the fourth fan and the fifth fan may be reduced, and/or the in-vehicle air conditioner controller 63 reduces the cooling power of the compressor to save electrical energy, or keeps the powers of the semiconductor heat exchange module and the compressor unchanged. When the temperature of the battery is lower than 35° C., cooling of the battery is completed; the semiconductor controller 64 controls the semiconductor heat exchange module to stop cooling. If the temperature of the battery is still higher than 35° C. after the temperature regulating system stays in the cooling mode for a long time, for example, one hour, the semiconductor controller 64 further increases the cooling power of the semiconductor heat exchange module, and the rotational speeds of the fourth fan and the fifth fan appropriately, to complete cooling of the battery as quickly as possible.

As shown in FIG. 18, when the temperature regulating system works in the cooling mode, if the required power P1 is greater than the actual power P2, it is determined whether the temperature of the battery is greater than the first preset temperature threshold; if the temperature of the battery is greater than or equal to the first preset temperature threshold, a flow rate of the cooling liquid of the battery cooling branch is increased, and a flow rate of the cooling liquid of the in-vehicle cooling branch is reduced. If the temperature of the battery is less than the first preset temperature threshold, it is further determined whether the temperature in the compartment reaches a set temperature of the air conditioner. If the temperature in the compartment does not reach the set temperature of the air conditioner, the flow rate of the cooling liquid of the in-vehicle cooling branch is increased, and the flow rate of the cooling liquid of the battery cooling branch is reduced. Specifically, the flow rate of the cooling liquid of the in-vehicle cooling branch may be regulated by regulating the opening of the first expansion valve, and the flow rate of the cooling liquid of the battery cooling branch may be regulated by regulating the opening of the second expansion valve.

According to an embodiment of the present disclosure, as shown in FIG. 18, the battery thermal management module further includes a heater. The heater is connected to the controller, and is configured to heat the medium in the heat exchange flow path. In the heating mode, the method may further include: determining whether the required power P1 is greater than the actual power P2; if the required power P1 is greater than the actual power P2, obtaining a power difference between the required power P1 and the actual power P2, and increasing the heating power of the heater and/or the power of the semiconductor heat exchange module according to the power difference; if the required power P1 is less than or equal to the actual power P2, keeping the heating power of the heater unchanged, and/or reducing the heating power of the heater and/or the semiconductor heat exchange module.

Specifically, when the temperature regulating system works in the heating mode, the controller obtains the required power P1 and the actual power P2 of the battery and makes a judgment. If P1 of the battery is greater than P2, it indicates that heating of the battery cannot be completed in the target time based on the current heating power. The controller obtains the power difference between the required power P1 and the actual power P2 of the battery 4, and increases the power of the heater and/or the semiconductor heat exchange module according to the power difference, so that the temperature of the battery is increased to the target temperature within the preset time t. If P1 is less than or equal to P2, the controller reduces the heating power of the heater and/or the semiconductor heat exchange module to save electrical energy, or keeps the power of the heater unchanged, or keeps the power of the semiconductor heat exchange module unchanged. When the temperature of the battery reaches a second set temperature, for example, 10° C., battery heating is completed, and the controller controls the heater to stop heating. If the temperature of the battery is still lower than 10° C. after the temperature regulating system stays in the heating mode for a long time, for example, two hours, the power of the heater is increased appropriately, so that heating of the battery is completed as quickly as possible.

Further, according to an embodiment of the present disclosure, as shown in FIG. 18, the battery thermal management module includes a pump, a first temperature sensor, a second temperature sensor, and a flow velocity sensor that are disposed on the heat exchange flow path. The pump, the first temperature sensor, the second temperature sensor, and the flow velocity sensor are connected to the controller. The pump is configured to cause a medium in the heat exchange flow path to flow. The first temperature sensor is configured to detect an inlet temperature of a medium that flows into the in-vehicle battery. The second temperature sensor is configured to detect an outlet temperature of the medium that flows out of the in-vehicle battery. The flow velocity sensor is configured to detect a flow velocity of the medium that flows in the heat exchange flow path. The foregoing method further includes: if the required power P1 is less than or equal to the actual power P2, reducing the rotational speed of the pump or keeping the rotational speed of the pump unchanged; if the required power P1 is greater than the actual power P2, increasing the rotational pump of the pump.

Specifically, when the temperature regulating system enters the heating mode or the cooling mode, if P1 of the battery is less than or equal to P2, the battery thermal management controller 62 controls the rotational speed of the pump to reduce, so as to save electrical energy, or keep the rotational speed of the pump unchanged. If P1 of the battery is greater than P2, in addition to controlling, by the semiconductor controller 64, the power of the semiconductor heat exchange module to increase or controlling, by the battery thermal management controller 62, the power of the heater to increase, it is also possible to control, by the battery thermal management controller 62, the rotational speed of the pump to increase, so as to increase the mass of the medium flowing through a cross-sectional area of a cooling flow path per unit time, thereby improving the actual power P2 of the battery, to implement temperature regulation within the target time t.

In temperature regulating method of an in-vehicle battery according to the embodiment of the present disclosure, the heating power and cooling power of each battery may be precisely controlled according to an actual state of each battery, and the temperature is regulated when the temperature of the battery is excessively high or excessively low, so that the temperature of the battery is maintained in a preset range, thereby avoiding the situation that the performance of the in-vehicle battery is affected by the temperature.

In addition, the present disclosure further provides a non-temporary computer readable storage medium, which stores a computer program. When executed by a processor, the program implements the foregoing temperature regulating method.

In the embodiment of the present disclosure, the in-vehicle air conditioner exchanges heat with the heat exchanger through the air conditioner vent and the first air duct, and the in-vehicle air conditioner exchanges heat with the compartment through the air conditioner vent and the fourth air duct. The semiconductor heat exchange module exchanges heat with the heat exchanger through the second air duct and the first fan. The semiconductor heat exchange module exchanges heat with the compartment through the third air duct 300. After the in-vehicle air conditioner exchanges heat with the semiconductor heat exchange module through the air conditioner vent and the second air duct, the semiconductor heat exchange module exchanges heat with the compartment through the third air duct. After the in-vehicle air conditioner exchanges heat with the semiconductor heat exchange module through the air conditioner vent, the fourth air duct, the compartment, and the third air duct, the semiconductor heat exchange module exchanges heat with the heat exchanger through the second air duct and the first fan. The in-vehicle air conditioner exchanges heat with the heat exchanger through the air conditioner vent and the first air duct, and the semiconductor heat exchange module exchanges heat with the heat exchanger through the second air duct and the first fan.

According to the non-temporary computer readable storage medium in the embodiment of the present disclosure, a required power for temperature regulation and an actual power for temperature regulation of the battery may be obtained, and then the power of the semiconductor heat exchange module and/or the in-vehicle air conditioner is regulated according to the required power for temperature regulation and the actual power for temperature regulation, to regulate the temperature when the temperature of the in-vehicle battery is excessively high or excessively low, so that the temperature of the in-vehicle battery is maintained in a preset range, thereby avoiding the situation that the performance of the in-vehicle battery is affected by the excessively high temperature.

In the description of the present disclosure, it should be noted that direction or position relationships indicated by terms such as "central", "longitudinal", "lateral", "length", "width", "thickness", "upper", "lower", "front", "rear", "left", "right", "vertical", "horizontal", "top", "bottom", "inner", "outer", "clockwise", "anticlockwise", "axial", "radial", and "circumferential" refer to direction or position relationships shown in the accompanying drawings, and are used only for description of the present disclosure and for brevity of description, rather than indicating or implying that the mentioned apparatus or element need to have a particular orientation or need to be constructed and operated in a particular orientation. Therefore, such terms should not be construed as a limitation on the present disclosure.

Moreover, the terms "first" and "second" are used for descriptive purposes only and are not to be construed as indicating or implying a relative importance or implicitly indicating the number of technical features indicated. Therefore, features defined by "first" and "second" may include one or more of the features, either explicitly or implicitly. In the description of the present disclosure, unless otherwise specifically defined, "a plurality of" means two or more, for example, two or three.

In the present disclosure, unless otherwise explicitly specified or defined, the terms such as "mount", "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two elements or an interaction relationship between two elements, unless otherwise explicitly defined. A person of ordinary skill in the art may understand the specific meanings of the foregoing terms in the present disclosure according to specific situations.

In the present disclosure, unless otherwise explicitly specified or defined, the first feature being located "on" or "under" the second feature may be the first feature being in direct contact with the second feature, or the first feature being in indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

Throughout the description of this specification, the description of the reference terms such as "an embodiment", "some embodiments", "example", "specific example", or "some examples" means that the specific features, structures, materials or characteristics described with reference to the embodiment or example are included in at least one embodiment or example of the present disclosure. In this specification, the schematic expressions about the foregoing terms do not necessarily refer to the same embodiment or example. Moreover, the specific features, structures, materials, or characteristics described may be combined in any one or more embodiments or examples in an appropriate manner. In addition, a person skilled in the art may integrate and combine different embodiments or examples and characteristics of different embodiments or examples described in this specification without contradiction.

Although the embodiments of the present disclosure have been shown and described above, it may be understood that the foregoing embodiments are merely examples, and should not be construed as a limitation on the present disclosure. A person of ordinary skill in the art may make various changes, modifications, replacements and variations to the embodiments without departing from the scope of the present disclosure.

What is claimed is:

1. A temperature regulating system of an in-vehicle battery, comprising:
   a heat exchanger;
   an in-vehicle air conditioner, wherein the in-vehicle air conditioner is provided with an air conditioner vent, a first air duct is formed between the air conditioner vent and the heat exchanger, a first fan is disposed in the first air duct, and the first fan is disposed corresponding to the heat exchanger;
   a semiconductor heat exchange module having both a heating end and a cooling end, wherein a second air duct is formed between the cooling end of the semiconductor heat exchange module and the first fan, and a third air duct is formed between the cooling end of the semiconductor heat exchange module and a compartment;
   a battery thermal management module, wherein the battery thermal management module is connected to the heat exchanger to form a heat exchange flow path; and
   a controller, connected to the semiconductor heat exchange module, the battery thermal management module, and the in-vehicle air conditioner,
   wherein a fourth air duct is formed between the air conditioner vent and the compartment, and the in-vehicle air conditioner further comprises a second regulating valve and a second fan that are disposed in the fourth air duct.

2. The temperature regulating system of an in-vehicle battery according to claim 1, wherein the in-vehicle air conditioner comprises a first regulating valve disposed in the first air duct.

3. The temperature regulating system of an in-vehicle battery according to claim 1, wherein the semiconductor heat exchange module further comprises a third fan and a third regulating valve that are disposed in the second air duct and that are disposed corresponding to the cooling end of the semiconductor heat exchange module.

4. The temperature regulating system of an in-vehicle battery according to claim 1, wherein the in-vehicle air conditioner exchanges heat with the heat exchanger through the air conditioner vent and the first air duct.

5. The temperature regulating system of an in-vehicle battery according to claim 1, wherein the in-vehicle air conditioner exchanges heat with the compartment through the air conditioner vent and the fourth air duct.

6. The temperature regulating system of an in-vehicle battery according to claim 1, wherein the semiconductor heat exchange module exchanges heat with the heat exchanger through the second air duct and the first fan.

7. The temperature regulating system of an in-vehicle battery according to claim 1, wherein the semiconductor heat exchange module exchanges heat with the compartment through the third air duct.

8. The temperature regulating system of an in-vehicle battery according to claim 1, wherein after the in-vehicle air conditioner exchanges heat with the semiconductor heat exchange module through the air conditioner vent and the second air duct, the semiconductor heat exchange module exchanges heat with the compartment through the third air duct.

9. The temperature regulating system of an in-vehicle battery according to claim 1, wherein after the in-vehicle air conditioner exchanges heat with the semiconductor heat exchange module through the air conditioner vent, the fourth air duct, the compartment, and the third air duct, the semiconductor heat exchange module exchanges heat with the heat exchanger through the second air duct and the first fan.

10. The temperature regulating system of an in-vehicle battery according to claim 1, wherein the in-vehicle air conditioner exchanges heat with the heat exchanger through the air conditioner vent and the first air duct, and the semiconductor heat exchange module exchanges heat with the heat exchanger through the second air duct and the first fan.

11. The temperature regulating system of an in-vehicle battery according to claim 1, further comprising a battery state detection module electrically connected to the controller, wherein the battery state detection module is configured to detect a current of the in-vehicle battery.

12. The temperature regulating system of an in-vehicle battery according to claim 1, wherein the battery thermal management module comprises a pump, a first temperature sensor, a second temperature sensor, and a flow velocity sensor that are disposed on the heat exchange flow path, and the pump, the first temperature sensor, the second temperature sensor, and the flow velocity sensor are connected to the controller, wherein
the pump is configured to cause a medium in the heat exchange flow path to flow;
the first temperature sensor is configured to detect an inlet temperature of a medium that flows into the in-vehicle battery;
the second temperature sensor is configured to detect an outlet temperature of the medium that flows out of the in-vehicle battery; and
the flow velocity sensor is configured to detect a flow velocity of the medium in the heat exchange flow path.

13. The temperature regulating system of an in-vehicle battery according to claim 12, wherein the battery thermal management module further comprises a medium container disposed on the heat exchange flow path, and the medium container is configured to provide the medium for the heat exchange flow path.

14. The temperature regulating system of an in-vehicle battery according to claim 12, wherein the battery thermal management module further comprises a heater, and the heater is connected to the controller and is configured to heat the medium in the heat exchange flow path.

15. A temperature regulating method of an in-vehicle battery of a vehicle, wherein the vehicle includes a heat exchanger; an in-vehicle air conditioner provided with an air conditioner vent, a first air duct formed between the air conditioner vent and the heat exchanger, and a first fan disposed in the first air duct corresponding to the heat exchanger; a semiconductor heat exchange module having both a heating end and a cooling end, provided with a second air duct formed between the cooling end of the semiconductor heat exchange module and the first fan, and a third air duct formed between the cooling end of the semiconductor heat exchange module and a compartment; a battery thermal management module connected to the heat exchanger to form a heat exchange flow path; and a controller connected to the semiconductor heat exchange module, the battery thermal management module, and the in-vehicle air conditioner, wherein a fourth air duct is formed between the air conditioner vent and the compartment, and the in-vehicle air conditioner further comprises a second regulating valve and a second fan that are disposed in the fourth air duct, the method comprising:
obtaining, by the controller, a required power of the in-vehicle battery when heat exchange needs to be performed on the in-vehicle battery;
obtaining, by the controller, an actual power of the in-vehicle battery; and
controlling, by the controller and according to the required power and the actual power, at least one of the in-vehicle air conditioner and the semiconductor heat exchange module to operate to regulate a temperature of the in-vehicle battery.

16. A temperature regulating system of an in-vehicle battery, comprising:
a heat exchanger;
an in-vehicle air conditioner, wherein the in-vehicle air conditioner is provided with an air conditioner vent, a first air duct is formed between the air conditioner vent and the heat exchanger, a first fan is disposed in the first air duct, and the first fan is disposed corresponding to the heat exchanger;
a semiconductor heat exchange module, wherein a second air duct is formed between a cooling end of the semiconductor heat exchange module and the first fan, a third air duct is formed between the cooling end of the semiconductor heat exchange module and a compartment, and the semiconductor heat exchange module exchanges heat with the heat exchanger through the second air duct and the first fan;
a battery thermal management module, wherein the battery thermal management module is connected to the heat exchanger to form a heat exchange flow path; and
a controller, connected to the semiconductor heat exchange module, the battery thermal management module, and the in-vehicle air conditioner.

* * * * *